US011395093B2

(12) United States Patent
Fraccaroli

(10) Patent No.: US 11,395,093 B2
(45) Date of Patent: *Jul. 19, 2022

(54) METHOD, SYSTEM AND APPARATUS FOR LOCATION-BASED MACHINE-ASSISTED INTERACTIONS

(71) Applicant: Federico Fraccaroli, Irving, TX (US)

(72) Inventor: Federico Fraccaroli, Irving, TX (US)

( * ) Notice: Subject to any disclaimer, the term of this patent is extended or adjusted under 35 U.S.C. 154(b) by 302 days.

This patent is subject to a terminal disclaimer.

(21) Appl. No.: 15/894,878

(22) Filed: Feb. 12, 2018

(65) Prior Publication Data

US 2018/0176728 A1  Jun. 21, 2018

Related U.S. Application Data

(63) Continuation of application No. 14/274,763, filed on May 11, 2014, now Pat. No. 9,894,476, which is a (Continued)

(51) Int. Cl.
| | |
|---|---|
| *H04W 4/021* | (2018.01) |
| *H04W 4/02* | (2018.01) |
| *H04W 4/80* | (2018.01) |

(52) U.S. Cl.
CPC .......... *H04W 4/021* (2013.01); *H04W 4/027* (2013.01); *H04W 4/80* (2018.02)

(58) Field of Classification Search
CPC ....... H04W 4/021; H04W 4/02; H04W 40/20; H04W 4/025; H04W 4/06; H04M 2203/2044; H04M 2242/30; G06F 3/0481; H04L 67/14; H04L 67/306; H04L 67/18; H04L 67/24; H04L 51/04; H04L 51/043; H04L 51/20; H04L 51/24; G06Q 30/0267; G06Q 30/0261
See application file for complete search history.

(56) References Cited

U.S. PATENT DOCUMENTS

| | | | |
|---|---|---|---|
| 6,061,561 | A | 5/2000 | Alanara |
| 6,539,232 | B2 | 3/2003 | Hendrey |

(Continued)

FOREIGN PATENT DOCUMENTS

| | | |
|---|---|---|
| WO | WO2001/52163 A1 | 7/2001 |
| WO | WO2010015984 A2 | 2/2010 |
| WO | WO2012075528 A1 | 6/2012 |

OTHER PUBLICATIONS

US 6,731,928 B1, 05/2004, Tanaka (withdrawn)

(Continued)

*Primary Examiner* — Dennis Truong
(74) *Attorney, Agent, or Firm* — Federico Fraccaroli

(57) ABSTRACT

In accordance with one example embodiment of the present invention a method comprises at least partially enabling a set of functionalities and attributes associated to an area for facilitating business transactions, networking activities, or social interactions of users who are within, proximate, or associated, at least provisionally, with said area. In some implementations, the present invention provides functionalities apt to discover taxonomies of users in relation to locations. In some other implementations, the present invention provides functionalities apt to trace or follow up with users who have associated their identities, at least during a time window, with said area.

20 Claims, 22 Drawing Sheets

Principal Agent Data Structure 1500

| ID Agent | Principal | Status Princ. | Status Agent | Entry | Offer | Parameters 1517 | Location |
|---|---|---|---|---|---|---|---|
| JPR-123 | Watches International (WI) | Inactive | Active | IP Address/ Web page | 25% off a WI wristwatch model Tango. | • Only military personnel. • Valid only in Texas • Distance between agent equipment and user equipment less than 1000 feet | Closest WI dealer to the place where match has occurred. (Server software may determine closest dealer that has the item available and provide location and routing to user). 1521 |
| JPR-234 | | Active | Active | | | | |
| RJA-123 RJA-176 RJA-735 | Jeep dealer located at Lat. / Long. or address | Active Active Inactive | Inactive Active Active | IP Address/ Web page | 3000$ off Jeep Wrangler | • Offer valid 1-5-2012 to 3-5-2012 • Time 8am -5 Pm 1518 | • Jeep dealer located at Lat. / Long. or address 1522 |
| N453 | Law offices located at Lat. / Long. or address | Active | Active | IP Address/ Web page | Law Firm Services. Uncontested divorce. 50% off | • Offer received only by users located within geofenced area (4 Lat and Long points defining area) 1519 | • Law offices located at Lat. / Long. or address |
| XYZ-6634 | Computer Store. GPS: Lat. / Long. or address | Active | Active | IP Address/ Web page | 30% off on all 2011 laptops D2011 | • At least 15 accepted purchases • Max 30 accepted purchases | • Computer Store; GPS: Lat. / Long. or address |

1509 1510 1511 1512 1513 1514 1515 1516
1530 1540 1550 1560 1520

Related U.S. Application Data continuation-in-part of application No. 14/044,615, filed on Oct. 2, 2013, now abandoned.

(56) References Cited

U.S. PATENT DOCUMENTS

| | | | |
|---|---|---|---|
| 6,542,748 B2 | 4/2003 | Hendrey | |
| 6,542,750 B2 | 4/2003 | Hendrey | |
| 6,549,768 B1 | 4/2003 | Fraccaroli | |
| 6,647,269 B2 | 11/2003 | Hendrey | |
| 6,756,913 B1 | 6/2004 | Ayed | |
| 6,774,840 B1 | 8/2004 | Adamczyk | |
| 6,819,919 B1 | 11/2004 | Tanaka | |
| 6,968,179 B1* | 11/2005 | De Vries | H04L 67/141 455/414.1 |
| 7,024,195 B2 | 4/2006 | Miriyala | |
| 7,113,797 B2 | 9/2006 | Kelley | |
| 7,203,502 B2 | 4/2007 | Wilson | |
| 7,254,388 B2 | 8/2007 | Nam | |
| 7,302,403 B1 | 11/2007 | Landau | |
| 7,328,029 B1 | 2/2008 | Adamczyk | |
| 7,359,724 B2 | 4/2008 | Tovonen | |
| 7,620,404 B2 | 11/2009 | Chesnais | |
| 7,627,422 B2 | 12/2009 | Adamczyk | |
| 7,643,834 B2 | 1/2010 | Ioppe | |
| 7,668,537 B2 | 2/2010 | De Vries | |
| 7,715,542 B2 | 5/2010 | Anson | |
| 7,813,741 B2 | 10/2010 | Hendrey | |
| 7,840,224 B2 | 11/2010 | Vengroff | |
| 7,840,427 B2 | 11/2010 | O'Sullivan | |
| 7,848,765 B2 | 12/2010 | Phillips | |
| 7,856,360 B2 | 12/2010 | Kramer | |
| 7,945,477 B2 | 5/2011 | Werbitt | |
| 7,970,912 B2 | 6/2011 | Bourne | |
| 8,005,488 B2 | 8/2011 | Saffaroni | |
| 8,019,692 B2 | 9/2011 | Rosen | |
| 8,050,688 B2 | 11/2011 | Jacob | |
| 8,126,479 B2 | 2/2012 | Morrison | |
| 8,126,480 B2 | 2/2012 | Morrison | |
| 8,140,256 B1 | 3/2012 | dos-Santos | |
| 8,150,439 B2 | 4/2012 | Vengroff | |
| 8,154,401 B1 | 4/2012 | Bertagna | |
| 8,200,248 B2 | 6/2012 | Ioppe | |
| 8,275,361 B2 | 9/2012 | De Vries | |
| 8,467,807 B1* | 6/2013 | Dalit | G06Q 30/02 455/456.2 |
| 8,566,839 B2* | 10/2013 | Johnson | G06Q 30/00 715/200 |
| 8,595,050 B2 | 11/2013 | Scotto | |
| 8,676,937 B2 | 3/2014 | Rapapot | |
| 8,718,598 B2* | 5/2014 | Johnson | H04W 4/029 455/404.2 |
| 8,880,420 B2 | 11/2014 | Scotto | |
| 8,897,741 B2* | 11/2014 | Johnson | H04W 64/00 455/404.2 |
| 9,009,067 B1 | 4/2015 | Scotto | |
| 9,100,454 B2 | 8/2015 | Holden | |
| 9,135,353 B2 | 9/2015 | Hendrey | |
| 9,264,874 B2* | 2/2016 | Fraccaroli | H04W 4/21 |
| 9,304,008 B2 | 4/2016 | Poppen | |
| 9,439,035 B2 | 9/2016 | Fraccaroli | |
| 9,453,739 B2 | 9/2016 | Smartt | |
| 9,710,779 B1 | 7/2017 | Maloney | |
| 9,824,410 B1 | 11/2017 | Sendelbach | |
| 9,973,899 B1* | 5/2018 | Andrews | G06F 3/011 |
| 10,360,543 B2 | 7/2019 | McCartney | |
| 2002/0034292 A1 | 3/2002 | Tuoriniemi | |
| 2002/0095326 A1 | 7/2002 | Katz | |
| 2002/0095333 A1* | 7/2002 | Jokinen | G06Q 30/0207 705/14.26 |
| 2002/0132627 A1 | 9/2002 | Ichihara | |
| 2002/0143638 A1 | 10/2002 | August | |
| 2003/0020623 A1 | 1/2003 | Cao | |
| 2003/0060214 A1 | 3/2003 | Hendrey | |
| 2003/0076353 A1* | 4/2003 | blackstock | G06F 3/0481 715/751 |
| 2004/0034571 A1 | 2/2004 | Wood | |
| 2004/0153357 A1 | 8/2004 | De Sylva | |
| 2004/0243941 A1* | 12/2004 | Fish | H04L 51/24 715/752 |
| 2004/0249818 A1 | 12/2004 | Isaac | |
| 2005/0113123 A1* | 5/2005 | Torvinen | H04W 4/021 455/519 |
| 2005/0114149 A1 | 5/2005 | Rodriguez | |
| 2006/0004911 A1* | 1/2006 | Becker | G06Q 10/107 709/207 |
| 2006/0020515 A1 | 1/2006 | Lee | |
| 2006/0031105 A1 | 2/2006 | Lee | |
| 2006/0265484 A1* | 11/2006 | Delia | H04W 4/029 709/223 |
| 2006/0270419 A1* | 11/2006 | Crowley | H04L 51/00 455/456.2 |
| 2007/0043845 A1* | 2/2007 | Gray | G06Q 10/02 709/223 |
| 2007/0226314 A1* | 9/2007 | Eick | G06T 11/00 709/217 |
| 2007/0233785 A1* | 10/2007 | Abraham | G06Q 10/107 709/204 |
| 2007/0279484 A1* | 12/2007 | Derocher | H04N 7/15 348/14.09 |
| 2008/0092224 A1* | 4/2008 | Coulas | H04L 45/00 726/12 |
| 2008/0097999 A1* | 4/2008 | Horan | G06Q 10/10 |
| 2008/0113674 A1 | 5/2008 | Baig | |
| 2008/0114629 A1 | 5/2008 | Pavlov | |
| 2008/0140650 A1* | 6/2008 | Stackpole | G06Q 10/10 |
| 2009/0019085 A1* | 1/2009 | Abhyanker | G06Q 10/10 |
| 2009/0030885 A1 | 1/2009 | DePasquale | |
| 2009/0106124 A1 | 4/2009 | Yang | |
| 2009/0192851 A1 | 7/2009 | Bishop | |
| 2009/0215469 A1 | 8/2009 | Fisher | |
| 2009/0216600 A1 | 8/2009 | Hill | |
| 2009/0216846 A1* | 8/2009 | Burroughs | H04L 67/18 709/206 |
| 2009/0249456 A1 | 10/2009 | Malas | |
| 2010/0056183 A1* | 3/2010 | Oh | H04L 12/1818 455/456.3 |
| 2010/0159943 A1 | 6/2010 | Salmon | |
| 2010/0253508 A1* | 10/2010 | Koen | B60R 25/102 340/539.13 |
| 2010/0302068 A1* | 12/2010 | Bandukwala | H04W 4/46 340/932.2 |
| 2011/0035384 A1* | 2/2011 | Qiu | G06Q 10/107 709/204 |
| 2011/0035445 A1 | 2/2011 | Eickhoff | |
| 2011/0066366 A1* | 3/2011 | Ellanti | G01C 21/3438 701/533 |
| 2011/0099040 A1 | 4/2011 | Felt | |
| 2011/0126132 A1* | 5/2011 | Anderson | G06Q 10/10 715/758 |
| 2011/0136510 A1 | 6/2011 | Peterson | |
| 2011/0137796 A1 | 6/2011 | Tullis | |
| 2011/0173235 A1* | 7/2011 | Aman | A63B 24/0021 707/792 |
| 2011/0238755 A1* | 9/2011 | Khan | H04W 4/023 709/204 |
| 2011/0313804 A1 | 12/2011 | Camp | |
| 2012/0064919 A1 | 3/2012 | Purdy | |
| 2012/0072340 A1 | 3/2012 | Amron | |
| 2012/0116861 A1* | 5/2012 | Dobyns | G06Q 30/0234 705/14.34 |
| 2012/0131170 A1 | 5/2012 | Spat | |
| 2012/0303743 A1* | 11/2012 | Stonefield | H04L 12/1813 709/217 |
| 2013/0035114 A1 | 2/2013 | Holden | H04W 4/08 455/456.3 |
| 2013/0036370 A1* | 2/2013 | Ananthakrishnan | G06F 3/0488 715/753 |
| 2013/0091058 A1* | 4/2013 | Huster | G06Q 20/322 705/44 |
| 2013/0122936 A1 | 5/2013 | Hudson | |
| 2013/0132140 A1 | 5/2013 | Amin | |

(56) References Cited

U.S. PATENT DOCUMENTS

| | | | |
|---|---|---|---|
| 2013/0166401 A1 | 6/2013 | Algozer | |
| 2013/0059606 A1 | 7/2013 | Pujol | |
| 2013/0012239 A1 | 10/2013 | Crowley | |
| 2013/0275221 A1* | 10/2013 | Zeto, III | G06Q 30/0261 705/14.58 |
| 2013/0275505 A1* | 10/2013 | Gauglitz | G06Q 30/06 709/204 |
| 2013/0316735 A1 | 11/2013 | Li | |
| 2013/0332274 A1* | 12/2013 | Faith | G06Q 30/0255 705/14.53 |
| 2014/0011522 A1 | 1/2014 | Lin | |
| 2014/0045472 A1 | 2/2014 | Sharma | |
| 2014/0045516 A1* | 2/2014 | Turgman | H04W 4/021 455/456.1 |
| 2014/0074874 A1* | 3/2014 | Fraccaroli | G06F 16/284 707/758 |
| 2014/0095296 A1* | 4/2014 | Angell | G06Q 30/0246 705/14.45 |
| 2014/0095607 A1* | 4/2014 | Fraccaroli | H04W 4/21 709/204 |
| 2014/0114963 A1* | 4/2014 | Jurascheck | H04L 65/4076 707/723 |
| 2014/0122592 A1 | 5/2014 | Houston | |
| 2014/0171039 A1* | 6/2014 | Bjontegard | H04W 4/029 455/414.1 |
| 2014/0171119 A1* | 6/2014 | Fraccaroli | H04W 4/021 455/456.3 |
| 2014/0180817 A1* | 6/2014 | Zilkha | G06Q 30/02 705/14.55 |
| 2014/0214465 A1 | 7/2014 | L'Heureux | |
| 2014/0280526 A1* | 9/2014 | Filho | H04W 4/021 709/204 |
| 2014/0099973 A1 | 10/2014 | Cecchini | |
| 2014/0316897 A1 | 10/2014 | Montanaro | |
| 2014/0162693 A1 | 12/2014 | Wachter | |
| 2014/0162698 A1 | 12/2014 | Han | |
| 2014/0365304 A1* | 12/2014 | Showers | G06Q 30/02 705/14.55 |
| 2015/0094097 A1* | 4/2015 | Fraccaroli | H04W 4/021 455/456.3 |
| 2015/0319203 A1* | 11/2015 | Jeremias | H04L 51/20 715/753 |
| 2017/0193404 A1 | 7/2017 | Yoo | |
| 2017/0193405 A1 | 7/2017 | Lambert | |

OTHER PUBLICATIONS

I. Djordjevic, C. Phillips and T. Dimitrakos, "An architecture for dynamic security perimeters of virtual collaborative networks," 2004 IEEE/IFIP Network Operations and Management Symposium (IEEE Cat. No. 04CH37507), 2004, pp. 249-262 vol. 1, doi: 10.1109/NOMS.2004.1317663. (Year: 2004).*

Beaudry, A., Laporte, G., Melo, T. et al. Dynamic transportation of patients in hospitals. OR Spectrum 32, 77-107 (2010). https://doi.org/10.1007/s00291-008-0135-6 (Year: 2010).*

G. T. Costanzo, G. Zhu, M. F. Anjos and G. Savard, "A System Architecture for Autonomous Demand Side Load Management in Smart Buildings," in IEEE Transactions on Smart Grid, vol. 3, No. 4, pp. 2157-2165, Dec. 2012, doi: 10.1109/TSG.2012.2217358. (Year: 2012).*

M. O. Seliuchenko, O. A. Lavriv and M. M. Klymash, "Analysis of load balancing methods for improving of utilization efficiency of hardware resources of distributed systems," 2013 23rd International Crimean Conference "Microwave & Telecommunication Technology", 2013, pp. 515-516. (Year: 2013).*

Huang, Yan, et al. "Large scale real-time ridesharing with service guarantee on road networks." arXiv preprint arXiv: 1302.6666 (2013). (Year: 2013).*

Boukayoua et al. "D.1.1 Report on state of the art and requirement study I"; IWTI Jun. 2011 (Year: 2011).*

* cited by examiner

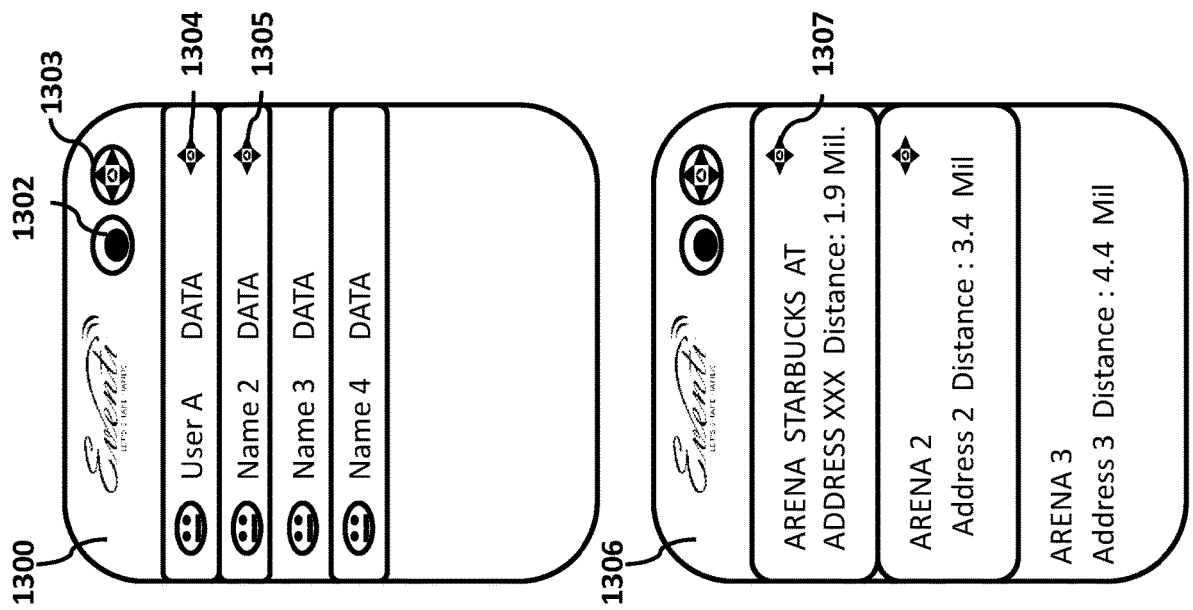
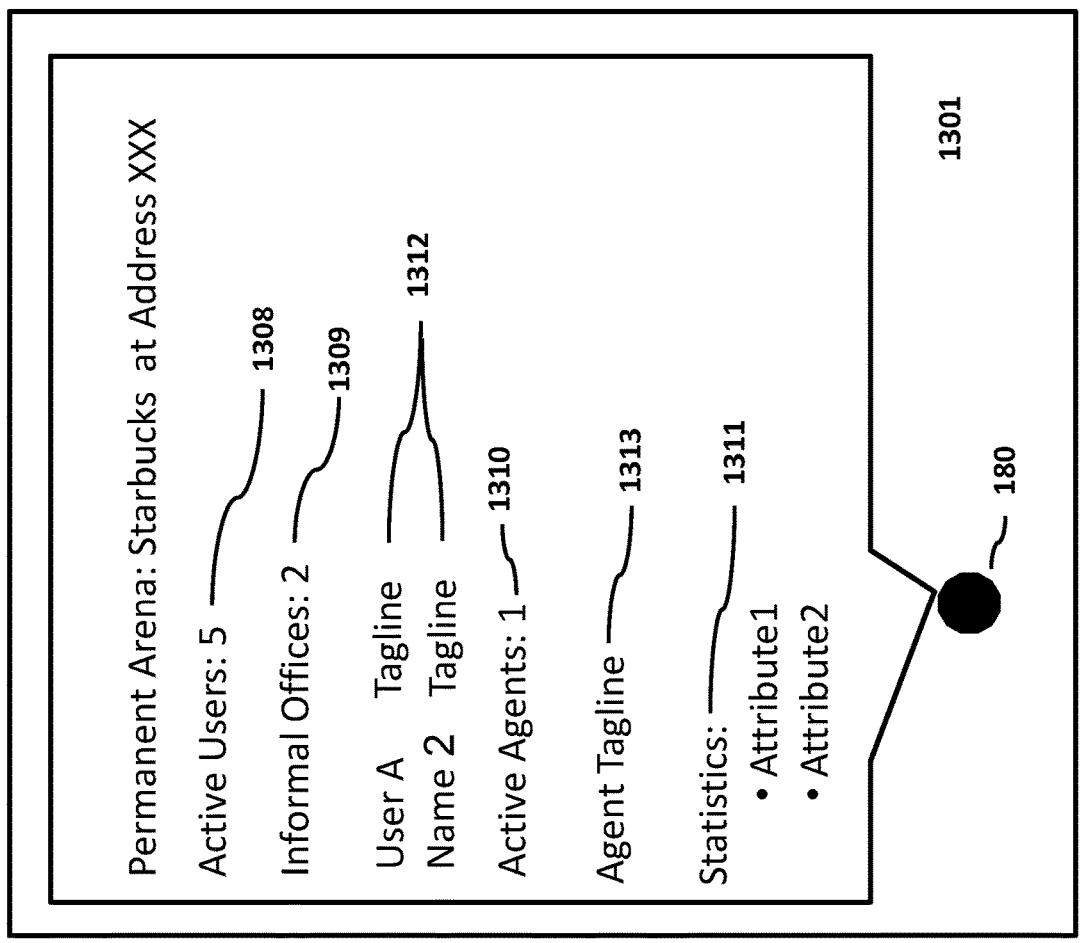
FIG. 13

Principal Agent Data Structure 1500

| ID Agent | Principal | Status Princ. | Status Agent | Entry | Offer | Parameters | Location |
|---|---|---|---|---|---|---|---|
| JPR-123 | Watches International (WI) | Inactive | Active | IP Address/ Web page | 25% off a WI wristwatch model Tango. | • Only military personnel.<br>• Valid only in Texas<br>• Distance between agent equipment and user equipment less than 1000 feet | Closest WI dealer to the place where match has occurred. (Server software may determine closest dealer that has the item available and provide location and routing to user). |
| JPR-234 | | Active | Active | IP Address/ Web page | | | |
| RJA-123<br>RJA-176<br>RJA-735 | Jeep dealer located at Lat. / Long. or address | Active<br>Active<br>Inactive | Inactive<br>Active<br>Active | IP Address/ Web page | 3000$ off Jeep Wrangler | • Offer valid 1-5-2012 to 3-5-2012<br>• Time 8am -5 Pm | • Jeep dealer located at Lat. / Long. or address |
| N453 | Law offices located at Lat. / Long. or address | Active | Active | IP Address/ Web page | Law Firm Services. Uncontested divorce. 50% off | • Offer received only by users located within geofenced area (4 Lat and Long points defining area) | • Law offices located at Lat. / Long. or address |
| XYZ-6634 | Computer Store. GPS: Lat. / Long. or address | Active | Active | IP Address/ Web page | 30% off on all 2011 laptops D2011 | • At least 15 accepted purchases<br>• Max 30 accepted purchases | • Computer Store; GPS: Lat. / Long. or address |

FIG. 15

User Data Structure: 1600

| Target Preferences 1610 | Details of Target Preferences 1620 | User data 1630 | User Preferences 1640 |
|---|---|---|---|
| CAR | Mercedes: new Class M | ID user: RTF 176234<br>Student: No<br>Marital status: Single<br>Date of Birth 12/23/1968 — 1654 | Time restrictions: No notifications are to be sent between 11pm - 8am local time. — 1653 |
| | Fiat: new cinquecento | Gender: M | Location restrictions: Send offers only within Dallas city limits. — 1652<br>Meeting places preferences. |
| 1650 | BMW: new 3 SERIES | Income > than 50,000 $ | Only offers where good is in the hands of the agent and can be showcased. — 1651 |
| WATCH 1660 | International Watches | Military: N | Only discounts above 30 % — 1661 |
| SMART PHONE 1670 | New Android Phones | Geo Patterns in time and space — 1672 | KEYWORDS: Gucci; Armani — 1671 |
| SERVICES - LEGAL 1680 | Family Law / Divorce | Matches, exclusions and ratings. — 1681 | Privacy and preferences settings. — 1682 |

FIG. 16

METHOD, SYSTEM AND APPARATUS FOR LOCATION-BASED MACHINE-ASSISTED INTERACTIONS

CLAIM OF PRIORITY

The present application is a Continuation of application Ser. No. 14/274,763 filed on May 11, 2014, published as US 2015-0094097 A1, titled Method, System, and Apparatus for Location-Based Machine—Assisted Interactions which is a Continuation in Part of application Ser. No. 14/044,615 filed on Oct. 2, 2013, published as US 2014-0074874 A1, titled Method, System, and Apparatus for Location-Based Machine—Assisted Interactions.

TECHNICAL FIELD

The present application generally relates to a method, a system, and an apparatus for facilitating social interactions and/or professional interactions and/or business transactions.

BACKGROUND

The teachings of U.S. Pat. Nos. 6,819,919, 6,542,750, 7,813,741, U.S. Pat. Nos. 6,542,748, 6,539,232, 6,542,749, 8,150,439 and 6,549,768 are expressly incorporated herein by reference in their entirety. The teachings of the following U.S. patent applications, having the same inventor of the present application, are expressly incorporated herein by reference in their entirety: "Method and Apparatus for Mediating Among a Plurality of Profiles Associated with Users Positioned in a Shared Location," Ser. No. 13/572,617, filed Aug. 11, 2012, "Method and Apparatus for a Principal/Agent-Based Mobile Commerce" now U.S. Pat. No. 9,286,610 B2, Ser. No. 13/541,737, filed Jul. 4, 2012, "Method and Apparatus for Location-Based Conditional Offers", Ser. No. 13/548,944, filed Jul. 13, 2012, "Method and Apparatus for Location-Based Networking Sessions," Ser. No. 13/633,133, filed Oct. 2, 2012, and "Method and Apparatus for Managing Attributes and Functionalities of Predetermined Geographical Areas," Ser. No. 13/716,168, filed Dec. 16, 2012.

A geofence is a virtual perimeter for a real-world geographic area. It can be generated dynamically as in a radius around a point location such as a bar or a restaurant. A geofence can be also be generated within the perimeter of a physical location. In one implementation, a geofence can be a predefined set of boundaries connecting points expressed by latitude and longitude. Alternatively, a geofence can be an area containing points with similar characteristics, e.g., within the radius of one or more RF-ID reader apparatus or iBeacon apparatus.

Geofencing has been made possible especially by the introduction of GPS (Global Positioning System) technology and the miniaturization of electronic components that have made the locationing functionality a standard feature in Mobile Phones and portable electronics in general.

Geofencing can be implemented via many positioning techniques, both indoor and outdoor, such as by means of detection by an RF-ID reader, Wi-Fi, Bluetooth mapping, accelerometers, gyroscopes, altimeters, magnetometers, or led detection modules, just to cite a few examples.

Locationing techniques coupled with mobile telecommunications technology have opened the door to novel, machine-assisted methods for facilitating and conducting business transactions. For example, the above-mentioned application "Method and Apparatus for a Principal/Agent-Based Mobile Commerce" discloses a location-based mobile commerce method based on three actors: 1) a user, 2) an agent, and a 3) principal. In said disclosure, an agent, e.g. a trusted customer of a certain brand, can be empowered by a principal, e.g. a car dealer for said brand, to represent said principal with deals or offers that have been preapproved by said principal.

Geofencing and location technologies, in general, can trigger or inhibit the functionalities of location-aware apparatuses. For example, as described in U.S. Pat. No. 7,813,741 titled "System and Method for Initiating Responses to Location-Based Events", a system may provide a response to one or more location-based services applications to supply location-based services, such as email, instant messaging, paging, and the like.

In other enactments, systems can make available location-based information and functionalities in various ways, as described for example in U.S. Pat. No. 8,150,439 titled "Facilitating user interactions based on proximity."

All the patents, patent applications, and published documents mentioned anywhere in this application are incorporated herein by reference in their entirety. Furthermore, where a definition or use of a term in a document that is incorporated by reference is inconsistent or contrary to the definition of that term provided herein, the definition of that term provided herein applies and the definition of that term in the reference does not apply.

SUMMARY

According to one aspect of the present invention, a method comprises: 1) creating a session area model-profile associated with an area by selecting at least a subset of all the possible attributes that may pertain to a generic user profile 2) assigning model values to said subset of attributes 3) comparing said model values with the values belonging to the profile of a user for the same said subset of attributes, and 4) generating a correlation score.

Another aspect of the invention comprises a method, a system, and an apparatus for interacting with users who are located within an area. Said method, system and apparatus are based on a software module utility that correlates 1) a visual field displaying User A and 2) User A's profile which is contained in a datagram that is stored in a server. A functional visual icon can be superimposed to the live feed of said User A.

Another aspect of the invention comprises a method, a system, and an apparatus for displaying active users who are located nearby User A in an active session area.

Another aspect of the invention comprises a method, system, and apparatus for regulating proximate active session area in a hierarchical manner.

Another aspect of the invention comprises a method, a system, and an apparatus for automatically exchanging, collecting, and managing electronic records of users who have joined a session area. In one implementation, said electronic records are represented on one electronic display as software objects mimicking traditional business cards. Electronic records can be integrated with a Customer Relationship Management System.

Numerous aspects, embodiments, and examples of the invention that can be implemented by a system, a method, or an apparatus are set out in the claims and are described in detail in the specifications.

BRIEF DESCRIPTION OF THE DRAWINGS

For a more complete understanding of example embodiments of the present invention, reference is now made to the following descriptions taken in connection with the accompanying drawings in which:

FIG. 13 represents two exemplary screens of a mobile application running on terminal equipment. It also represents an exemplary screen of a map that can be accessed, e.g., via a web browser. Said map may represent attributes of locations that are hosting finite events or locations that are hosting permanent sessions (arenas).

FIG. 15 provides an example of a data structure in accordance with an embodiment of the present invention.

FIG. 16 provides an example of a user data structure in accordance with one embodiment of the present invention.

DETAILED DESCRIPTION OF THE DRAWINGS

An example embodiment of the present invention and its potential advantages are understood by referring to FIG. 1 through 13 of the drawings.

Figure 1:
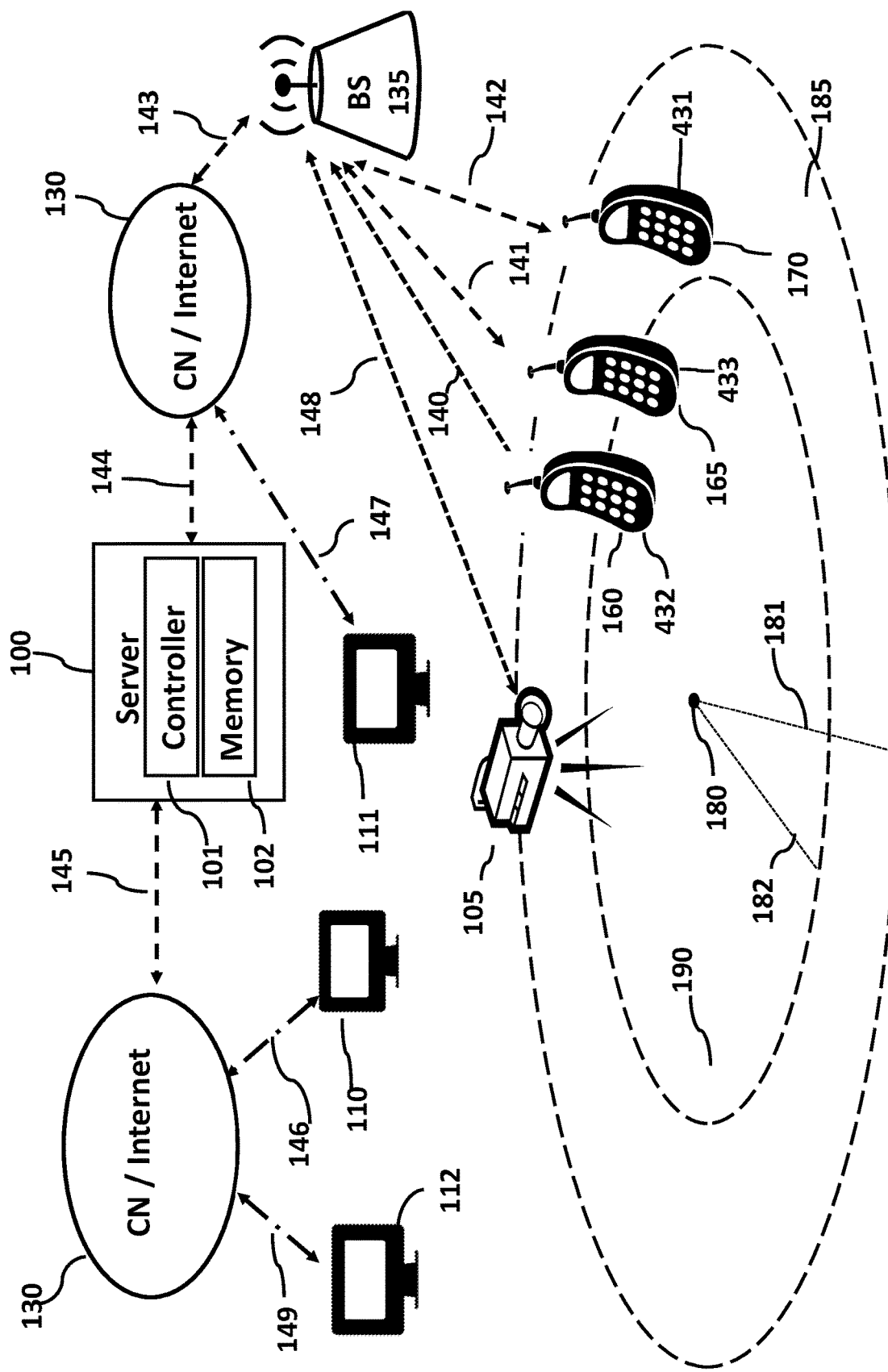
FIG. 1 represents a simplified version of various embodiments of the invention describing a system.

FIG. 1 describes one possible embodiment of the invention. User Equipment 170 at time T1 is located in Notification Area 185. Notification Area 185 is a zone, centered on Location 180. Notification Area 185, in one possible implementation, is an area surrounding, non-overlapping, and extending beyond Session Area 190. In another, it is overlapping with Session Area 190.

Location 180, in some implementations, can be a public place such as a mall or a bar, or a happy hour place. Said public venues may provide an alternative to a business location such as a shop, a business office, or a dealership that is informal and better suited to a casual and obligation-free interaction.

In FIG. 1 Session Area 190 is an area, also centered on Location 180 where certain predetermined functionalities are enabled. For example, User Equipment 160 and 165, by virtue of being positioned within Session Area 190 may interact, exchange electronic business cards, or close predetermined business deals.

Because User Equipment 170 is positioned within Notification Area 185 at time T1 and because T1 is comprised within a predefined time window and because User Equipment 170 may contain a software application logged on Memory 431, User Equipment 170 may, for example, receive a notification that a user is located within Session Area 190 and is available for interaction.

In another embodiment, there is no window of notification but notifications can be delivered independently from the time of the day. Said notification can be delivered via Radio Link 142, established between User Equipment 170 and Access Point/Base Station (AP/BS) 135. For the sake of simplicity, in the example of FIG. 1, Access Point/Base Station (AP/BS) 135 is serving all the equipment located in both Session Area 190 and Notification Area 185 via Radio Links 142, 141, 148, and 140.

In one embodiment, User Equipment 170, located in Notification Zone 185, may receive indicia that agent equipment such as User Equipment 160 is located and active in Session Area 190. Said indicia could be associated with preferences and settings contained in a data structure determined, at least in part, by a principal.

Fractional Administrator Equipment 111 may represent said principal.

Fractional Administrator Equipment 111 could be one of many principals that are served by an administrator via Administrator Equipment 110. An administrator could be in charge of providing a service to multiple principals in case of a location-based service implementing an agency system.

Administrator Equipment 110, connected to the Internet via Link 146 can be representative of, e.g., a provider of the agency service for multiple brands or services. Said service provider may access the functionalities, software, and modules of Server 100 comprising Controller 101 and may serve, e.g., a plurality of principals. Fractional Administrator Equipment 111, connected to the internet via Link 147, may be representative of a particular principal, namely an owner of a service, brand, or product for sale who may enable selected agents to participate in a location-based service and represent him or her.

Traditionally a principal will control the terms of the offers that agents may extend to users, at least partially. In one implementation, the savings derived by the absence of dedicated commercial space and informal, non-traditional marketing realized by a principal can be passed to agents and customers.

A principal may have access, at least partially, to functionalities and settings of Server 100 and may enable agents, compile business offers and regulate the service. Because of analytics-derived or explicit preferences expressed by a user, an algorithm, residing on Memory 102 and running on Server 100, may cause the system to alert the user and/or agent of their mutual proximity based on geofences. In another implementation, a user may be able to discover where active agents are, independently from his proximity to them but rather using a browser and a search engine, or filters related to interests, brands, or locations. In another implementation, an agent may activate a visibility-enhancing function associated with a tagline as will be explained in further detail with reference to FIG. 13.

In one implementation, a user's indicia of interest for a brand or a product via social media activity may consist, for example, of a "like" or 'share" in a Facebook-type web application concerning a particular brand. In another embodiment, it may consist of the clicking of a web banner advertisement. In another embodiment, the expression of interest for a particular deal or brand can be the result of an ad-hoc user profile or the result of a user's opting into a notification offering presented to the user from time to time via communication media in general. In another embodiment, the expression of interest could be derived from analytics of the internet browsing activities of users who navigate sites harvesting information. For example, a user reading an article pertaining to a certain brand of cars may result in that user being notified of a nearby agent for that brand of cars.

The person skilled in the art will understand that Facebook is just one of many possible social media platforms where users can indicate interest for particular kinds of services, products, or brands and that other media services can serve the purpose. Interest or inclinations can also be evinced from contextual information.

User Equipment 160 may contain a software application logged on Memory 432 of the same kind as the one present in User Equipment 170 and 165 on Memory 433 and Memory 431. If User Equipment 160 represents an agent while User Equipment 165 and 170 represent possible target users (who have somewhat expressed an implicit or explicit interest for the brand or service represented by said agent), instead of having a contemporaneous movement of both agents and users around town, an agent can position himself within Session Area 190 and use the system to notify said target users.

The person skilled in the art will understand that the agency model is just a non-limiting example that is provided to illustrate the potential of one aspect of this invention and many of the concepts can be reused across different industries (e.g., consulting, legal et cetera).

In one implementation, User Equipment 160 can be representative of a professional looking forward to extending the reach of his office or a generic user who is looking forward to interactions with other fellow users for networking or dating purposes. For example, Notification Area 185 and Session Area 190 may support a networking service such as LinkedIn. In this embodiment, User A may express interest in a 'target" User B, and User A can be alerted of the presence of said "target" User B when said User B is within Session Area 190 if security and privacy settings of the system so allow.

In another scenario pertaining to a different industry, Notification Area 185 and Session Area 190 may augment dating services such as Match.com, PlentyofFish, Zoosk, eHarmony, or others. The philosophy supporting the case of dating service can be similar to the previous example of an agent/principal system.

In the case of a dating service, when allowed by the privacy policies, settings, and regulations pertaining to said service, users can be alerted of each other or can interact with each other if certain conditions are met.

Interactions and notifications can also be made possible by software applications and data logged on Memories 431, 432, 433, and 102. The person skilled in the art will understand that software applications and a system based on login and passwords will make equipment interchangeable. As long as the equipment described in this application can host and run a software application or modules of a software application that can enable the system to run and perform the functions described in this application there is no need for the dedicated hardware equipment.

In another embodiment, there is no dedicated software application logged on said memories and equipment, and said interactions and functionalities can be made possible by a client terminal code executed within a web browser or other application execution environments such as HTML/JavaScript or Flash.

User Equipment 170, 165, and 160 can be a mobile phone, a PDA, a laptop, or a tablet, or any other wireless mobile device or wearable equipment as long as capable of connecting with the Internet.

In the particular embodiment of FIG. 1, Session Area 190, represented as having a circular shape with Radius 182, is centered on Location 180. Session Area 190 can be an area where mobile equipment such as User Equipment 160 and 165 can report their presence manually or automatically and be part of a location-based group session event. Notification Area 185, in the embodiment described in FIG. 1, is centered on Location 180 and has a circular shape and Radius 181. It can be an area where User Equipment 170 reports its presence manually or automatically. In some implementations, said Location 180 can be, e.g., a bar, a mall, a happy hour place, or other places where access is restricted such as a conference room in a business building, a hotel or a convention center, or a private household.

In some implementations, the session area will be permanently active and the event shall be permanent (arena). In other instances, the event can be recurring, e.g., every Tuesday from 4.00 PM to 8.00 PM (recurring finite event). In other implementations, the event can be a one-time event (event).

In some implementations, Radius 182 and Radius 181 may adjust according to the reported accuracy of the positioning capabilities of User Equipment 170, 165, and 160. For example, if User Equipment 160 reports to Server 100 that a GPS positioning is not available and it must rely on the less precise triangulation from towers, the value of Radius 182 may increase to accommodate for a possibly jittering position reported by User Equipment 160. In other implementations, with the availability of a precise indoor positioning system, the value of Radius 182 may decrease. In other implementations, instead of varying the value of Radius 182 a hysteresis timer could be added so that even if User Equipment 160 reports itself outside Session Area 190, Server 100 may not disable those privileges or functionalities that are associated with Session Area 190 unless a certain amount of time has elapsed (and User Equipment 160 keeps reporting its position outside Session Area 190).

In certain implementations, the degradation of precision of a positioning system could be triggered by energy savings considerations. For example, Equipment 160 may turn off the GPS to save battery power. If User Equipment 160 cannot afford the power consumption derived from GPS usage, the system may relax the stringency of the conditions imposed to the user equipment to be located within a small active area to be able to take advantage of certain functionalities. In some implementations, e.g., the value of Radius 182 or Radius 181 is not the same for all user equipment but it may vary and adapt to classes of equipment or situations that are specific to User Equipment 160.

The functionalities that can be provided to users within Session Area 190 can be multiple. As non-limiting examples, if Server 100 has received the information that User Equipment 165 is within Session Area 190, then Controller 101 may facilitate the browsing and the retrieving of user-profiles associated with users who also are within said Session Area 190 such as User Equipment 160. It may also regulate the possibility of interacting via a messaging system or other predetermined interaction system such as an expression of interest notification.

Controller 101 may also regulate business transactions or preliminary agreements based on location. In one implementation, with reference to the previously described principal/agent system, a principal/agent transaction can be inhibited outside predetermined areas such as Session Area 190.

In one implementation, indicia of the presence of certain users within certain session areas can be made available to other users, such as External User 112 that is connected to Server 100 via Link 149, according to certain preferences. For example, in certain settings, it can be advantageous for a user who desires to be contacted by people outside Session Area 190 to let other users know of his presence within Session Area 190 even when those people are neither within Session Area 190 nor within Notification Area 185.

A user like External User 112 can be browsing in real-time the swarm of users who are within Session Area 190. Said External User 112 could acquire information about Location 180 via user interfaces such as Screen 1301 described in FIG. 13. In certain implementations, External User 112 may be able to retrieve information about certain users who have joined the active area centered on Location 180 and also may initiate, e.g., a messaging interaction with them according to certain privacy settings. In one implementation, External User 112 can, for example, receive a video and/or an audio feed from Video Camera 105 that can be accessed via a web page such as, e.g., Screen 1301.

In one implementation, External User 112 is able to see the whereabouts of Session Area 190 by using Video Camera 105 that is connected to Server 100 via Link 148 and is able to see and connect to other users who are located there. In one implementation the position of User Equipment 160, 165 and the position of Video Camera 105 is known by the system with accuracy by using, e.g., the technology described in patent application US 20100295943 A1 titled "Real-time RF-ID positioning system and method, repeater installation method therefor, position confirmation service system using the same".

The person skilled in the art will understand that this is just one of the many examples of possible positioning methods. Other methods or concepts can be utilized such as GPS, Chokepoint concepts, Grid concepts, Long Range Sensor concepts, Angle of Arrival concepts, Time of Arrival Concept, Received Signal Strength Indication concepts, Inertial Measurements concepts.

In one implementation, Video Camera 105's visual field is correlated and mapped against the position of the users who are within said visual field. The system can generate ID Icon 1005 and ID Icon 1004 that can be superimposed on top of Video Camera 105's video feed so that ID Icon 1005 and ID Icon 1004 can overlap with, e.g., the image of the users of User Equipment 160 and 165. In one implementation, the dimensions of said icons are proportional to the distance of the associated users from Video Camera 105.

In another implementation, users can simply be wearing an RF-ID bracelet within Session Area 190 so that ID Icon 1004 and ID Icon 1005 can be generated by the system and associated with profiles and datagrams stored on Server 100. This will be explained in more detail with reference to FIG. 10.

Digital information from and to User Equipment 160, 165, and 170 can be communicated via an Access Point/Base Station (AP/BS) 135 to Server 100 via Links 140, 141, 142, 143, 144 and Core Network/Internet Cloud 130. Links 143, 144, and 145 can be radio links or any physical means capable of transporting digital information, including cables.

Communications between User Equipment 160, 170, and 165 can occur via a core network infrastructure supporting any cellular standard. In some embodiments, the exchange of data may occur by means of non-cellular standards such as Wi-Fi or Bluetooth technology. For example, User equipment 160 and 165 could use an ad-hoc Wi-Fi connection and communicate directly without the support of any cellular network.

FIG. 1 represents just one of the many possible embodiments of the present invention. In fact, Session Area 190 and Notification Area 185 could overlap or be far away from each other so that a plurality of different access points or base stations (AP/BS) could be needed to serve User Equipment 170, 165, and 160 in different areas. Moreover, Session Area 190 and Notification Area 185 could be defined not only by means of geofencing but also by many other techniques, for example, the range of the radio communication link type employed by Access Point/Base Station (AP/BS) 135 or the range of an RF-ID reader or even physical walls or fences coupled with any system apt to detect the presence of a user within said walls or fences such as an RF-ID reader or an Indoor positioning system (IPS).

Furthermore, the radio link employed by Access Point/Base Station (AP/BS) 135 could be of many different types, e.g. Wi-Fi, GSM, WCDMA, LTE, CDMA, RF-ID, and Bluetooth, just to cite a few non-limiting examples. Location can be provided by many different techniques, for example, triangulation with different Access Points/Base Stations, cell ID, signal strength data mapping of various Access Point/Base Stations (e.g., Wi-Fi positioning).

Indoor positioning systems (IPS) are rapidly evolving. Instead of using satellites, an IPS may rely on nearby anchors that are nodes with a known position, which either actively locate tags or provide environmental context for devices to sense. The current localized nature of an IPS may involve different systems making use of various optical, radio, or even acoustic technologies.

An example of Bluetooth mapping that can be used as an IPS is iBeacon. iBeacon is an indoor positioning system that Apple Inc. calls a new class of low-powered, low-cost transmitters that can notify nearby devices of their presence. The technology enables devices or other hardware to send push notifications to other devices in close proximity. The iBeacon works on Bluetooth Low Energy (BLE), also known as Bluetooth Smart, and the specifications can be accessed and retrieved at www.bluetooth.org.

In a possible implementation of iBeacon related to the present patent application, Session Area 190 could be an indoor space that is covered by the radio horizon of a single iBeacon transmitter or by a plurality of iBeacon transmitters. In one implementation, a single or a plurality of iBeacons (and the codes transmitted by said iBeacons) could be associated with Session Area 190 or to an event associated with Session Area 190. User A may be able to join a discrete event or a permanent arena if, e.g., his equipment can receive at least one of those codes.

In one implementation, iBeacon transmissions let a receiver perform two tasks: uniquely identify what iBeacon transmitters they are near and estimate the distance to them. If the user equipment is capable of receiving multiple iBeacon transmissions from multiple transmitters those readings can be used to provide the mapping of the active area and an indication of which equipment is nearby User A's equipment. Proximate equipment should estimate similar distances from the same iBeacons transmitters.

For the purposes of the present application, Session Area 190 should be interpreted broadly and consistently with the advances of technology in the area of locationing techniques. In one implementation, Session Area 190 may extend beyond the physical location of a building such as a bar or a mall, for which Location 180 could be a proxy. In another implementation, Location 180 can be centered on the instantaneous position of user equipment and be activated by said particular user equipment without any reference to a physical building or establishment.

In another implementation, Session Area 190 may be contained within the perimeter of a building and an indoor positioning system may define its boundaries. In another implementation, the boundaries of Session Area 190 can be defined by the physical walls of a room in a building coupled with a system to detect the presence of a particular user within those walls. An RF-ID system may provide both a presence detection function and an identity discovery function of a user within said walls.

In another embodiment, a facial recognition system coupled with a movement detection system may provide the identity of a user entering a particular room and the element of presence in said room. Said facial recognition system may generate an ID coupled with a user because of a comparison with data contained in a database storing facial features of possible users. Said facial recognition system may provide said ID to Server 100 to account for the presence of said user within the physical location area served by said facial recognition system.

In one implementation, Session Area 190 can be in at least two different statuses: active and passive. During an active status, mobile equipment positioned within notification or session zones and logged on Memory 102 of Server 100 as within Session Zone 190 may be able to show profiles or permit interaction with other users who also are within Session Area 190. Session Area 190 can also be "always on" meaning in a permanent active status (arena). Session areas may be subject to time windows wherein said time windows, (that might be recurring or a one-time occurrence i.e. discrete events), may regulate the enabling or disabling of certain functionalities.

In another implementation, certain thresholds pertaining to said session areas might regulate functionalities afforded to the user equipment. For example, only a set amount of users can be allowed by the system to become visible, e.g., the first one hundred users logging into Session Area 190. Users who are in excess may populate a waiting list.

Users' visibility may also be subject to timers or threshold rates. For example, the rate at which a user interacts with other users may influence visibility, prominence, or discoverability within Session Area 190 or notification Area 185. For example, users within Session Area 190 can be required to interact with at least a minimum number of other users within a certain period to remain visible.

In another implementation, an entity may regulate interactions or receive analytics of said interactions related to users in an active area or event that said entity has created or is controlling. Alternatively, said entity may receive analytics related to interactions in various active areas or events related to employees that are associated with said entity. For example, during a sales event, where networking is a critical goal, said entity may want to monitor the level of interactions of its salespeople and reward the most active.

In certain embodiments, gamification can be employed. Gamification techniques strive to leverage people's natural desires for competition, achievement, status, self-expression, altruism, and closure. A core gamification strategy is rewarding players who accomplish desired tasks. Types of rewards include points, achievement badges or levels, the filling of a progress bar, and providing the user with virtual currency. Interaction levels among users in a common active area may be stimulated and enhanced via gamification by said entity. A "gamification" sub-algorithm can be embedded into memory 102 so that users with the highest rate of interaction could be rewarded for their activities. For example, hierarchical user statuses can be achieved according to activities and interactions.

In another implementation, the rate of interaction with other users within the session area may affect their discoverability. Said impact may be positive or negative according to the possible settings of the server provider. User's visibility can be inhibited or diminished by said system's settings. Diminished visibility may correspond, e.g., to the dropping of a user's profile toward the bottom of a list of users such as the one described in FIG. 3 in Screen 300.

In one implementation, users can also be subject to timers so that, if they do not accomplish some task that is regulated by the system within a time threshold, their visibility or other functions can be inhibited or limited. The system may act in various ways and, for example, instead of "punishing" users for their inactivity it may promote the visibility of users with the least amount of interactions or activity.

In another implementation, a user can be afforded only a restricted number of possibilities for interactions with other users. For example, a user in Session Area 190 may only be able to send a number N of requests for interactions during an active session time window. This can be done to avoid the tragedy of the commons problem and regulate the quality of the interactions.

In another implementation, an algorithm running on server 100 may regulate the rate at which a certain user within Session Area 190 is asked to interact. For example, if the system notices that a certain User A is asked to interact above a certain threshold within a certain time window it may prevent User A to receive mass notifications and send a message back to the requester of the interaction that a certain threshold has been reached. The algorithm may also space interaction requests in time or rearrange interaction requests according to certain priorities and criteria such as premium subscription, time spent within the session area, recurrence within the session area, or usage of the application, just to cite a few examples.

Figure 2:
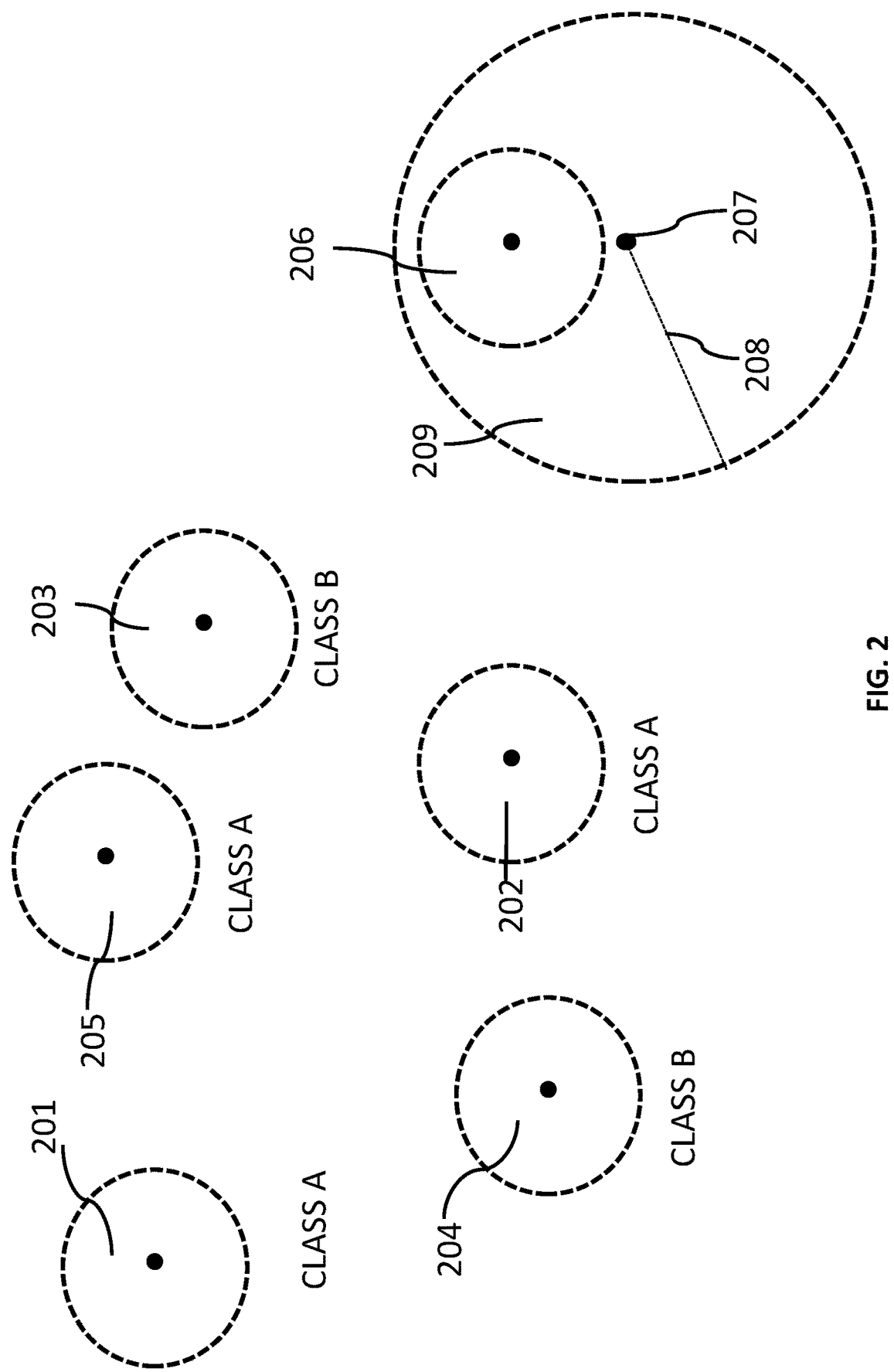
FIG. 2 represents an embodiment of classes of session zones and an example of a hierarchical regulatory approach between different classes of users who may create active areas.

FIG. 2 represents examples of session areas, such as Session Area 190, or notification areas, such as Notification Area 185, having different properties and functionalities. Said properties and functionalities can be used to classify said areas. For example, Class A session areas such as Area 201, Area 202, and Area 205 can be areas centered on public places such as restaurants and bars dedicated to affluent professionals and having a high price range for their food and services. Class A session areas can be used for networking activities. Class B areas such as Area 203 and Area 204 can be areas centered on public places such as restaurants and bars dedicated to a younger and more informal clientele and having a more affordable price range for food or services. Class B session areas can be used, e.g., for dating and activities that are more informal.

In one implementation, if a system of classes for session areas is implemented, and session areas are classified according to certain parameters that are known to users, users can choose which session areas to attend and where to become visible automatically without manually interacting with the system. They can do so by choosing a class of session areas or, alternatively, by handpicking certain session areas that they feel comfortable with or they deem useful or safe.

Certain session areas can also be associated with LinkedIn groups or other social media group members such as Facebook groups.

The person skilled in the art will understand that the possibilities are extremely numerous. For example, in a dating service scenario, session areas can be classified according to classes of users using biographical data of target users. Session area classes can be dedicated to users who are within a certain age bracket or to users who have been divorced or users with children. Individual users, a service provider, or both, may control, at least partially, properties and functionalities assigned to session areas.

Session areas that are hosting recurring events can be dedicated to a certain kind of professional categories and can be classified accordingly. Session area classifications can be extremely various. Classifications may pertain to functions to which session areas or events are dedicated. A one-time event or a recurring event can be particular time windows served by a particular session area for fulfilling a predetermined function, e.g. networking. As a matter of example, certain session areas can be classified as "professional networking", others as "dating", and others as "job hunting", and others as "sales according to the principal-agent location-based method". The person skilled in the art will understand that a functional classification system may grow in time, as new functions will emerge according to the evolution of business practices and societal customs.

An example of functionality that in certain implementations a user can control is privacy. A user may decide in which session areas he wants to become visible 1) automatically, 2) manually, 3) upon a request from the system, 4) according to certain settings, or 5) never.

A user may elect to turn visible or invisible in certain session areas according to certain parameters and thresholds. For example, the contemporaneous presence of another predetermined user in a session zone may influence visibility settings. A threshold concentration of a particular profile attribute may influence visibility settings. A sudden concentration of doctors in a session area may cause a user's profile belonging to a user within a session area to become visible.

In another implementation, session areas can be dedicated to a particular specific profile's trait. For example, certain session areas can be dedicated to a specific professional figure such as doctors, and those session areas can be used for various activities such as networking, dating, sales, recruiting, demonstrations et cetera. Profiles may have time windows of visibility, e.g., a time during the day or a day during the week when a profile is set to be visible. Profiles may also have spatial windows of visibility, e.g., a profile may only be visible in geofences that are located in places that are at least a hundred miles from a reference point, for example, home.

In some implementations, users may belong to hierarchies such as e.g., basic users, premium users, and executive users. In certain scenarios, it might be useful to control the capability of lower-tier users to create session areas in certain locations. For example, during a big convention, it might be useful to prevent lower tier users to set up disruptive active session areas within a certain Radius 208 from Location 207 because the organizers of the big convention may want to regulate who is able to set up events within Area 209 during the time window in which the convention is active. In certain implementations, the organizers of the big convention may charge a user for the privilege of being able to set up Area 206 for a determined time window. In certain implementations, Area 206 may be used to collect analytics and data of users who have joined or have entered Area 206 during the big convention.

In certain implementations, Area 209 is a permanently active area (arena) that is centered, e.g., on a company building and is controlled, e.g., by a company (example of an executive user). The capability of creating events within said arena could be managed, regulated, and controlled by said executive user to prevent misuse of resources and to further the company's goals. In certain implementations, Area 209 can be reused (in silos) by multiple executive users that are co-located in the same building. In some implementations, classes of users will be able to discover and access only those active areas within Area 209 that they are entitled or permitted to discover. For example, employees of executive user A may be able to discover only those active areas that have been created by user A.

In certain implementations, the system may prevent the creation of too many temporary active areas in or around the same location. If e.g., a premium user has created a temporary active area, the system may prevent a basic user to create another contemporaneous temporary active area within a certain distance. If too many active areas have been created in or around the same location, the system may prevent the creation of more active areas to prevent abuse or "tragedy of the commons" situations.

The person skilled in the art will understand that circular shapes in FIG. 2 are just simplifications and variously shaped areas can be created using different techniques, some of which are discussed in the present application.

In some implementations, a session area may be associated with a session area model-profile stored in Server 100. Said session area model-profile may consist of a profile that is representative of the user or users who are the target or a benchmark for a particular session area or event that is hosted within that session area.

A user profile, in one embodiment, is a collection of data, preferences, and settings defined by a common set of attributes describing characteristics or traits that will apply to a user, at least partially. For example, a user can be described in his profile by a set of attributes that could include Religion, Race, Age, Education, Citizenship, Title, Age, Industry, Profession, Sexual Orientation, or Premium User.

A session area model-profile, in one implementation, is a set of possible attributes that may pertain to a user profile wherein said attributes have been assigned a specific value or descriptive term. A session area model-profile, in another implementation, is a subset of all the possible attributes that may pertain to a user wherein said attributes have been assigned a specific numerical value or a descriptive term, (e.g. Industry: Information Technology and Services). In one implementation, descriptive terms may be restricted to a finite number of options to be selected from by using, e.g., a drop-down menu.

In another implementation, the subset may even be one single attribute that has been assigned the desired value or descriptive term (e.g., Premium User). In one implementation, a "specific value" is a numeric attribute such as Age, Time Spent in the Session Area, Salary, Credit Score, and Desired Age for a Possible Date or else. In one implementation, a "descriptive term" is a descriptive attribute such as "Gender" or "Occupation".

For the purposes of this application, unless otherwise specified, a numerical value or descriptive term pertaining to an attribute in a user profile datagram or pertaining to an attribute in a session area model-profile datagram can be simply referred to as the "value" of said attribute independently from its class (descriptive or quantitative).

In one implementation, certain attributes pertaining to a session area model-profile can be critical attributes. For example, if critical attributes that have been assigned values in the session area model-profile are not met by values in a matching set of attributes in the profile of a user, the resulting correlation output might be zero or a low value.

For example, a critical attribute could be a field that describes a premium user in the profile so that only premium users will have a correlation score or produce a correlation output different from zero. In another example, a critical attribute could be a code pertaining to an event so that only those users knowing the code and having input said code in the pertinent attribute field would be correlated. In some implementations, the code can be unique to the user. In other implementations, the code can be unique to the event or the session area. In certain implementations, only users who know a unique code will be able to discover the event or the session area or join it.

In one implementation, not all the attributes in a user profile might be under the complete control of the user. Certain attribute values or descriptive terms can be fixed or semi-fixed once a user inputs them for the first time, such as the date of birth. Other values for certain attributes can be derived independently by the system to avoid users manipulating their profiles in order to seek a higher correlation output with certain session area model-profiles or event model-profiles. In another implementation, a certain attribute value can be the result of interactions with other users. For example, the sum of positive feedback and negative feedback from other users might generate an attribute value that can be used to correlate a user profile with a session area model-profile or event model-profile.

A session area model-profile, in one implementation, can be the target or reference profile that a particular session area or event hosted by said session area is trying to attract or promote, or benchmark. For example, an event can be targeting doctors, who are 30 years old and single. Profiles of users who are within the session area can be ranked according to their degree of proximity to said session area model-profile.

An event or a session area may have more than one session area model-profiles, e.g., one for males and one for females if, for example, an event is a dating event hosted by companies such as Match.Com, eHarmony, Zoosk, OurTime, or the like. In one implementation, not all the attribute values or descriptive terms of the session area model-profile are made public by the service providers.

In one embodiment, an attribute is an element of data that, when defined, describes one aspect of a user. Said attributes may be contained in a datagram stored, for example, on Memory 102 of Server 100. Attributes of a user can be used by the system to establish a degree of correlation score (or correlation output) between a particular session area model-profile and a profile of a user who, for example, is located within that session area. In another embodiment, said degree of correlation can be calculated for users who are outside said session area. A high value of correlation output could give a remote user such as External User 112 some privileges and functionalities associated with said session area as the privileges and functionalities described with reference to FIG. 10. For the purpose of this application, "degree of correlation" and "correlation output" can be used interchangeably.

In one embodiment, the degree of correlation between two items can be measured by a correlation algorithm that assigns a numeric value to each of the similarities found between said items' correlation attributes. Said algorithm can use weights such as numeric values that are used to modify a degree of correlation score between said session area model-profile and said user profile. By using weights, certain attributes of a user profile may have more sway in determining the overall correlation score with a particular session area model-profile. For example, if Age is a critical attribute, Age can be associated with a higher weight attribute, e.g., a value between one and two. If Age is not a critical attribute, it may be associated with a lower value, e.g., between zero and one. If Age is a neutral attribute it may be associated with a weight attribute equal to one. Said algorithm stored, for example on Memory 102 of Server 100 may rank users' profiles according to their degree of proximity or distance from said session area model-profile.

In one implementation, said ranking based on degrees of distance from said session area model-profile can be used to affect users' visibility. For example, with reference to FIG. 3, Users 301, 302, 303, 304, 305, 306 can be listed and ranked according to said degree of correlation score. Users at the top of the list, such as User 301, may have a profile that is more correlated with the session area model-profile while users who are at the bottom, such as User 306, may have a profile that is less correlated with said session area model-profile.

In this application, the term "visibility" shall mean the degree of prominence of a particular user profile or session area in comparison to other users' profiles or other session areas generated by the system while the term "discoverability" shall mean a discrete status afforded to a particular user profile or a session area. In one implementation, a user associated with a user profile or an area associated with a session area model-profile are either discoverable or they are not discoverable. If they are not discoverable, their visibility is zero. If they are discoverable, their visibility may vary according to various degrees. For example, users or areas could top a list or could be at the center of a graphical representation if their visibility is high.

In one implementation, the degree of correlation between a session area model-profile and the profile of users can be used to allow discoverability or regulate the visibility of certain session areas that have been assigned, (either temporarily or periodically in conjunction with an event or permanently), a session area model-profile. For example, with reference to FIG. 2, only those users whose profile produces a minimum preset degree of correlation output with the session area model-profile assigned to Area 203 will be able to discover said area. In a dating scenario, certain areas might be discoverable only by users whose profile fits certain criteria, e.g., one attribute value in the event model-profile is set to "previously divorced" or "never previously married". Only those users whose profile fits that attribute will be able to discover and join the area associated with said event model-profile for interactions with other users.

In another implementation, an algorithm stored in Memory 102 may permit the discoverability of a profile only if the attributes associated with said profile are within a predetermined proximity range to said session area model-profile. For example, those profiles whose attribute Age is more than five years apart from a reference value contained in said session area model-profile may result in being hidden or not allowed to become active within the session area.

In certain implementations, the system may allow only users having profiles that are within predetermined boundaries of said session area model-profile, at least for some critical attributes, to become active in said area, discover said area, or perform certain functions within said area.

In one implementation, an algorithm may regulate certain functionalities or privileges afforded to users within the session area according to said degree of correlation score with the session area model-profile. It can do so hierarchically by comparing profiles of users associated with said area while providing the limited functional resources that are associated with the area only to profiles belonging to a top tier.

In one exemplary situation, the system may compare the credit score associated with a certain user with a "session area model credit score attribute". The system may allow the discoverability of the area only to users with a credit score above (or below) said model attribute. The system may also allow the possibility of performing certain functions associated with that area based on credit score. For example, in the case of a principal-agent transaction, only users with a certain credit score might be able to discover agents or areas associated with agents or close business transactions within those areas.

The person skilled in the art will understand that what in this application has been often labeled as "session area model-profile" is not intended to be limited to a permanent profile associated with a location but rather multiple session area model-profiles can be created, even temporarily. For example, multiple session area model-profiles can be created and they can coexist within the same session area. For example, male profiles can be correlated against session area model-profile "ONE" and females can be correlated against session area model-profile "TWO". In one implementation, multiple session area model-profiles coexisting in time and space within a session area can be linked together to allow users whose profile correlates with at least one of those session area model-profiles to interact.

eHarmony, e.g., is an online dating website designed specifically to match single men and women with each other for long-term relationships. In one exemplary implementation (based, e.g., on a dating algorithm such as the eHarmony algorithm), arenas or events could be created in public places using the session area model-profiles concept. The eHarmony algorithm is based on the segmentation of their clientele according to six parameters: 1) level of agreeableness; 2) preference for closeness with a partner; 3) degree of sexual and romantic passion; 4) level of extroversion and openness to new experience; 5) how important spirituality is; and 6) how optimistic and happy each one is. According to eHarmony the more similarity that two people score in these factors the better their chances to be "soul mates."

In one possible implementation, a dating service such as eHarmony may segment its clientele according to the above parameters and create arenas characterized by session areas model profiles that are visible and/or accessible only to users whose profile is within certain parameters from a model profile that is representative of one segment of the dating clientele.

In one implementation that is based on eHarmony's understanding of couples compatibility, the system may aim at attracting to an active session area users exhibiting a similarity of parameters. In other algorithms, the system may aim at attracting to an active session area users exhibiting traits that are different but compatible. Many variations are possible in the dating scenario all having the same purpose: the concentration of users with a high chance of being "soul mates" within the same active session area.

The person skilled in the art will recognize that the dating scenario is just one example and that variations to the inventive concept are possible for different fields. Visibility (of arenas and users) and discoverability (of arenas and users) can be used to fine-tune or promote the concentration of users who may have a vested interest in interacting within the same active session areas.

In one possible implementation, there could be a waiting list system implemented wherein only a certain predetermined number of active users could be allowed to become active. The system may give priority to those users whose user profile fits the session area model-profile most closely.

In another implementation, the system may operate according to a best-effort scenario and allow visibility or discoverability of an area or an event to a predefined number of users wherein those users are the ones who fit the session area model-profile most closely based on their real-time location or other reference location.

In another implementation, the system may correlate profiles of users who are logged into a session area among each other using said attributes and may generate a correlation score representative of the correlation of one profile against the other. In a visual or graphical representation of said users, similar users may appear proximate to each other, and navigation between profiles can be more efficient.

There are numerous patents and applications describing correlations and visual representations of objects and attributes of those objects such as U.S. Pat. Nos. 7,689,525, 8,296,667, 5,986,673, 6,801,229, 6,486,898, 7,120,646, 7,343,365, US 20070214179-A1, US 20070234234-A1, 20080163118-A1, U.S. Pat. No. 7,792,868 and US 2010038279-A1. They are all incorporated by reference in their entirety.

Figure 3:
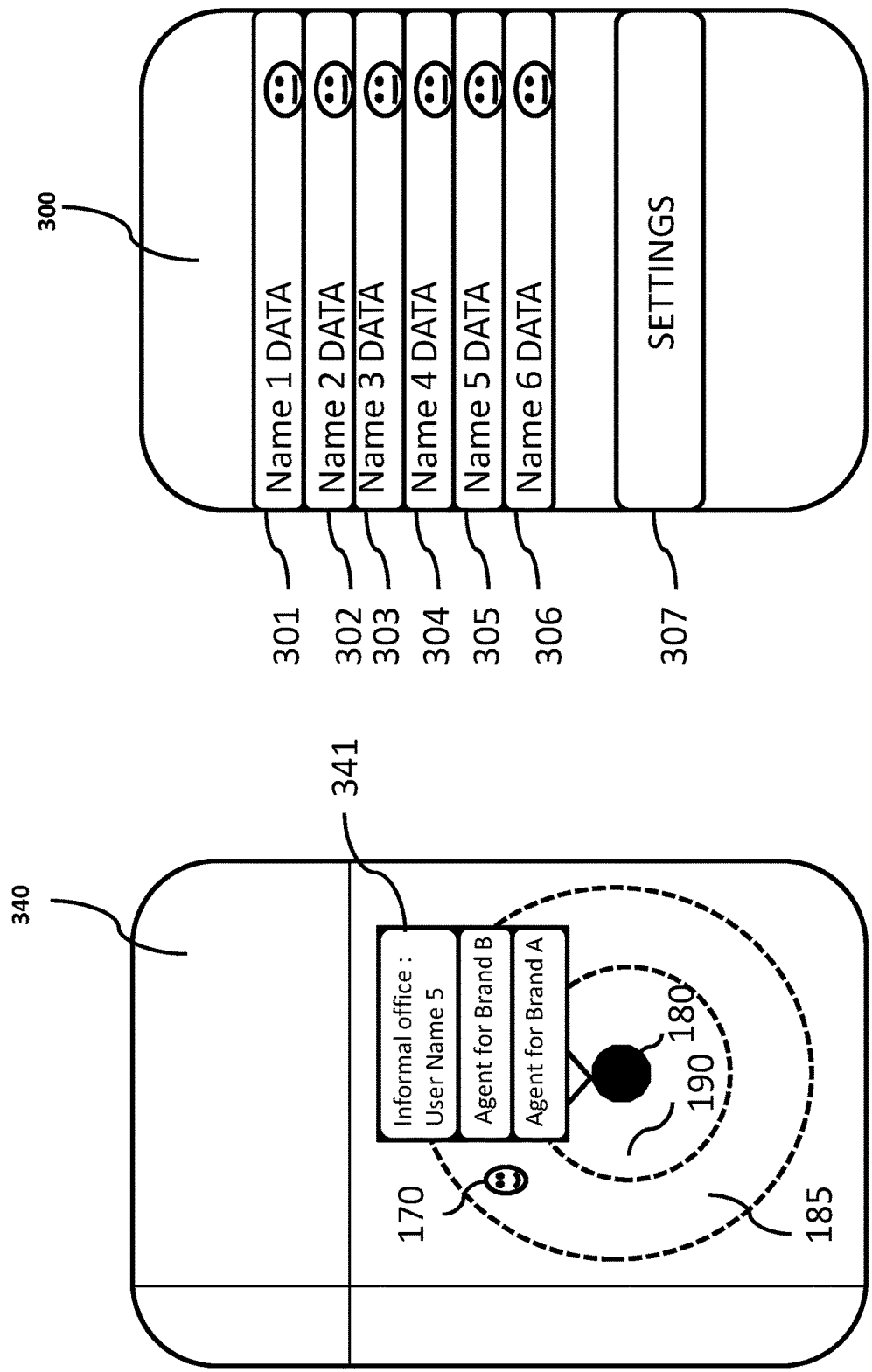
FIG. 3 represents two non-limiting examples of user equipment's screenshots or I/O User Interface status.

FIG. 3 represents two examples of user interface screens pertaining to User Equipment 170, 165, or 160. The person skilled in the art will recognize that, as technology advances, similar information can be conveyed by different means, e.g. via augmented reality equipment or it can be displayed on surfaces by a projector module or by using other technologies.

Screen 340 represents a map showing Location 180, the position of User Equipment 170, Session Area 190, and Notification Area 185. In one implementation, Label 341 may indicate that an agent for brand A is available at Location 180. In another implementation, Label 343 may indicate that user Name 5 is available for informal interactions pertinent to his professional practice, e.g., Family Law via his informal office that is set at Location 180. In certain implementations, said features, visibility, and notifications may be premium features paid for, e.g., agent for Brand A, or Brand A's owner, or user Name 5.

In one implementation, features and notifications may be dependent on analytics such as average usage of the mobile application by, e.g., user Name 5 or Agent for Brand A. In another implementation, said features and notifications may be dependent on analytics of permanence of Agent for Brand A or User Name 5 within Session Area 190. For example, if more than one agent is present in Session Zone 190, the one that would get priority visibility (or visibility at all) would be the one whose permanence's analytic indicate a stronger connection with Session Area 190 or Location 180.

Screen 300 of User Equipment 165 may represent a list showing visible users within an active session area that is centered on top of Location 180.

In one implementation the list of Users 301, 302, 303, 304, 305, 306 can be arranged according to analytics related to the usage of the mobile application: the users who use the mobile application the most will be on top of the list. In another implementation, the list can be arranged according to premium users. In another implementation, the list can be arranged according to permanence within Session Area 190, either during the active session or statistically over time. In another implementation, the list can be arranged according to distance from user of User Equipment 165 using, for example, the method that will be illustrated in FIG. 8. In another implementation, the list can be arranged according to positive feedback from other users who have interacted with them. In another implementation, the list can be arranged according to a correlation score between a session area model-profile and the profiles of active users. Users with a higher correlation score could be at the top of the list.

In another implementation, users would not be arranged according to a traditional list but rather graphically around a particular user on Screen 300 using, e.g., icons. In one implementation, the profile of said central user could be the one with the highest correlation with said session area model-profile. In another implementation, active users' icons can be arranged around a particular user icon that the user of User Equipment 165 has selected. Distances on Screen 300 between icons can be a representation of said correlation scores among profiles. The closer the two icons are and the higher the correlation between the profiles of the users they represent.

In a possible implementation, User A will be able to store into a web account (e.g., on a cloud service that is connected to a mobile application running on his User Equipment 160 or 165) electronic business cards related to other users who have been within Session Area 190 during an active event or were within Session Area 190 contemporaneously to User A. The electronic business cards can be automatically generated electronically by using selected fields of social media profiles such as LinkedIn, Facebook, or others. In one implementation, the system may allow electronic business cards to be stored only temporarily for a certain period. User A might have to validate the preservation of those business cards manually by selecting and parsing them from his web account.

In a possible implementation data pertinent to Users 301, 302, 303, 304, 305, 306 may display locations such as Location 180 that are statistically and analytically relevant to those users. For example, if User 301 is a regular in a particular location or has an informal office there, said location may appear as part of his profile. The person skilled in the art will understand that data, or profiles in general may be retrieved via a mobile application as depicted in FIG. 3 or via a web browser or other application execution environments such as HTML/JavaScript or Flash.

Figure 4:
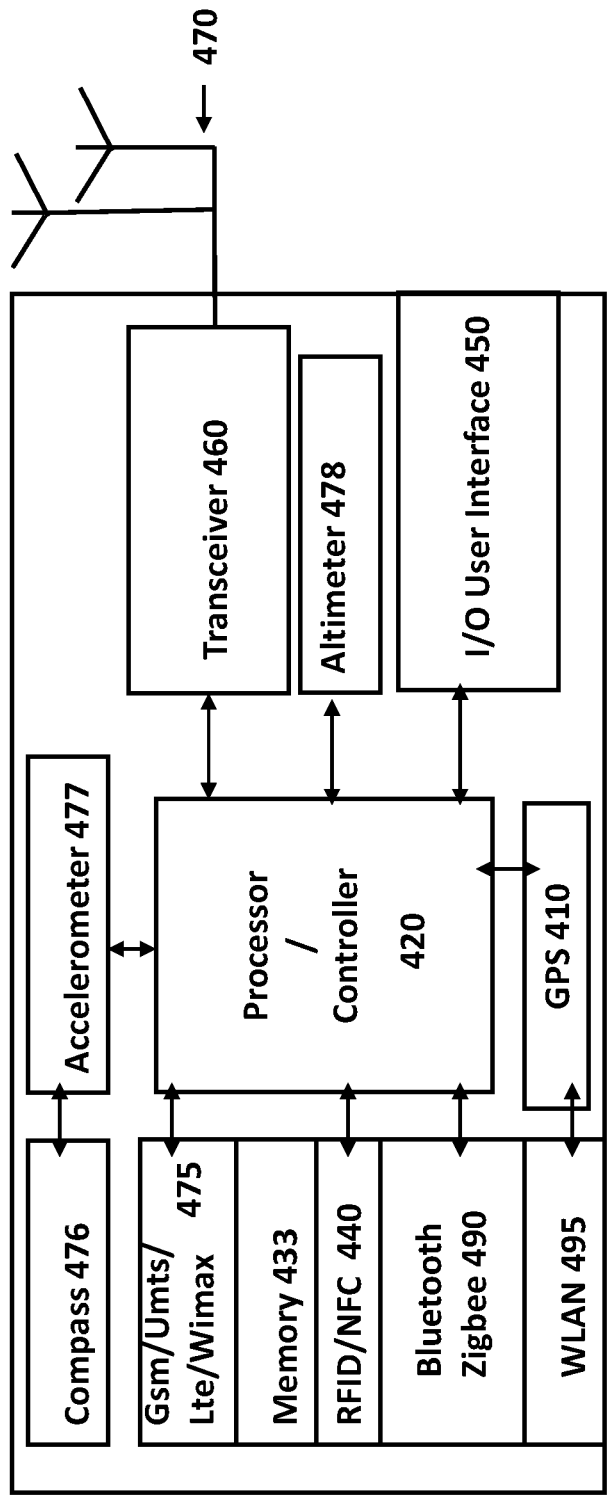
FIG. 4 represents a schematic representation of an embodiment of user equipment such as User Equipment 160, 165, or 170. In some implementations, it may also represent a schematic representation of an Administrator Equipment 110 or Fractional Administrator Equipment 111.

FIG. 4 provides a schematic example of a User Equipment 165 apparatus in accordance with an embodiment of the present invention. In a possible implementation, User Equipment 165 can be substantially similar to User Equipment 160 and User equipment 170, and the generic description of User Equipment 165 can be applied. In addition, Administrator Equipment 110 and Fractional Administrator Equipment 111 can also be mobile equipment and a similar description may apply.

As described above, the person skilled in the art will recognize that, by virtue of a possible log-in mechanism, users may use various equipment as long as said equipment is running a software application contained, e.g., in Memories 431, 432, and 433 and enabling the functionalities described in this application. In practice, the use of a login and a password to access and run a software application stored on equipment makes said equipment interchangeable. Also, as previously described, the system may not need any resident software on Memories 431, 432, and 433 but rather user equipment may work via a web browser or other application execution environments such as HTML/JavaScript or Flash.

User Equipment 165 is a general example of a mobile device that users can operate. It could be a traditional mobile phone, a personal digital assistant, a laptop computer, an e-book reader, an entertainment console or controller, wearable hardware such as augmented reality headsets, a tablet computer, or any other equivalent portable device that may be used to communicate with other mobile equipment or with Server 100.

User Equipment 165 includes at least one Processor/Controller 420 and at least a Memory 433 comprising computer program instructions. The at least one Processor/Controller 420 can be embodied by any computational or data processing device, such as a central processing unit (CPU) or application-specific integrated circuit (ASIC). The at least one Processor/Controller 420 can be implemented as one or a plurality of controllers.

Memory 433 may contain application software running on User Equipment 165. Memory 433 may also contain at least portions of datagrams that are most relevant to the location, period, and profile associated with said User Equipment 165 at a certain moment in time. Complete datagrams related to profiles, preferences, and settings could be stored on Memory 102 of Server 100. In one implementation, a user equipment can retrieve and store portions of said datagrams to expedite the system's performances according to various parameters such as location, time windows, user settings, and preferences. The at least one Memory 433 can be any suitable storage device, such as a non-transitory computer-readable medium. For example, a hard disk drive (HDD) or random access memory (RAM) can be used in the at least one Memory 433. The at least one Memory 433 can be on the same chip as the at least one Processor/Controller 420, or can be separate from the at least one Processor 420.

The computer program instructions may be any suitable form of computer program code. For example, the computer program instructions may be a compiled or interpreted computer program. The at least one Memory 433 and computer program instructions can be configured to, with the at least one Processor/Controller 420, to cause a hardware apparatus such as User Equipment 165 to perform any process described herein.

User Equipment 165 may include a Radio Frequency Identification (RFID) and/or a Near Field Communication (NFC) Module 440 with an antenna. The RFID/NFC Module 440 may operate using traditional RFID frequencies or NFC frequencies. In one implementation these RF-ID/NFC Modules 440 contained in User Equipment 165 may send a wireless digital identifier (ID) associated with a user to an RF-ID reader located on the premises of Location 180, a happy hours place, a restaurant, a business building or a private home, for example.

An algorithm located on Server 100 may automatically check-in User Equipment 165 that could be associated with said wireless digital identifier (ID). An algorithm residing on Server 100 can associate said wireless digital identifier (ID) to data structures residing on Server 100 containing profiles, attributes, settings, and preferences associated with said wireless digital identifier (ID).

A check-in made by means of an RF-ID reader can also be used in combination with Compass 476, Altimeter 478, and Accelerometer 477 to provide accurate tracking of the position of users via inertial measurements within enclosed premises where a GPS module or other locationing systems may not work or be sufficiently precise.

In one implementation, if the range of the RF-ID reader is short, e.g., two feet, the system may use the position of the RF-ID reader as the position at the time T of check-in. The system may also use Accelerometer 477 and Compass 476 to track and record any subsequent movement of User Equipment 165 for at least the duration of the active session.

A session area may have more than one RF-ID reader inside an event area so that the positions of users can be updated every time user equipment passes nearby one of these RF-ID readers. By comparing the estimated position with a map and by updating the position with numerous fixes via intelligently distributed RF-ID readers the system may maintain a precise position data of particular user equipment over time. In another implementation based on Bluetooth, a system like iBeacon, which has been described with reference with FIG. 1, can be used to provide a coarse positioning in the same way as described with reference to RF-ID technology.

A precise indoor positioning system and Compass 476 can be used to implement a function that can be desirable in crowded venues. For example, if a user requests a meeting with another user within Session Area 190 and said meeting request is accepted, it is desirable that I/O User Interface 450 produce an indication of where the other user is located. If the location of the two users is known with a good level of precision by the system or by a software module running on Memory 431, I/O User interface 450 may produce indicia such as an arrow pointing at the location of the user to be met and a distance value. Said functionality can be implemented at least in part by hardware components and software routines located either on User Equipment 165 or on Server 100.

Alternatively, the system might have predefined indoor or outdoor meeting locations memorized and stored either on Memory 102 or Memory 433. Users can be routed to those locations to meet for face-to-face gathering by said algorithm. User Equipment 165 may also include an I/O User Interface 450. I/O User Interface 450 may allow inputting of information and data via a touch screen or a QWERTY keyboard.

In one implementation, I/O User Interface 450 may also include a vibrating notification module, a speaker, a monitor, or any combination thereof. User Equipment 165 may include one or more Transceiver 460 configured to operate in conjunction with one or more Antenna 470 to communicate wirelessly. In one embodiment, the Antenna Unit 470 may support beamforming and/or multiple-input multiple-output (MIMO) operations. As those skilled in the art know, MIMO operations may provide spatial diversity, which is to overcome difficult channel conditions and/or increase channel throughput. The Antenna 470 may include antenna tuning and/or impedance matching components, RF power amplifiers, and/or low noise amplifiers. User Equipment 165 can be optimized to support multiple transceivers using multiple wireless standards.

In one example embodiment, User Equipment 165 may support simultaneous transmission of cellular (for example, GSM, UMTS, LTE, WiMAX) and non-cellular (for example, WLAN 495 or Bluetooth®/ZigBee 490) radio carriers. A Transmission Module GSM/UMTS/LTE/WiMAX 475 may allow User Equipment 165 to communicate with Server 100.

The locationing component of the invention can be advantageously implemented in many different ways. In one possible implementation, a GPS Module 410 may provide the location of User Equipment 165 to Server 100 via Link 141. When in closed environments, such as a shopping mall, the location data can be provided via different techniques. For example, choke points or grids, location indexing, and presence reporting for tagged objects such as RF-ID tags in user equipment such as User Equipment 165 or RF-ID bracelets, can be used to provide location data when indoor. Other examples of techniques used to provide location are the angle of arrival, time of arrival, and received signal strength indication. One aspect of the locationing component of the invention can be advantageously implemented by using a technique that will be described in FIG. 8.

The person skilled in the art will understand that not all the modules that are described are necessary to implement every embodiment but rather different embodiments can be implemented by using small subsets of the modules that have been described in FIG. 4. For example, certain embodiments of the invention can be implemented by using an RF-ID tag equipped bracelet.

Figure 5:
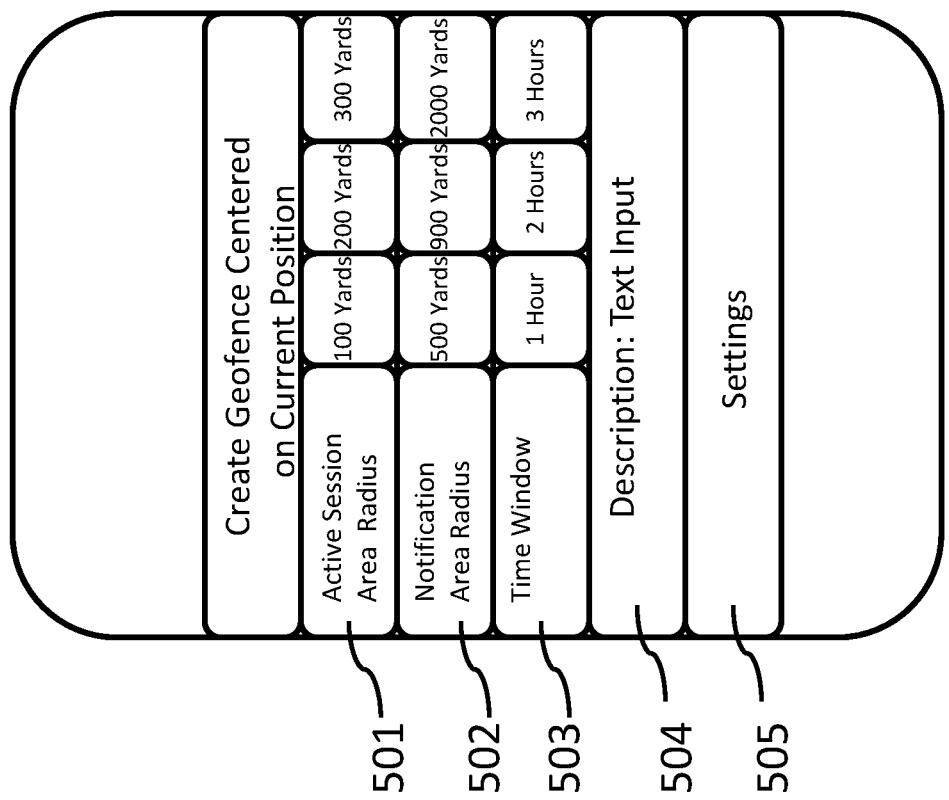
FIG. 5 is another non-limiting example of a user equipment's I/O User Interface status.

FIG. 5 describes one embodiment user interface screen that may pertain to User Equipment 160, 165, 170, and enables the implementation of a new functionality. In certain implementations, it could be advantageous to provide users with the possibility to quickly set up geofences wherever they are currently located and engage or notify other nearby users expeditiously.

Said functionality can be customized with predetermined parameters such as Active Session Area Radius 501, Notification Area Radius 502, and Time Window 503, i.e. the duration of the active session. In certain implementations, some or all of the above-mentioned settings can be predetermined to favor immediacy.

In one embodiment, geofences can be disconnected and independent from a physical location such as a building or a house but rather a geofence can be created in open spaces such as parks or parking lots for example. The field Event Description 504 can be used to input free text to describe details of the event or the purpose for the geofence.

Settings 505 can be used to create filters for the event such as the kind of users that will be notified in the notification zone such as, e.g., users belonging to a particular group in LinkedIn. In another implementation, Setting 505 can be used to regulate the visibility of the event. Certain events could be made discoverable and therefore accessible only to certain classes of users, or to predetermined users such as users belonging to particular groups in LinkedIn, or selected users via an invite.

The person skilled in the art will understand that the functionality described in FIG. 5 may allow many users to quickly create an active Session Area 190 wherever they are located. This may create a tragedy of the commons problem whenever many users are concentrated in the same area and want to create active session areas. In certain implementations, users are classified according to different tiers. Higher tier users may prevent lower tier users to create active session areas in or around the same location where they have created active session areas.

In other implementations, top tier users can permanently reserve location areas and prevent lower tier users to create active areas without permission within those location areas.

Figure 6:
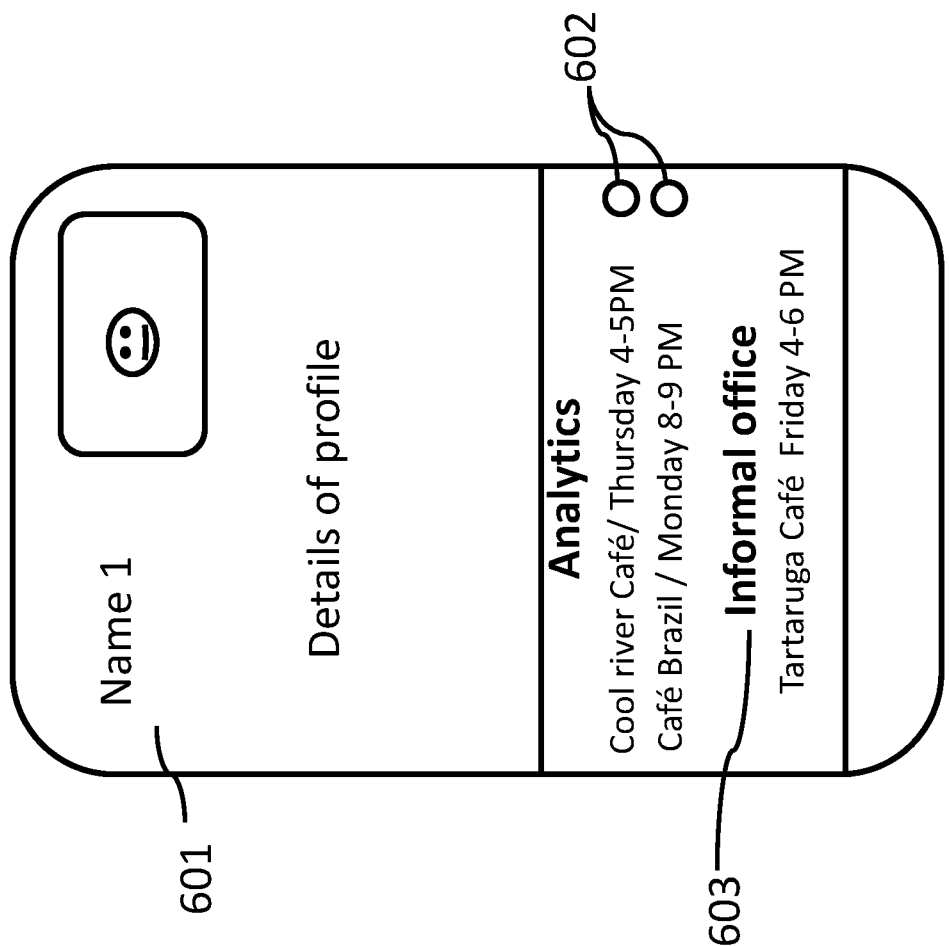
FIG. 6 is another non-limiting example of a user equipment's I/O User Interface status.

FIG. 6 describes one embodiment of a user interface screen that may pertain to User Equipment 160, 165, 170, and enables the implementation of new functionalities. Subscreen 601 may provide general details pertaining to User A. In certain instances, and subject to certain privacy settings, it could be beneficial for User A to allow User B to know places where he spends some of his time in public settings so that people who want to meet him or interact with him in the future may have an opportunity to do so. This information can be captured in Analytics Fields 602. In one implementation, it is a product of analytics that are made available by the system within the privacy settings imposed by User A.

In a certain implementation, a profile can also show a preset place that User A might have elected as his informal office via an Informal Office Field 603. The informal office can be an extension of formal business premises into public places, such as a happy hour place, that certain users may employ to attract new prospective clients. User A may pledge to be in his own informal office during the time window he indicates or whenever User A feels like turning on the notification that he is now in his 'informal office" and he is available for informal interactions pertaining to his profession. Server 100 may have stored in Memory 102 a list of informal offices that are associated with certain professional categories of users.

The person skilled in the art will understand that the same information and functionalities described with reference to FIG. 6 can be represented via a web browser or a flash application, in either a mobile or a fixed computer.

Figure 7:
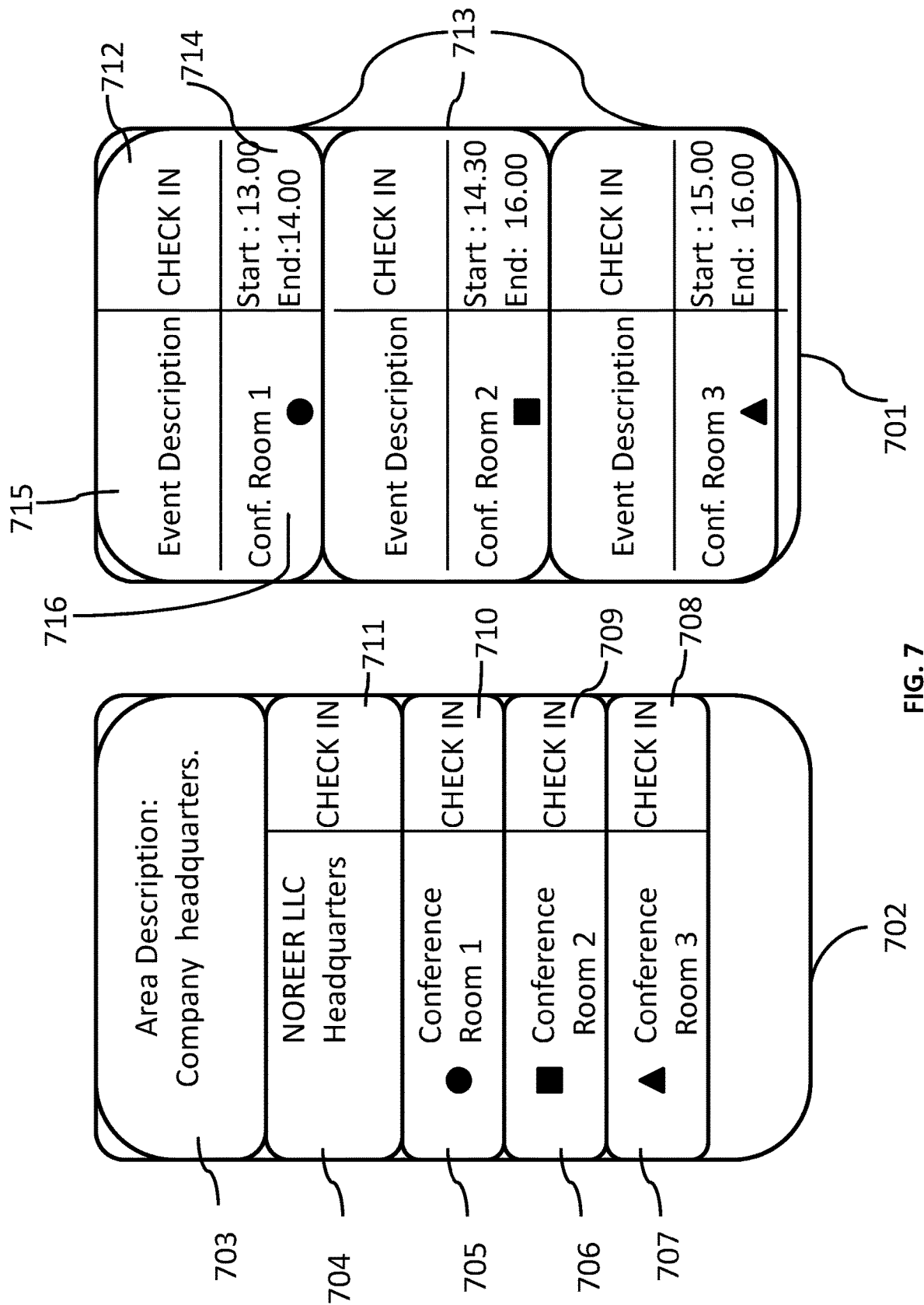
FIG. 7 is another non-limiting example of user equipment's I/O User Interface statuses.

FIG. 7 describes embodiments for a user interface screen that may pertain, e.g., to User Equipment 160, 165, 170. Sometimes an indoor positioning system might be unavailable or it might be convenient to join a subset of active users within a session area manually. The person skilled in the art will understand that the example of a touch screen is just explanatory. The same concepts can be reused across different user interfaces that are currently available or that will be available in the future such as virtual reality displays.

In one implementation, Session Area 190 may cover a whole business building or a convention center without any reference to subareas within said Session Area 190. Subareas might consist of predetermined conference rooms, floors, and locations that can be used to partition Session Area 190 and to group conveniently the users that are active and located within said subareas.

In one implementation, based on location and described with reference to Screen 702, the system may allow users within Session Area 190, e.g. a corporate building or a convention center, to check into the broad Session Area 190 by using a General Check-In 711.

Multipurpose Screen 703 may provide information related to the location by pressing any of Buttons 704, 705, 706, 707. In the case represented in FIG. 7, Multipurpose Screen 703 is showing information related to Button 704.

In one implementation, subareas (or physical locations) within Session Area 190 can be labeled with symbols or colors. In the example of FIG. 7, Conference Room 1 is represented by a circle and any user physically approaching said Conference Room 1 can be reminded to check-in into said subarea by means of a circle sign that can be located, e.g., at the entrance of said conference room. In the case of FIG. 7 said check-in may occur by means of Button 710. The person skilled in the art will understand that similar scenarios are possible for conference room 2 and conference room 3 by using Button 709 and 708.

In another implementation, based on time, and described with reference to Screen 701 the system may list Events Tiles 713 related to events that are occurring within Session Area 190. Said Event Tiles 713 can be organized according to Time Window Tile 714. Event Tiles 713 may also display Event Description 715 and Event Location 716. The checking-in can be permitted via check-in functionalities such as the one described in Button 712 if the actual time is comprised within the time window described in Time Window Tile 714.

Figure 8:
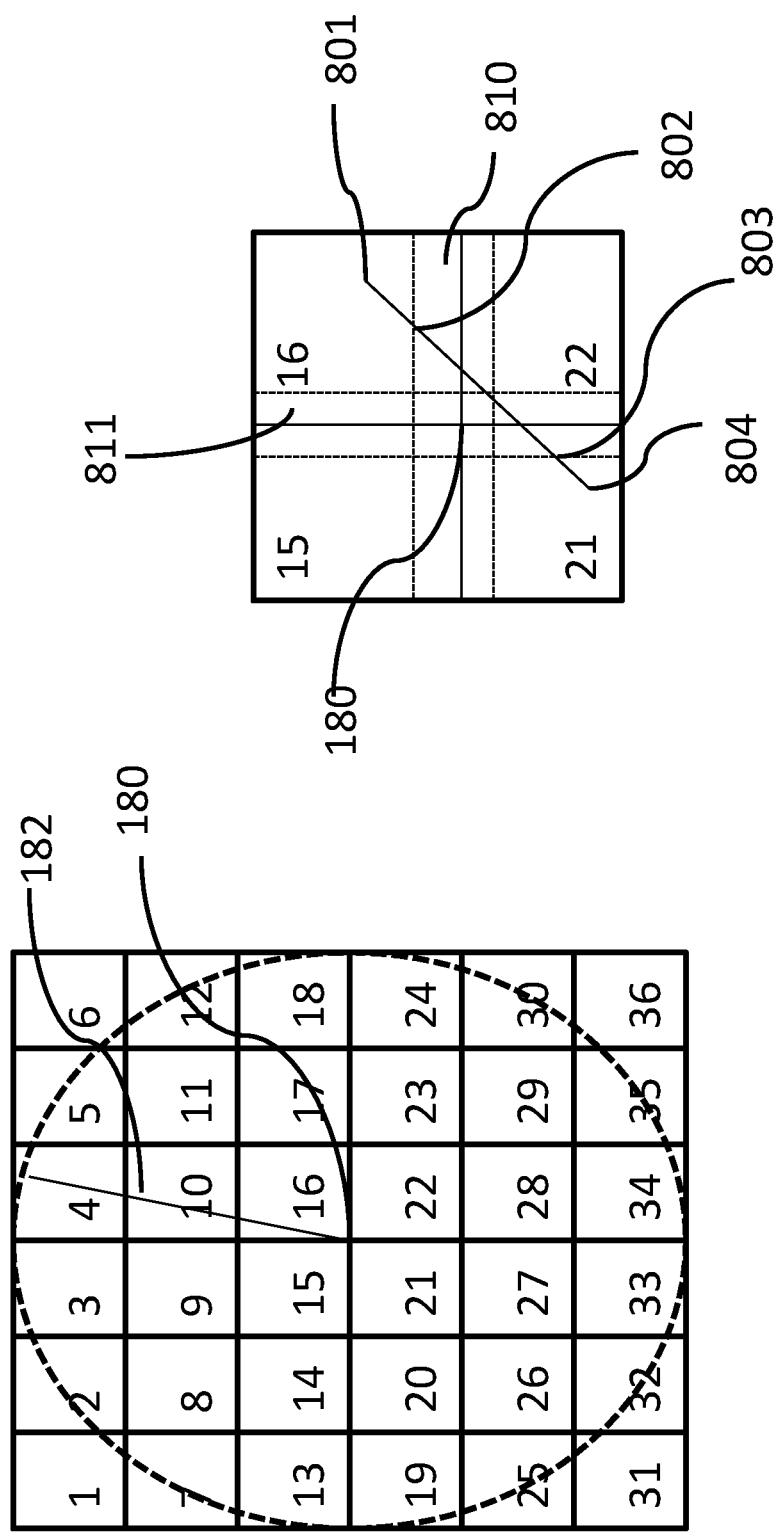
FIG. 8 is a non-limiting example of a Session Zone 190 partitioning method to provide additional and novel functionalities.

FIG. 8 describes a method to create and arrange a list of users as, e.g., the list described in FIG. 3 at Screen 300 according to proximity. This method may use, e.g., one of the locationing technologies that have been mentioned in the present application or the applications and patents that have been incorporated by reference. In one embodiment, Session Area 190, having Radius 182 and centered on Location 180, is subdivided into subareas having the shape of a square. Said subareas have been numbered consecutively from 1 to 36 for convenience. By subdividing a large session area into smaller subareas, the system may allow User A, who is e.g. located in subarea 16, to see other active users who are also located within subarea 16. The person skilled in the art will understand that the geometrical shape of the subareas may vary and that the example of squares is just one of many possible embodiments. Geometrical patterns may vary as many geometrical figures can be used. In one embodiment, patterns made of a combination of different figures can be used such as for example, hexagons and pentagons.

With reference now to FIG. 3, the list of Users 301, 302, 303, 304, 305, 306 may represent users who are positioned within the same subarea. Subareas may, as indoor locationing and geofencing technology advance, represent rooms or indoor physical perimeters.

In another implementation, list of Users 301, 302, 303, 304, 305, 306 may represent not only users who are positioned in subarea 16 but also users who are positioned in adjacent subareas, e.g., subareas 17, 11, 10, 9, 15, 21, 22, and 23 as depicted on the left side of FIG. 8.

In one implementation, the list may maintain certain users and drop others if a user moves, for example, from subarea 16 to subarea 21. This implementation avoids the complete refreshing of the list every time a user changes his position from a subarea to another. As a matter of example, in this implementation, if a user moves from subarea 16 to 21, the newly refreshed list of proximate users may comprise users who are positioned in subareas labeled 21, 22, 16, 15, 14, 20, 26, 27 and 28. In practice, every time a user is in one subarea the system may show not only the users who are within the same subarea but also the users who are in the adjacent subareas.

In another implementation, the list of nearby users can be organized so that it will show first users who are located within the same subarea and then users who are located in surrounding subareas.

In another implementation, the list may comprise not only users who are in the same subarea and users who are located within the first level of surrounding subareas but also users who are located in a second level or third level of surrounding subareas as concentric regions expand to cover the whole Session Area 190.

In another implementation, represented schematically on the right side of FIG. 8, the refreshing of the list of users who are positioned within the same subarea may happen according to a certain algorithm that may prevent the jittering of said list when a user is located in the proximity of a line that is demarcating two subareas. The system may employ, e.g., Hysteresis Bands 811 and 810 to dampen the jittering of the list of nearby users.

If a user moves from Point 801 to Point 804, the refreshing of the list may happen only when Point 803 is reached. If, on the contrary, a user moves from Point 804 to Point 801, the refreshing of the list may happen only when a user reaches Point 802 that is outside of the hysteresis guard bands. The person skilled in the art will understand that many modifications are possible to the usage and application of the concept of Hysteresis Bands 811 and 810.

In one implementation, subareas can be created by using iBeacon transmitters or RF-ID readers that are geometrically spaced so to create a pattern similar to the pattern described in FIG. 8. Readings of signal strength, e.g., from surrounding iBeacon stations may create artificial subareas that can be used to implement the concepts described above. For example, thirty-six iBeacon stations could be positioned in the center of each subarea to create a pattern that can be used to implement the embodiments described above.

Figure 9:
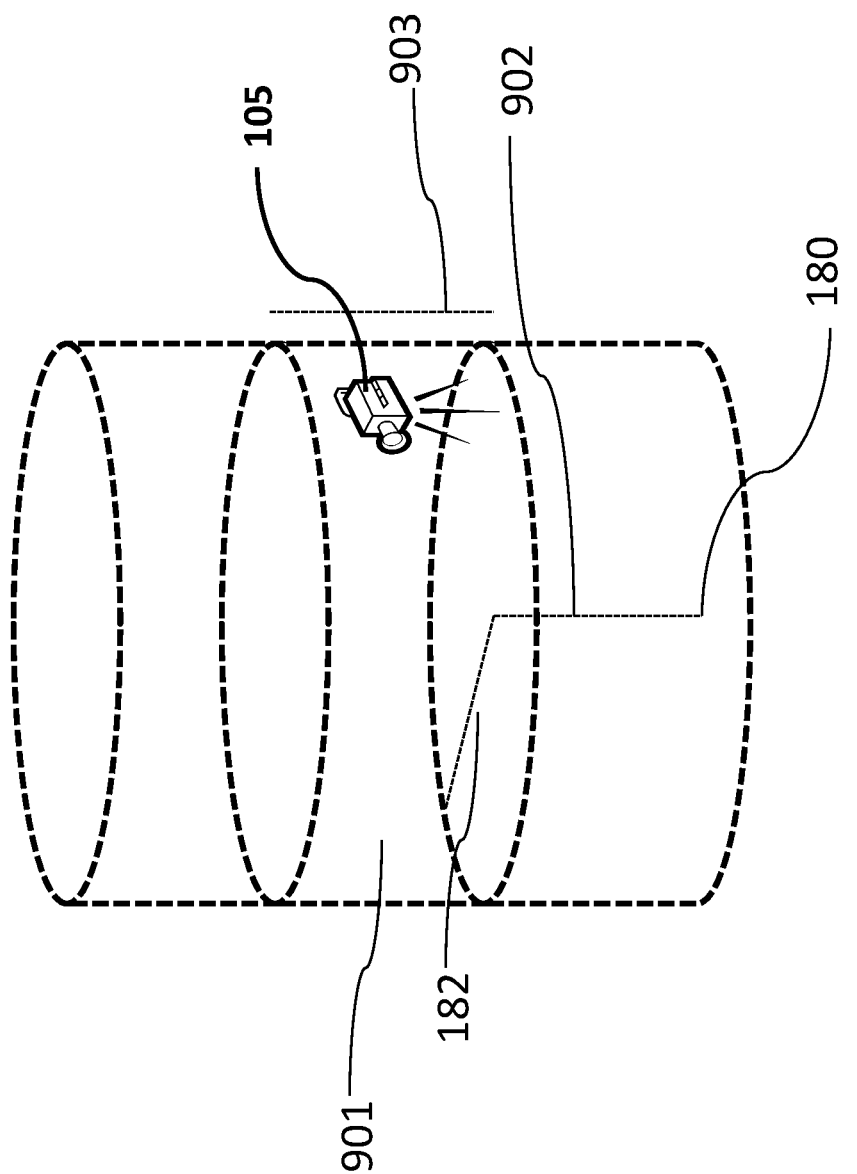
FIG. 9 is a non-limiting example of a three-dimensional "Geobox".

FIG. 9 illustrates the concept of geofencing applied to a three-dimensional shape.

An altimeter is an instrument that relies on atmospheric readings to determine altitude over mean sea level, known as MSL. This can be done generally in one of three ways: measuring local air pressure with a barometer, bouncing radio waves off a target, and calculating how quickly they are reflected or triangulating signals from three satellites using GPS. However, GPS triangulation can be difficult indoor or when all the satellites are close to the horizon.

At the time this application is written, altimeters such as, e.g., the Xtrinsic MPL3115A2 pressure sensor by a company named Freescale can provide a 30 cm resolution, which enables the user equipment to identify elevation at a granular level. User Equipment 165 equipped with an Altimeter 478 module could detect the exact floor a user is on within a high-rise building or a shopping mall, allowing location-based services to reflect immediate surroundings accurately.

Latitude and longitude values for Location 180 plus Radius 182 can define a circular and exemplary two-dimensional geofence such as Session Area 190. As the state of the art of digital altimeters progresses, the two dimensional Session Area 190 may become a three-dimensional figure such as Geobox 901 that can be represented not only by a latitude and a longitude value plus a radius but also by an Elevation 902 value and a Height 903 value. The person skilled in the art will understand that a plurality of Geoboxes 901 can be stacked one on top of the other and different Elevation Values 902 can be representative of different floors in a building.

In one implementation, multiple session areas can be active on the same or different floors of the same building. In another implementation, Geobox 901 can be three dimensional while being associated with a two-dimensional notification area. In another implementation, both the session area and the notification area can be three-dimensional. For example, a notification area may reach out to lower floors and attract users to an active session within Geobox 901. The person skilled in the art will understand that Geoboxes could map and cover different floors of a high-rise building and provide different active sessions and all the functionalities that have been described in this application. Geoboxes can also coexist in the same space and time window. In one implementation, a Video Camera 105 can be contained within Geo Box 901 for an External User 112 to interact with active users who are within the active session area.

In one implementation based on iBeacons, WiFi, or RF-ID readers the system may discern and ascertain the floor on which a user terminal is located by listening to those transmitters. In one embodiment, a stronger received signal from transmitters located on a certain floor will signal the system that the user equipment is located on that floor.

Figure 10:
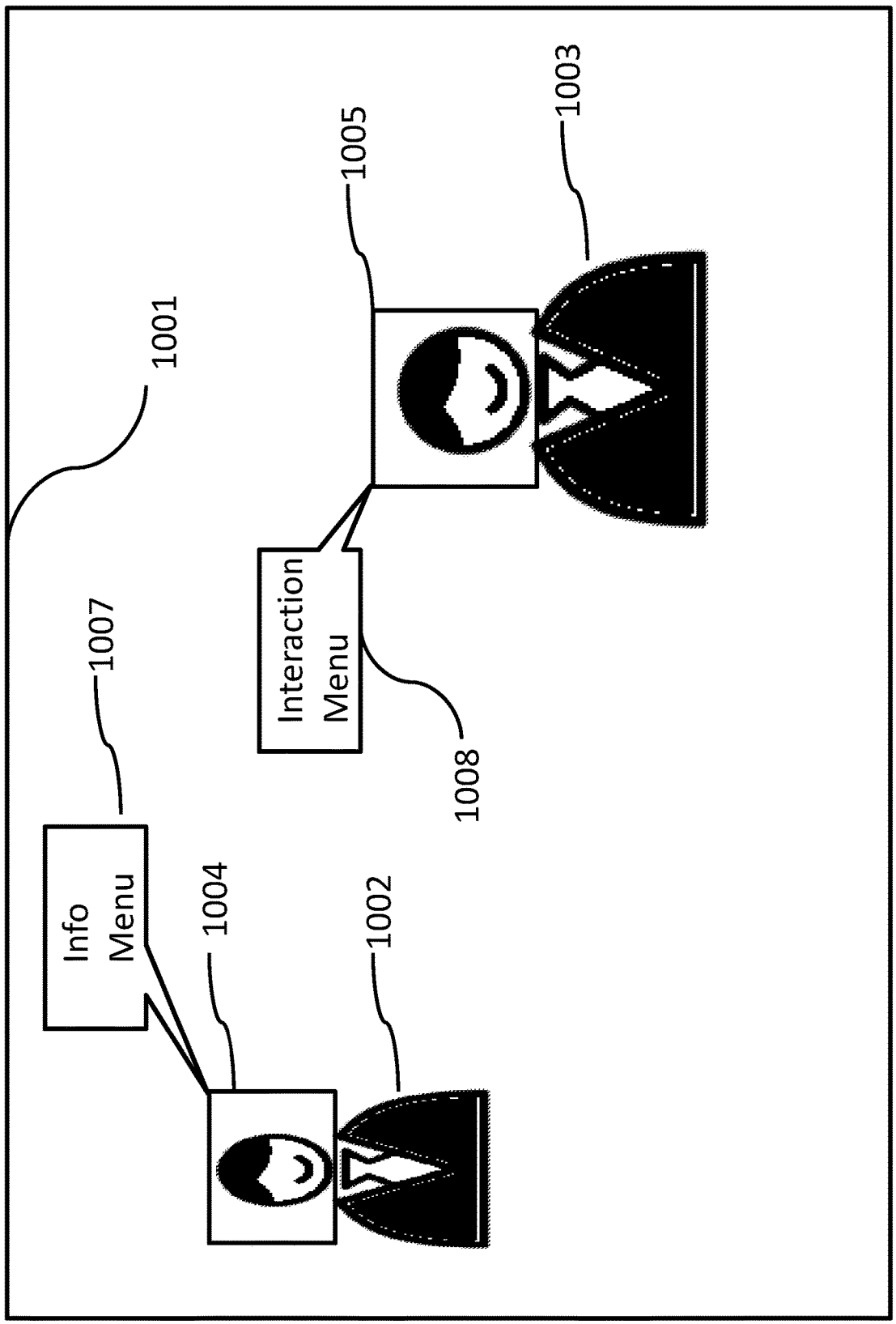
FIG. 10 represents a possible embodiment of one aspect of the invention pertaining to the correlation of visual indicia of users who are within a session area with those users' IDs and those users' profiles. Said correlation may allow novel and useful applications and functionalities.

FIG. 10 describes an embodiment that allows External User 112 to interact with users who are within a remote session area. As discussed with reference to FIG. 1, in one implementation, Visual Field 1001 of Video Camera 105 can be correlated and mapped against the position of the users who are within said Visual Field 1001. The system, e.g. by knowing the position of the active users, can generate ID Icon 1005 and ID Icon 1004 that can be superimposed on Video Camera 105's video feed so that ID Icon 1005 and ID Icon 1004 can overlap with, e.g., the moving images of the users of, e.g., User Equipment 160 and 165 within Visual Field 1001.

In one implementation, said ID Icon 1005 and ID Icon 1004 can be superimposed on top of the faces of active users by using face detection technology. This technology may use special algorithms to parse Visual Field 1001 looking for the shape of a human face. Face detection technology is described in several patents and applications such as U.S. Pat. No. 7,203,346 B2, U.S. Pat. No. 8,457,367 B1, US20080247611, US20100135541 A1, WO2010043771 A1, and WO2011042601 A1. The combination of face recognition with the location awareness of active users within the session area by the system makes it possible for the system to generate virtual icons that can be used to interact with those users via, for example, a touch screen.

In the example of FIG. 10, User 1002 is associated with ID Icon 1004 and User Equipment 165 while User 1003 is associated with ID Icon 1005 and User Equipment 160. Data associated with User equipment 165 and 160 is stored on Server 100. By acting upon ID Icon 1004, External User 112 can extract or store information related to User 1002 by means of Info Menu 1007.

In one implementation, since the system is storing user profiles, settings, and information related to User Equipment 160 and 165 on Server 100, external User 112 could interact with users within Session Area 190 by acting upon said ID icons. For example, External User 112 could express interest in meeting in the future with a particular user associated with User equipment 160. Alternatively, External User 112 can interact real-time with a particular user associated with User equipment 160 by pushing a message or a notification by means of Interaction Menu 1008.

One of the possible scenarios for this embodiment could be a dating scenario wherein External User 112 would be able to remotely access public places and observe or interact with prospective dates in a bar from his remote location. In another implementation, during a conference, External User 112 could be able to interact with selected members of a panel. The person skilled in the art will understand that the scenarios are very diverse and that users may adjust their privacy settings so that this functionality can be enabled or disabled.

In one implementation, User Equipment 165 and 160 may include an RF-ID tag while Video camera 105 may include an RF-ID interrogator so that the response from the RF-ID tag can be used by the system to generate said ID Icon 1005 and 1004. In this implementation, the direction of interrogation of the RF-ID interrogator and the time of arrival of the response received can be used to produce the above-mentioned correlation with Visual Field 1001. The dimensions of said ID Icon 1005 and ID Icon 1004 can be scaled according to the calculated distance from said Video Camera 105 to provide a three-dimensional perspective to External User 112.

Figure 11:
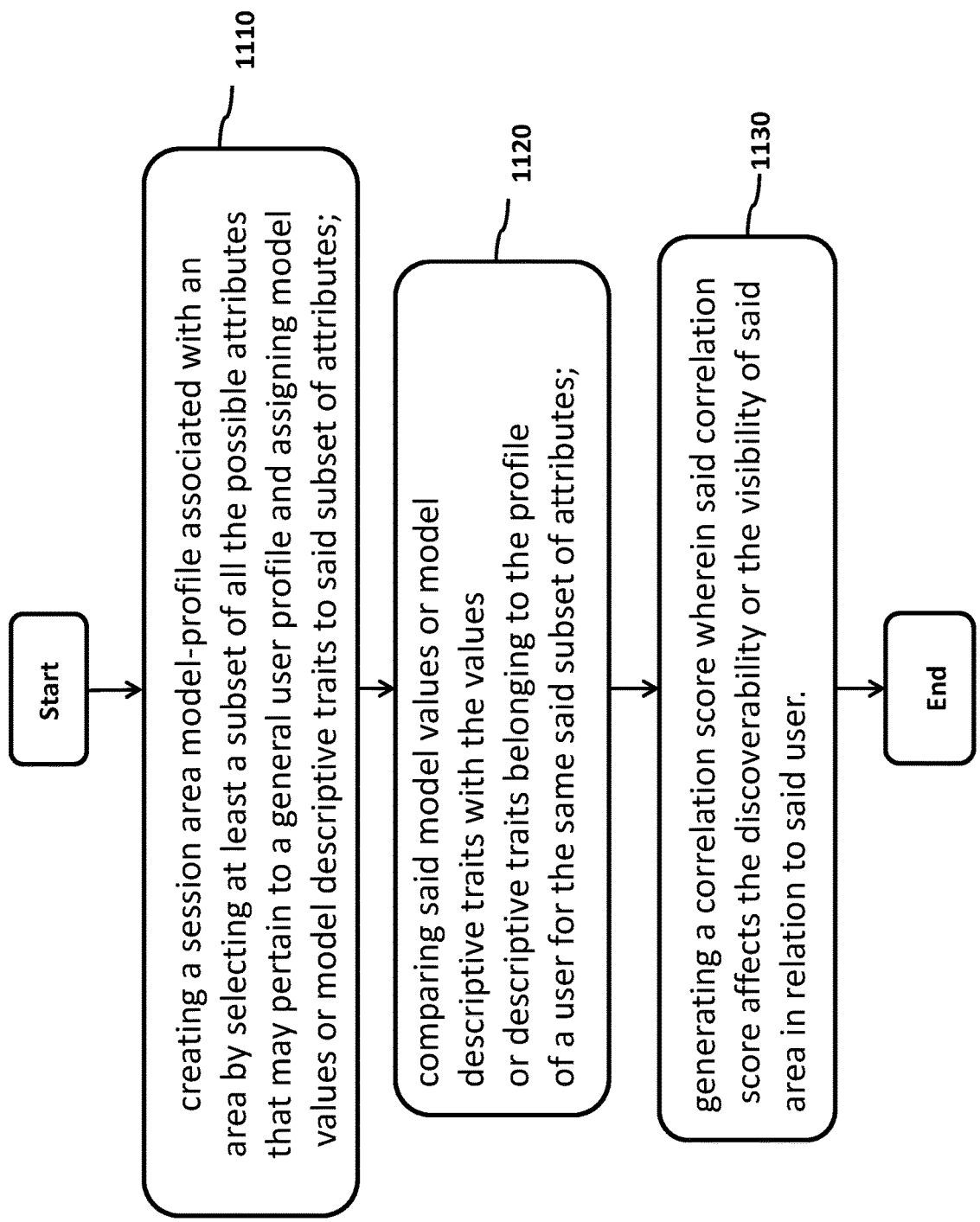
FIG. 11 represents a possible embodiment of a flow diagram illustrating a possible embodiment wherein a correlation output between a user profile and a session area model-profile associated with an area affects the discoverability of said area by said user.

FIG. 11 represents a flow chart illustrating a possible embodiment of a method for allowing selective discoverability and visibility of events and areas according to the degree of correlation between users' profiles and an area profile (i.e. "session area model-profile)." The person skilled in the art will understand that discoverability and visibility of session areas or events should be interpreted broadly. In one implementation, events and session areas can be discoverable or visible by not only using a dedicated mobile application but also by using a web browser in a fixed or mobile computer equipment.

A representative method embodiment of the present invention comprises 1) "creating a session area model-profile associated with an area by selecting at least a subset of all the possible attributes that may pertain to a general user profile and assigning model values or model descriptive traits to said subset of attributes", Step 1110; 2) "comparing said model values or model descriptive traits with the values or descriptive traits belonging to the profile of a user for the same said subset of attributes", Step 1120; and 3) "generating a correlation score wherein said correlation score affects the discoverability or the visibility of said area in relation to said user", Step 1130.

As discussed in previous sections, the term "session area model-profile" can often be used interchangeably with an "event model-profile". An "event" can be an occurrence, usually limited in time, anchored, at least provisionally, to a specific session area location. For the sake of simplicity and consistency, the term "session area model-profile" has often been used to represent both, the spatial dimension and the temporal dimension, since a session area model-profile can be characterized by a predefined temporal window of activity associated with an event.

The person skilled in the art will understand that the term "correlation", "correlation score" or "correlation output" should be interpreted broadly since the attributes forming a profile (either a user profile or an area model-profile) can belong to very diverse and non-homogenous classes. For example 1) To define "correlation" numerical values representing a continuum of possible data can be used. Those data can be compared to a numeric benchmark, e.g., Age. 2) A discrete data flag (e.g., a "yes" or "no" to a determined condition) can be used, e.g., Married. 3) A descriptive trait-like Profession="Doctor "can also be used. 4) A code that a user has inserted in a dedicated field can also be used.

A correlation output can be, in some instances, a weighted combination of different data pertaining to very different kinds or classes of attributes.

In one implementation, if an area has been dedicated to a certain LinkedIn group or other social groups, it can be discoverable only by members of that group. For the purpose of this application, both the discrete/descriptive data and the continuum data are examples of how to achieve or gauge "a correlation output."

In another embodiment, correlation scores, correlation thresholds, and correlation benchmarks may adjust according to how many users have a profile that reaches a minimum degree of correlation with said session area model-profile to produce the best effort result.

In one implementation, an algorithm may produce a "best-effort" group of users and generate a minimum or a predefined number of users whose profiles correlate the most with the desired user profile for an event or an area. Said desired profile can be represented by the session area model-profile. Said algorithm may 1) run a search among user profiles; 2) benchmark those user profiles against the desired session area model-profile; and 3) establish certain variance boundaries attributes to include a minimum number of prospective active users for the session area.

In one implementation, said algorithm might consider the location of the session area and adjust 1) either the radius of discoverability or 2) the variance boundaries around the session area model-profile or 3) do both.

A service operator can also implement said method manually. Said operator, by varying the variance boundaries, can generate the desired number of prospective active users for a session area associated with a desired "session area model profile."

Figure 12:
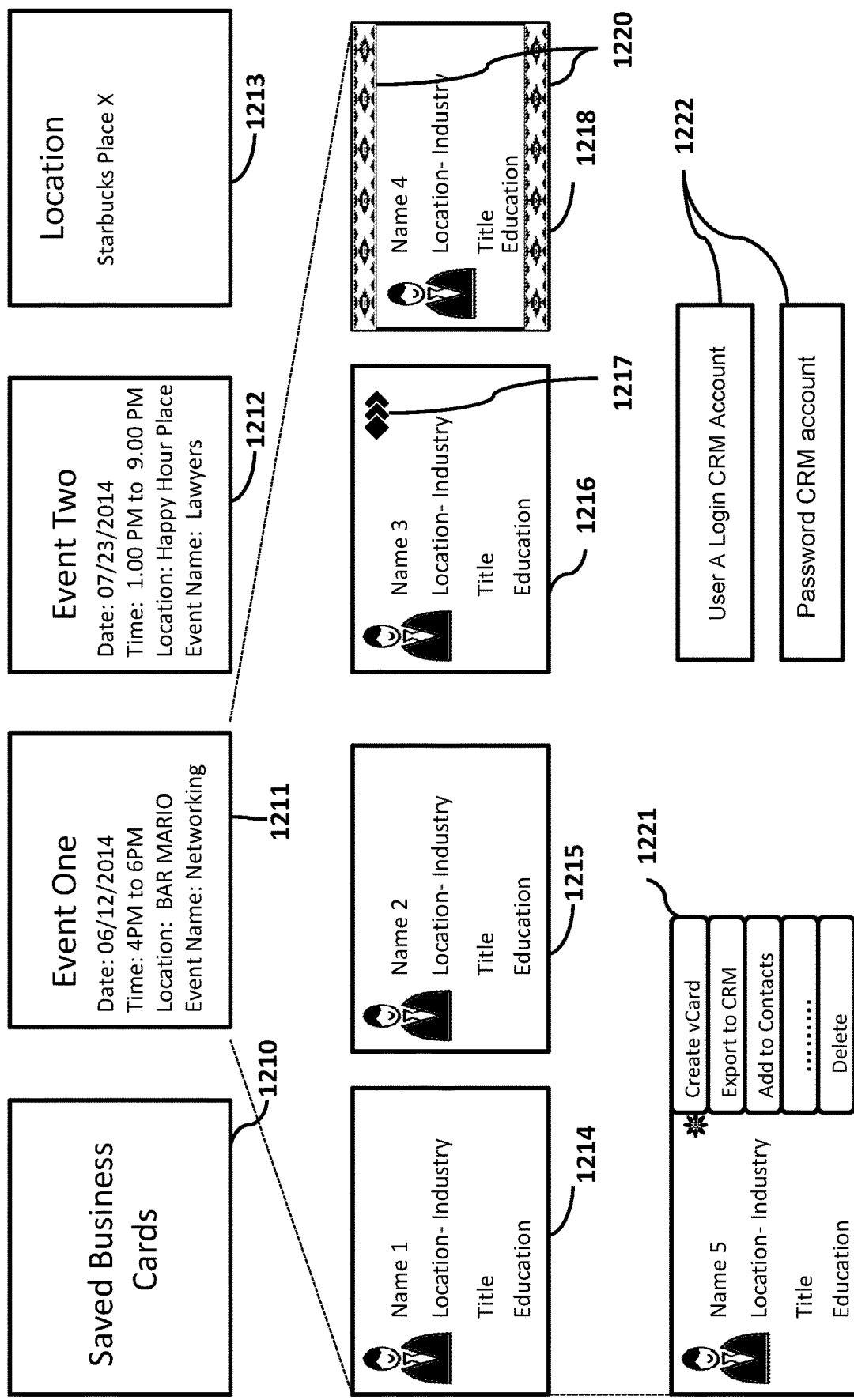
FIG. 12 represents a possible embodiment of a screen of a User A's apparatus wherein the information related to users who have participated in events or have joined certain active areas that are related to User A's activities can be collected, represented, and organized.

FIG. 12 represents a possible embodiment for the creation of business card folders and collections of electronic business cards that can be created and made available, e.g., to User A via a website and a web account. In one exemplary embodiment, User A would log into said web account and into a mobile application account using the same credentials, e.g. his LinkedIn account credentials.

In this implementation, the mobile equipment will permit certain functionalities that are tailored to the mobility aspect of the invention such as the capability of interacting with other users during a finite event or within a permanent arena. On the other hand, the account hosted on a website and linked to the same account of the mobile application may generally allow functionalities that are more tailored to the discovery of events, discovery of different taxonomies of users in time and space, or follow up of events that User A has participated or arenas that User A has visited. In some implementations said website account may permit the interaction (e.g., messaging) with users who did activate the enhanced visibility functionality that will be described in more detail with reference to FIG. 13.

One example of follow up functionality is depicted in FIG. 12. In one implementation represented by Card Folders 1211 and 1212, a folder is generated when User A joins an event that is defined by a time window and a location (finite event). For example, if a networking finite event is created, such as the one represented by Folder 1211, that is associated with 1) a location and 2) an event time window, a folder can be created on User A's web account containing all the electronic business cards of other users who also joined that event. In one implementation, the folder that is created and associated with an event may comprise all the business cards of all other users who also joined the event via the mobile application at any time during the time window independently from any overlapping time and active coexistence of users within the same event time window.

In another implementation, Card Folder 1211 in User A's account may contain only those electronic business cards of those users who joined the event during a time window that was overlapping with a time window when also User A joined the event. In this implementation, the electronic business cards of users joining the event during time windows that were non-overlapping with the time window of presence of User A would not be collected and stored in User A's account. This second implementation is more stringent as, e.g., the electronic business card of User B would be collected into a folder on User A's account only if User A and User B joined said finite event during an overlapping time period.

Differently from finite events, certain locations may constitute permanent arenas for networking, dating, conducting business, or other activities. Permanent arenas (from now on "arenas"), in some implementations, are areas where, among other functionalities, users may interact if co-located within the same always-active area. Arenas can be placed in strategic locations such as airport lounges and can be used to produce statistics, taxonomies, or analytics that can be used to provide additional services to users or businesses.

In one implementation, the electronic business cards of users are not automatically stored by the system in User A's account but may need to be manually saved by User A in either 1) a generic Saved Business Cards Folder 1210 or 2) in a folder dedicated to a finite event that both User A and User B have joined such as Cards Folder 1211 or 3) in a folder dedicated to a particular permanent arena location such as Cards Folder 1213. In some implementations, User A may elect to store by default manually-saved business cards in said generic Saved Business Cards Folder 1210. In some implementations, privacy settings may allow User A to regulate the capability of other users to collect his electronic business cards when User A decides to join a finite event or a permanent arena. In certain implementations, User A may allow his business card to be selectively stored on accounts of other users only if User A has interacted with those users via, e.g., a messaging or handshake functionality. In other implementations, User A may decide not to allow his electronic business card to be stored on other users' accounts but just allow the possibility of interacting during the event or within an arena without leaving an electronic business card.

In some implementations, electronic business cards can be moved, saved, or duplicated in another folder. For example, Saved Business Cards Folder 1210 may contain those electronic business cards that User A wants to retain or act upon in the future. Folders could be created within other folders to organize said electronic business cards according to User A's needs or desires.

In some implementations, electronic business cards may automatically disappear from users' web accounts unless those users act upon the business cards by saving them within a predetermined period.

The person skilled in the art will understand that for the purpose of this application, an electronic business card is a broad term that may or may not coincide with the industry-standard terminology. For example, Card 1218, could be assembled by extracting at least certain field attributes from an electronic profile of a social network, professional network, or dating networks such as e.g., LinkedIn, Google Plus, Facebook, eHarmony, or Match.com.

An electronic business card can be assembled by extracting field attributes from user profiles that may not have been intended to provide an electronic business card functionality. For example, Spotify, Pandora, Apple or Instagram user profiles may serve the purpose of extracting data useful to assemble an electronic business card.

The person skilled in the art will also understand that, in some implementations, an electronic business card may resemble a traditional business card mimicking the layout and the information traditionally contained therein. In other implementations, electronic business cards could be a collection of data and information in a portion of a database associated with an event or a location.

In some implementations, the electronic objects representing electronic business cards in a webpage of said website may not resemble traditional paper business cards but may appear just like a structured collection of users' data. In certain implementations, data related to users could be represented just as databases where data could be organized and searched according to various parameters such as name, industry, profession, title, education, location of interaction, event of interaction, et cetera.

In FIG. 12, Cards 1214, 1215, 1216, 1218, and 1219 are contained, e.g., in Folder 1211. In some implementations, cards may differ from one another even if they are generated using data extracted from the same source such as a social profile collection of attributes for a generic user. For example, User A may be able to customize the appearance of the electronic business card associated with his own profile. A logo could be added to the card such as Logo 1217. Said logo could be representative, e.g., of the company for which User A is working.

Card 1218 shows possible customization such as Border 1220. Other customizations may include different colors or shapes so that the electronic business cards do not appear to be the same for all users but collections of cards may mimic the same diversity that occurs with tangible paper business cards. Customizations of electronic business cards could be part of premium features for which users may be willing to pay a fee in order to differentiate themselves from the competition.

In some implementations, electronic business cards are not simply a graphical display of the information that is visible but may also contain metadata. Metadata may facilitate the discovery or organization of relevant information associated with a user. Metadata may also help to organize electronic resources, provide digital identification, and support archiving and preservation of electronic business cards. Metadata may also assist in the discovery and organization of electronic business cards by allowing them to be searched or organized according to relevant criteria. For example, if one metadata associated with the electronic business cards is the location where that business card has been collected, User A could be able to organize or search the electronic business cards that he has collected according to location data.

Examples of metadata that could be associated with electronic business cards are event name, location, date, time, analytics of proximity between User A and the user associated with the business card. Said proximity parameter can be quantified, for example, via embodiments that have been disclosed in patent applications by the same inventor of the present patent application. Other metadata can be data derived from the social profile used to assemble the electronic business card, for example, the number of first-degree connections of a user. In one embodiment, electronic business cards associated with premium users may enjoy a premium status that may affect, e.g., discoverability, visibility, permanence in other users' accounts, the richness of content associated with said business card (metadata), distinctiveness, personalization, or privacy options.

In one possible implementation, electronic business cards are not only a graphical representation on a web page but software objects that can be dragged, tossed, rearranged, and archived in ways that are similar to traditional paper business cards by using a graphical interface such as a computer mouse or a touch screen.

A vCard is a file format standard for electronic business cards codified by IETF in its RFC 6350, 2011. vCards are often attached to e-mail messages, but can also be exchanged in other ways, such as on the World Wide Web or instant messaging. They can contain name and address information, phone numbers, e-mail addresses, URLs, logos, photographs, and audio clips.

With reference to Card 1219 in FIG. 12, an electronic business card generated according to one embodiment of the present application may allow functionalities that may be accessed, e.g., via a Drop Down Menu 1221. Said menu may enable various operations related to Card 1219. For example, a vCard can be created using data or metadata associated with the electronic business card that was generated by the system.

In one implementation, Drop Down Menu 1221 may enable exporting data to a CRM (Customer Relationship Management) system. A CRM is a model for managing a company's interactions with current and future customers. One example of a CRM system is Salesforce. Salesforce may enable customers to create and track cases coming in and automatically route and escalate what is important. Salesforce customer portal may provide customers with the ability to track cases and provides analytical tools and other services. Salesforce platform as a service (PaaS) may allow external developers to create add-on applications that integrate into the main Salesforce.com application and are hosted on Salesforce infrastructure. In one implementation, User A may fill in his credentials for his CRM account into Credentials 1222 of his web account, and in so doing he may connect said CRM account with the accounts of said mobile application and said web account. Once the accounts are connected, the data associated with the electronic business cards that are generated and collected may automatically be transferred into said CRM system without the need for User A to use Drop Down Menu 1221 or perform any manual operation.

In another implementation, electronic business card data and metadata can be exported to traditional contacts lists such as Outlook or Gmail either automatically (via account linking functionalities similar to Credentials 1222) or manually via Drop Down Menu 1221.

FIG. 13 provides a representation of possible features and embodiments related to visibility indicators or enhanced visibility actuators.

Visibility Indicator 1302 may signal to a user his visibility status in relation to other users. If User A has not joined a permanent arena or a finite event, in some implementations, he or she may not be visible to other users. This indicator is especially useful when an auto-join function has been enabled and User A wants to become visible automatically to other users if he enters into an active area (whether a permanent arena or an active finite event). In some implementations, a green color may signal a visible status if User A has joined a finite event. In another implementation, a blue color may signal the visibility for User A if he has joined a permanent arena. In some implementations, a grey color may signal to User A that he is not visible to other users who may have joined the same arena.

The visibility of a user may be enhanced in different ways, e.g., within a list of users certain users who have activated a visibility enhancer function may come on top such as, for example, User A in Screen 1300.

In certain implementations, a browser Screen 1301 may show a map of certain locations such as, e.g., Location 180 and may also display information about those users who have activated a visibility-enhancing function at said location. Browser Screen 1301 can be accessed, e.g., via a web browser by a user who is not necessarily positioned within Session Area 190 or has joined Session Area 190.

Enhanced Visibility Button 1303 may enable a functionality wherein User A may become more visible not only to those users who have joined the same active area but also to those users who, via a web browser and Screen 1301, can acquire information on arenas or events without being located within or join Session Area 190 (associated with Location 180). In some implementations, the possibility of acquiring real-time or statistical information pertaining to active session areas is limited to permanent session areas (i.e. arenas). In other implementations, finite events may produce real-time statistics or post-event statistics related to those users who have joined said event.

In the implementation described in Screen 1301, it is possible to access a personal profile of User A and Name 2, and said profile may contain a "tagline" pertaining to the informal office functionality such for example: "I am an IP lawyer available to informally discuss how Intellectual Property can protect your commercial enterprise. Feel free to shake hands. P.S.—This is not legal advice :>)."

Screen 1306 represents a possible representation of nearby arenas in a mobile terminal. Tiles representing arenas may show Enhanced Visibility Marker 1307 associated with locations where users who joined those permanent active session areas have activated informal offices. Arena Starbucks at Address XXX and Arena 2 on Screen 1306 are examples. In one implementation, the pressing of the Enhanced Visibility Marker 1307 on a touch screen may result in the showing of the taglines of all those users who have activated the enhanced visibility function via the Enhanced Visibility Button 1303 and have joined the Arena Starbucks at Address XXX.

In one implementation, said enhanced visibility function associated with Enhanced Visibility Button 1303 may lower the privacy of a user, e.g. User B, in return for the possibility of other users to reach out to said User B when he is at Location 180 and he has activated said function. In one implementation, users who activate the Enhanced Visibility Button 1303 are visible and reachable by users who are not at Location 180. In one implementation, Statistics 1311 associated with Location 180 may list the most active users such as those users with the most interactions with other users. In another implementation, said Statistics 1311 may describe those users who most often are in an enhanced visibility mode.

In some implementations, the enhanced visibility of certain users may become part of statistical data so that, for example, if a user joins Location 180 and recurrently turns on the enhanced visibility function on certain days of the week (or certain time windows of the day) those recurring patterns may become part of the analytics associated with Location 180.

With reference to FIG. 13 and the professional networking scenario, Enhanced Visibility Button 1303 in Screen 1300 may serve the function of establishing an informal office centered on Location 180. In one possible exemplary embodiment, Location 180 is a Starbucks coffee shop at Address XXX. As discussed with reference to previous figures while describing the informal office functionalities, User A may enter an arena centered on Location 180 and turn on said enhanced visibility function, in this case, an informal office functionality associated with Enhanced Visibility Button 1303.

In one embodiment, with reference to Screen 1300 of a touch phone, Enhanced Visibility Marker 1304 and Enhanced Visibility Marker 1305, may signal, e.g., that users User A and Name 2 have activated this functionality. In one possible implementation, the tiles associated with User A and Name 2 can be placed on top of a list of users who also have joined the arena centered on Location 180 (but have not activated the enhanced visibility functionality such as, e.g., Name 3 and Name 4).

Enhanced Visibility Marker 1304, 1305 may also function as tagline actuators. For example, if Visibility Marker 1304 is pressed, a tagline associated with User A can be shown on Screen 1300.

In some other implementations described in Screen 1301, Taglines 1312 of those users who have turned on Enhanced Visibility Button 1303, may become part of the attributes pertinent to the arena centered on Location 180 and can be retrieved either from a web browser or a mobile application during the time in which those users keep their enhanced visibility function active.

With reference to Screen 1301, in one implementation, a user who has not joined the arena centered on Location 180 may acquire information pertaining to said arena by browsing the web from the comfort of his own home or office. He may, for example, browse the arena Starbucks at Address XXX and discover the following exemplary attributes for said arena: Active Users Attribute 1308, Informal Offices Attribute 1309, and Statistics Attribute 1311. Active Users Attribute 1308 may represent a real-time indication of how many users have joined the arena centered on Location 180. Informal Offices Attribute 1309 may represent how many informal offices are currently open. It may also provide for the enhanced visibility or discoverability of those users and their associated Taglines 1312.

In one implementation, one attribute of an arena such as the one centered on Location 180 is Statistics 1311. Users may be able to retrieve certain statistical and real-time data such as active users' peak times, the peak day for activities, average taxonomy of users over different periods (week, month, year), or real-time taxonomy (such as most represented professional categories at a certain moment in time).

In another embodiment, that is different from a professional networking scenario, the system can be used for conducting location-based commerce. With reference to Screen 1301 and attribute Active Agents 1310, the Enhanced Visibility Button 1303 can be used by agents working for principals as described in patent application US 20140011515 A1 published on Jan. 9, 2014 and titled "Method and apparatus for a Principal—Agent based mobile commerce" that is hereby incorporated by reference. In one embodiment, the Enhanced Visibility Button 1303 can be used for enhancing the visibility of agents who are associated with principals and are empowered by said principals to advertise offerings and transact certain deals on their behalf.

A possible exemplary and explanatory scenario is an agent who is representing a Mercedes cars dealership (principal). Said agent may park a new model car in the proximity of a Starbucks coffee shop (Location 180) and turn on Enhanced Visibility Button 1303. In this embodiment, Agent Tagline 1313 rather than displaying a professional or networking interest may advertise a deal on said new model car that is offered via the agent by the principal to users who choose to interact with the agent at Location 180. In some implementations, the tagline could be a summary of the offer. In another implementation, the tagline could be a hyperlink that may open the details of an offer and enable, e.g., User B and said agent to close a commercial transaction or at least to advance it. In some implementations, User B may lock the terms of the offer via an agent but to close the transaction he may have to interact with said principal.

Figure 14:
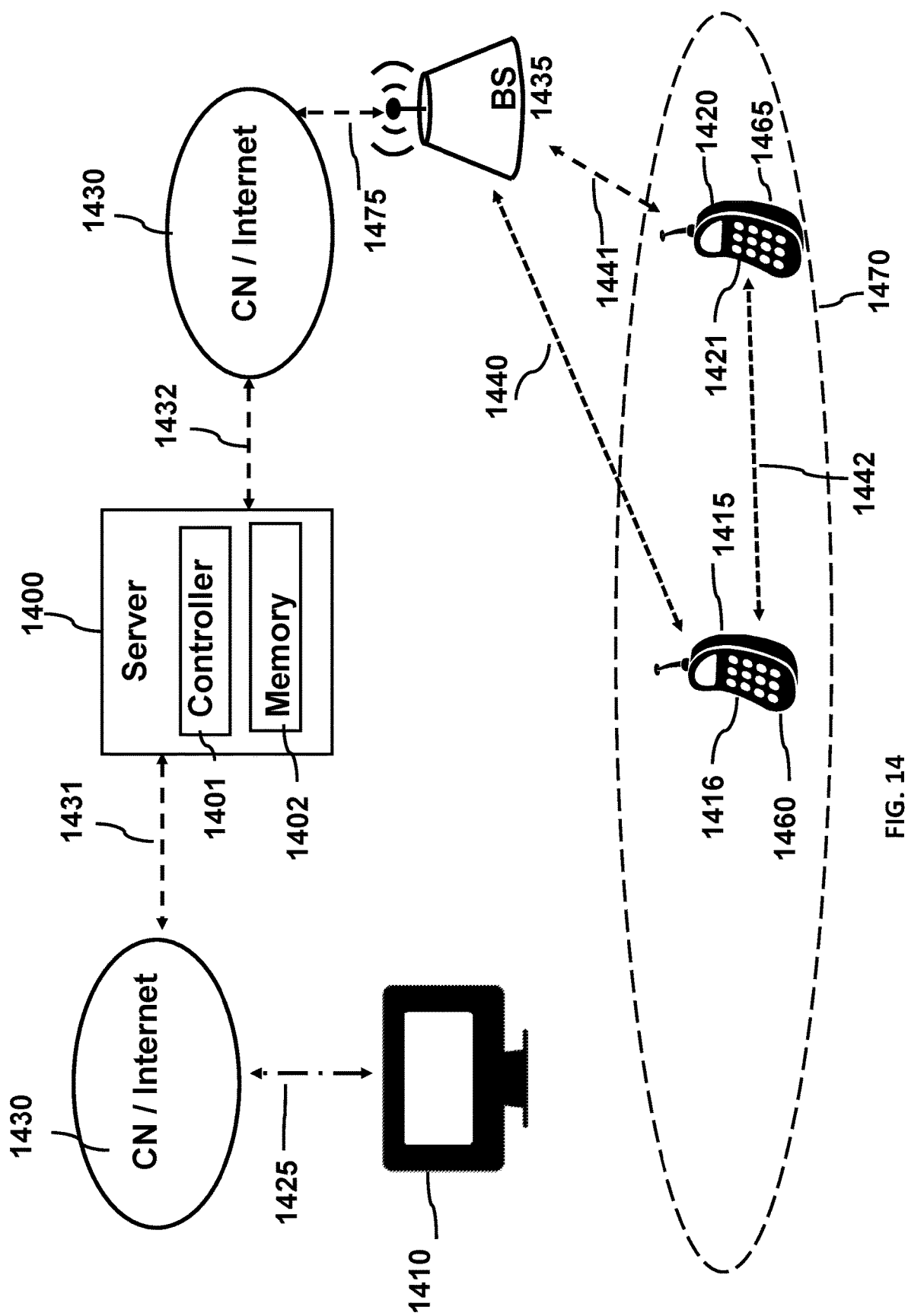
FIG. 14 describes an example system in accordance with an embodiment of the present invention.

FIG. 14 represents one example embodiment of the invention based on a wireless radio carrier such as a wireless local area network system (WLAN). The person skilled in the art may recognize that WLAN is only one example and a multitude of different radio standards and carriers are possible substitutes. According to this embodiment, an Agent Equipment 1460 carried by an agent, includes a Memory 1415 wherein an application is stored and is running. Said Agent Equipment may further comprise an Input-Output Module 1416 adapted to show indications of any match that may have occurred and further adapted to input any data or preference an agent may have. User Equipment 1465 carried by a user, includes a Memory 1402 wherein an application is also stored and is running. Said User Equipment 1465 may further comprise an Input-Output Module 1421 adapted to show indications of any match that may have occurred and further adapted to input any data or preference a user may have. Some examples of data, decisions, and preferences will be described in relation to FIG. 16. In this embodiment, the Radio Range Area 1470 of the WLAN radio carrier results in an area in which the agent carrying Agent Equipment 1460 can engage a user. The person skilled in the art will appreciate that such area may vary according to the radio carrier of choice or the radio propagation status. In this implementation, the proximity between an agent and a user may be determined by the radio horizon or the radio propagation range of non-cellular radio carriers such as WLAN, Bluetooth, Zigbee, or RF-ID.

In FIG. 14, User Equipment 1465 and Agent Equipment 1460 could be a mobile phone, a PDA, a laptop, or tablet, or any other wireless mobile device or wearable equipment. In a basic embodiment, Agent Equipment 1460 can be a simple RF-ID sending out a wireless digital identifier. In this example, embodiment, user equipment 1465 is connected through a Cellular Link 1441 to base station BS 1435. BS 1435 could be a Code Division Multiple Access (CDMA) and its variants, a Global System for Mobile Communications (GSM), Universal Mobile Telecommunications System (UMTS), Long Term Evaluation (LTE), WLAN, or a WiMAX base station.

BS 1435 and its related network can be compliant with 3GPP, 3GPP2, or WiMAX specifications. In an example embodiment, BS 135 is connected through Interface 1475 to Core Network (CN)/Internet 1430. CN/Internet 1430 may connect or allow connection to server 1400 using Interface 1432. Interfaces or data connections 175, 132 can be wireless or wired connections.

A wireless digital identifier (ID agent) may be sent via an Interface or Data Connection 1442 (for example, WLAN) from Agent equipment 1460 to User Equipment 1465 wherein an application, stored in Memory 1420, is running. Said application may cause said wireless digital identifier (ID agent) to be sent to Server 1400, together with a wireless digital identifier associated with the user of User Equipment 1465 (ID user), via Cellular Link 1441 to the base station BS 1435 and from there via Interfaces or data connections 1475, 1432 and Core Network (CN)/Internet 1430 to said Server 1400.

In a possible implementation, Server 1400 will pair the ID agent with the ID user and probe for possible matches using the data structures that will be described in FIG. 15 and FIG. 16.

In another implementation, it is User Equipment 1465 that sends ID user to Agent Equipment 1460 via an Interface or Data Connection 1442 wherein an application, stored in Memory 1415 is running. Said application will cause both ID agent and ID user to be sent over to Server 1400 via Cellular Link 1440 and the various data connections described in the previous example. Again, an algorithm running on Server 1400 may pair the ID agent with the ID user with the associated datagram and query for possible matches.

In another implementation, the sending of the IDs may not be necessary, as a database of wireless digital identifiers, data structures, and the matching algorithm can be already stored in Memory 1420 or Memory 1415. Said data could be updated from time to time via a wired or wireless connection to a Server 1400.

FIG. 14 shows a simplified description of Server 1400 comprising a controller 1401. Server 1400 may comprise a plurality of controllers 1401 and Memories 1402 and other components that would allow a server to operate as is commonly known in the art. In one implementation Server 1400 via Controller 1401 may check the digital identifier that User Equipment 1465 has received from Agent Equipment 1460 against a database contained in Memory 1402 and determine if certain conditions and parameters, like the ones described in FIG. 15 and FIG. 16, are met. In this implementation, Principal Equipment 1410 is represented as fixed equipment or a desktop but the person skilled in the art will recognize that Principal Equipment 1410 is not limited to desktop-type devices but can also be any mobile or wearable device capable of connecting to Server 1400 to modify entries in a datagram structure as the one described for example in FIG. 15.

In some scenarios, Principal Equipment 1410 may not even belong to the person acting as a principal. A principal can control the terms and conditions of a business offer via instructions, data, and terms uploaded on Memory 1402 of Server 1400 by means of any equipment capable of connecting to Core Network (CN)/Internet 1430. These instructions can be uploaded via Interfaces or Data Connections 1425, 1431, and Core Network (CN)/Internet 1430. These connections can be wireless or wired; a base station or access point (not shown in FIG. 1 in relation to Principal Equipment 1410) would be necessary in the case of a wireless connection to connect Principal Equipment 1410 to Server 1400.

FIG. 14 shows only one Principal Equipment 1410 controlled by a person acting with the capacity of a principal, however, a plurality of different principals may exist which are all connected to server 1400. A plurality of principals may submit offers to other users, such as the one depicted in FIG. 14, carrying hardware similar to User Equipment 1465 via other agents, like the one depicted in FIG. 14, carrying hardware similar to Agent Equipment 1460.

In one scenario, Principal Equipment 1410 may represent and be used by a business entity, a principal, who wants to display his latest product via a testimonial such as an enthusiastic previous client for example. Such a client will act as an agent and will be carrying around Agent Equipment 1460 and a product that the principal wants to sell. For example, a car dealer could be a principal and an enthusiastic client might be authorized by such a dealer to become an agent for the dealer. The agent may carry around the new car and advantageously display and advertise the product to potential clients by means of the present invention.

In a possible implementation, when User Equipment 1465 is within Radio Range Area 1470, both user and agent (and even the principal) can be alerted that a match has occurred. User of User Equipment 1465 can accept the invitation for the product demonstration via Input-Output Module 1421. All these data and information can be sent over Cellular Link 1441, 1440, Interfaces or Data Connections 1475, 1432, 1431, 1425, 1442, and Core Network (CN)/Internet 1430. In a possible implementation, User Equipment 1465 may also receive data facilitating the meeting with the agent, for example via compass-like element indicated by Output Module 1421 displaying an arrow pointing at the agent's position, or via turn-by-turn instructions that will guide the user to the agent. In a possible implementation, pictures of the agent and the user may also appear via Input-Output Module 1421 and Input-Output Module 1416 to facilitate the identification of the agent and the user by the other party. Alternatively, if the user accepts the prompt for a meeting with an agent, it can be Agent Equipment 1460 receiving data facilitating the meeting. In one possible implementation if the user accepts the prompt for a meeting an algorithm running on Server 1400 may provide both Agent Equipment 1460 and User Equipment 1465 with data and instructions to reach a conveniently located meeting place. Said places could be commercial places such as bars or restaurants that for a fee can become the default or sponsored places where the system can route agents and users. On those premises, said users and agents can enjoy the services and the personalized offers made by said commercial establishments.

In one implementation, once the user and agent have exchanged information about the product, the user may, via Input-Output Module 1421, decide to accept the offer. Said acceptance can be preliminary or final. User Equipment 1465 may send said acceptance information to Server 1400 and from there Principal Equipment 1410 could retrieve it. If the acceptance is preliminary, a user may be given only a limited amount of time, a grace period, to take advantage of the offer he has received via the agent, go to the business premises of principal, finalize the acceptance and collect the goods or services he has purchased, for example, a car.

The person skilled in the art will recognize that many variations do exist to the approaches described. For example, the offer may have restrictions such as a minimum number of users preliminarily accepting it. Alternatively, an agent may have some goods with him and payments and transactions of goods may already occur during the interaction between agent and user.

In a possible implementation, the principal has a great deal of control over not only the content and conditions of the offer but also over the modalities by which Agent Equipment 1460 may operate in relation to the principal-agent mechanism that has been described. For example, a principal may restrict the broadcasting of the wireless digital identifier to certain time windows during the day or to determined locations. A principal may also render Agent Equipment 1460 active or inactive, modify certain parameters and data as described in FIG. 15 and, in case of multiple agents working for the same principal, the principal could also create hierarchies among agents so that the probability of agents interfering with each other will be minimized. For example, there could be times when more than one Agent Equipment 1460 will be able to engage the same User Equipment 1465; in that case, a default agent equipment may be given priority in order to minimize the conflicts; perhaps priority can be given to the agent who has the most successful record of accomplishment in closing the deals.

In addition, in case of multiple agents and multiple users in the same area having profiles that could be causing multiple alerts or invites to meet, the algorithm contained in Memory 1402 and running on Server 1400 may distribute and rebalance the load among agents according to a range of principal's preferences. The principal may input these preferences by means of a Principal Equipment 1410 and send these preferences and settings over to Server 1400. Alternatively, a fourth entity, in addition to the principal, the agent, and the user, namely a business entity running the principal-agent service and having access to Server 1400 which is hosting the matching algorithm, can define the details of said algorithm and manage any possible conflicts and interferences.

FIG. 15 provides an example of a Principal-Agent Data Structure 200 in accordance with an embodiment of the present invention. The person skilled in the art may recognize that FIG. 15 can be seen as the combination of two data profiles, one belonging to a principal and one, more restricted since the principal is the master of the offer, belonging to an agent. The present invention, in one implementation, can be seen as the matching of three profiles. The agent's profile can be limited to simple data fields indicating the decision by the agent to turn on or off the application running on his mobile. For example, an entry in the Principal/Agent Data Structure 1500 will indicate that the agent is active (Column 1512). In other implementations, the agent's profile could be more sophisticated and allow the agent to set some preferences such as a preferred meeting place or other. In a possible embodiment, the preferred meeting places allocation could be a possible source of revenues for a principal, an agent, or the entity overseeing the principal-agent service and having access to Server 1400. By routing users to commercial premises for the demonstrations, the entity running the principal-agent service could for example take advantage of possible agreements with the owners of the commercial properties such as bars.

In one example embodiment, the data structure in FIG. 15 is downloaded over the air (OTA) into User Equipment 1465 or Agent Equipment 1460 via an internet connection. Server 1400 may also update the Data Structure 1500 over the air (OTA). In another embodiment, said data structure may reside on Memory 1402 of Server 1400 and can be modified and updated directly by principal via Principal Equipment 1410 or Agent Equipment 1460 or, as discussed, by accessing secure web pages by using equipment capable of connecting to Core Network (CN)/Internet 1430. In an embodiment, Agent Equipment 1460 and User Equipment 1465 may establish a connection with Server 1400 via Cellular Link 1441, 1440 to base station BS 1435 and from there via Interfaces or Data Connections 1475, 1432 and Core Network (CN)/Internet 1430, retrieve, and send the information and data needed. In this embodiment, a matching algorithm stored on Memory 1402 may be overseeing all the functionalities necessary to ensure that the user of User Equipment 1465 receives a notification when he is located within Radio Range Area 1470 and his associated profile satisfies the conditions required for such notification. In another embodiment, the matching algorithm could be stored and be running either on memory in User Equipment 1465 or memory in Agent Equipment 1460.

In the embodiment described in FIG. 15, Rows 1530, 1540 1550, and 1560 represent essentially data and information that are pertinent to the various principals, namely the entities that are in control of the offers. For example, with reference to Row 1530, the principal is Watches International and the wireless digital identifiers, contained in Column 1509, associated with its agents are JPR-123 and JPR-234. Column 1510 may contain all the principals in control of the different offers. In this embodiment JPR-123 is an ID (wireless digital identifier or ID agent) that is associated and identifies mobile equipment, such as Agent Equipment 1460, that can be carried around by an agent who has entered into an agreement with Watches International. In this example, Watches International has created and registered two agents. In another embodiment, the ID agent can be just associated with a particular agent carrying Agent Equipment 1460 but the equipment may be interchangeable. In this case, the agent may have to log in to an application running on mobile equipment with a special login and password. The person skilled in the art will recognize that by virtue of a possible log in mechanism, agents and users may use different equipment as long as they run an application similar to the one contained in Memories 1415 and 1420 enabling the functionalities described in this application.

In the example of FIG. 15, Column 1511 contains the status of the agents as determined by the principal. For example, agent JPR-123 has been turned to the status of "inactive" by the principal, Watches International, as the principal may desire that agent JPR-123 be excluded by the roster of active agents. Column 1512 contains the status of the agents as determined by the agents. For example, agent RJA-123 in Row 1540 has turned his status to "inactive" in Column 1512 since he may want to exclude himself from the roster of active agents, even temporarily. In this example, an agent to be active must have his "status as determined by the agent" (Column 1512) and his "status as determined by the principal" (Column 1511) both in the active state as, for example, agent JPR-234.

In this example, the principal controls the data in Column 1513. This column contains a web address pointing at content that a User Equipment 1465 can display to a user after he is notified that an agent is in proximity. A notification to a user may occur only if the offer meets the parameters and conditions contained in the data structures described in FIG. 2 and soon to be described FIG. 3. The webpage may contain the details of the product, the offer, and the conditions attached to the offer. The webpage or the application client running on User Equipment 1465 may also contain acceptance buttons and triggers. For example, once the agent and user meet in person and the agent has explained the details of the product verbally to the user, said user may indicate that he is interested in the offer; if the transaction occurs, the agent should be credited for the sale. In one possible scenario, after the user indicates his preliminary acceptance via an "acceptance button" in the application client or a webpage, he may have a period in which to go in person to the principal's location and pick up the goods or consume the service offered via the agent. After a set period has expired, the offer may time out and it may not be available to the user anymore. In that case, an agent may not be credited for the transaction.

Column 1514 contains a summary of the offer. The person skilled in the art will recognize that different scenarios are possible. For example, a principal can make more than one offer. Alternatively, a principal can assign different offers to different agents. In another possible scenario, an agent may represent more than one principal.

Column 1515 includes restrictions that a principal may impose upon users. For example, Field 1517 includes a geographical restriction and a class restriction, "only military personnel'. Field 1517 may affect the matching of certain offers with certain users if those users do not conform to the restrictions imposed. Field 1518 gives an example of a temporal restriction. A temporal restriction could also be the imposition of a set time window during the day when users in proximity to agents can receive an offer. Field 1519 represents another geographical restriction that a principal may impose upon users and agents. In this example, users will be able to receive alerts and notifications about proximity only within a predefined geographical geofenced area. Another example could be the setting up of exclusion areas. For example, principals may set up exclusions areas. Users may not be able to receive alerts if within a specified area; (or agents may not be able to be matched with users if within the area.) Field 1520 represents an example of additional restrictions that a principal may impose. For example, an offer may not be valid unless at least fifteen users have accepted, at least preliminarily, said offer. In addition, a principal may set up a maximum number of offers that can be accepted by users. Once a maximum number of offers have been accepted, notifications of additional offers to users may be barred. This function may be particularly useful when the principal uses more than one agent and the inventory of goods or the availability of services that can be offered is limited.

Column 1516 provides the location of the various principals. In certain business models, it can be advantageous that the good or the service is delivered at the principal's location to a user when said user preliminarily accepts the offer tendered by an agent by means of an application running on his User Equipment 1465. In certain implementations, the application may point to the closest dealer carrying the item, in this case, a watch, as described by Field 1521. In this implementation, the principal could be the owner of the particular brand of watches and to him, it may not matter which of his dealers will be closing the sale. In another implementation, an algorithm that may be running in Server 1400 may point the same user to a specific dealer using the dealer's location or the level of items on inventory as parameters. In other implementations, the application may point to a specific dealer or shop as described in Field 1522. In this case, the principal could be that specific dealer or a particular shop that would honor the offer, not the brand owner. In one implementation, the application running on User Equipment 1465 may provide directions to the principal's place of business. In other implementations, an algorithm running on server 1400 may choose a particular dealer according to certain parameters such as the distance between the user's home and the closest dealer and provide directions to said dealer to User Equipment 1465.

FIG. 16 provides an example of a User Data Structure 1600 in accordance with one embodiment of the present invention. As in the case explained for FIG. 15 the User Data Structure 1600 may have been downloaded over the air (OTA) or via an internet connection into User Equipment 1465 and Agent Equipment 1460. Server 1400 may also update User Data Structure 1600 over the air (OTA). In another embodiment, said data structure may also reside on Memory 1402 of Server 1400 and can be modified and updated by the user via User Equipment 1465 or via any computer accessible to the user and securely connected to Core Network (CN)/Internet 1430 (not represented in FIG. 14).

Fields 1650, 1660, 1670, and 1680, all contained in Column 1610, represent essentially data and information that are pertinent to categories of goods and products of interest to the user of User Equipment. Column 1620 may contain more specific details within the broad category of services and goods that may interest a specific user. In one possible implementation, the user can populate these fields via a drop-down list. A drop-down list is a user interface control element ("widget" or "control"), similar to a list box, which allows a user to choose one value from a list. In this implementation, the various principals may control the values in these drop-down lists and these values will structure their agents' offerings and user's possible elections.

Column 1630 may consist of a data field pertaining to the user such as gender, income, social categories that the user himself may fill up or chose from a drop-down list. In particular, Data Field 1654 may contain a wireless digital identifier (ID user) unique to User Equipment 1465 or unique to the user of User Equipment 1465; in this case, the user may have to log in into the application with his login data and password as previously noted. Other data fields, such as Field 1672, may collect and store information pertaining to patterns of the user in time and space without the user's intervention so that, for example, it may be possible to predict where certain users could be at certain times. Agent, principals, and the business entity running this service may use this information to build maps indicating clouds of spatial and time probability for various typologies of users. These clouds may represent probabilities of where certain users could be located at various times of a day on certain days of the week.

Data Field 1681 may contain data records of the matches that have occurred in time and space and records of whether the user has chosen to pursue a proposed meeting with an agent. In one possible implementation, users may also rate agents after the meeting has occurred and those data may be available to the principal. Data Field 1681 may also contain exclusions, namely particular agents or particular offers that a user may decide not to pursue in the future.

Column 1640 contains user preferences. For example, Data Field 1653 may contain restrictions pertaining to time windows during the day in which a match should never occur. Data Field 1652 may contain restrictions pertaining to locations where a match should never occur. For example, it could be inconvenient to receive matches when at work or home. Data Field 1651 may contain restrictions pertaining to the offer. For example, unless the good is with the agent and the user will be able to see it during the meeting a match and a notification should not occur. Data Field 1661 may contain restrictions pertaining to the level of discount a user may get if he decides to pursue the opportunity offered by the agent. Certain users may decide that they want to receive notifications only for goods or services at a deep discount. Data Field 1671 may contain keywords for products of particular interest to the user. These keywords could be used to trigger matches for particular offers.

Data Field 1682 may contain privacy and other various preference settings. For example, the user may choose which data the algorithm should use to produce the matching or which personal data can be displayed to the agent or others. In another implementation, Data Field 1681 may also contain preferences such as public places and commercial establishments that the matching algorithm, in one possible implementation running on server 1400, may use to suggest a convenient meeting place for the agent and the user to interact. For example, the user may prefer certain coffee shops as meeting places so the algorithm may indicate as a meeting place a particular coffee shop conveniently located between agent and user after a match has been obtained, communicated, and accepted by both, agent and user. In one possible implementation, the algorithm may also guide the user and agent to the meeting place.

Figure 17:
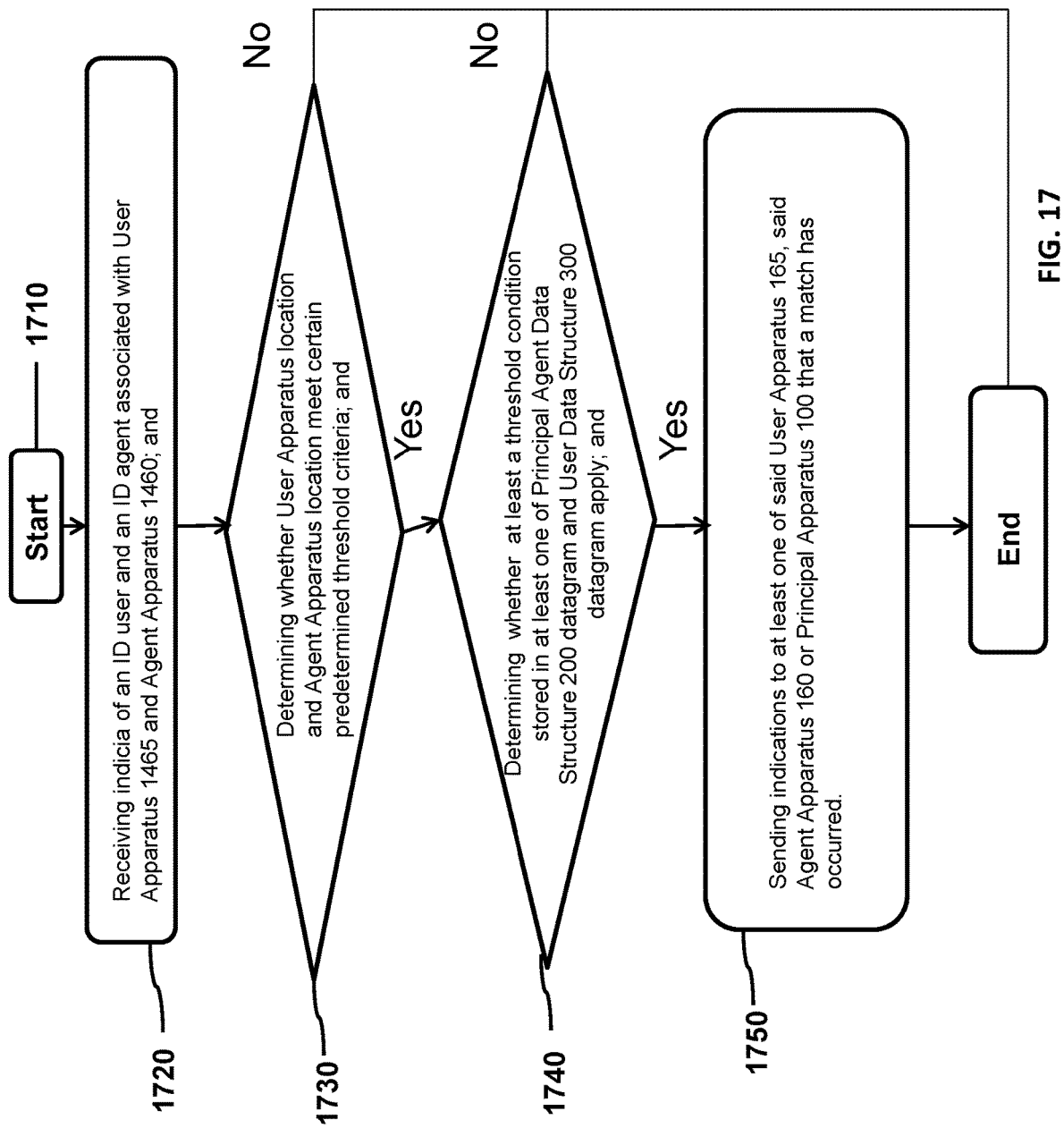
FIG. 17 is a flow diagram illustrating a process for triggering a notification that a match between a piece of agent equipment and a piece of user equipment has occurred.

FIG. 17 is a flow diagram illustrating a method for determining whether an indication should be sent to at least one of User Apparatus 1465, Agent Apparatus 1460, and a Principal Apparatus 1410, that an algorithm has determined that a match has occurred when applying conditions and preferences imposed by an agent, a principal and a user such as the ones described in FIG. 15 and FIG. 16 as examples.

Referring to FIG. 17, the method starts in block 1710. In one possible implementation the method may comprise:

receiving indicia of an ID user associated with User Apparatus and an ID agent associated with an Agent Apparatus (1720); and determining whether User's Apparatus location and Agent's Apparatus location meet certain predetermined threshold criteria (1730);

determining whether conditions stored in at least one of Principal-Agent Data Structure datagram and User Data Structure datagram apply (1740); and sending indications to at least one of said User Apparatus, said Agent Apparatus and Principal Apparatus that a match has occurred (1750).

For the purpose of the present invention, the threshold location associated with User Apparatus 1465 and Agent Apparatus 1460 is a factor that may change with the evolution of technology. Non-limiting examples of "threshold" are: 1) being within a certain geofenced area as defined by current location techniques such as GPS or multilateration, 2) being within the radio range of a radio carrier such as Bluetooth, 3) subscribing to the same base station BS 1435 or access point with a mobile apparatus and 4) the logging in with an RFID identity by using an RFID reader located in a certain location, for example, a bar or a restaurant.

Figure 18:
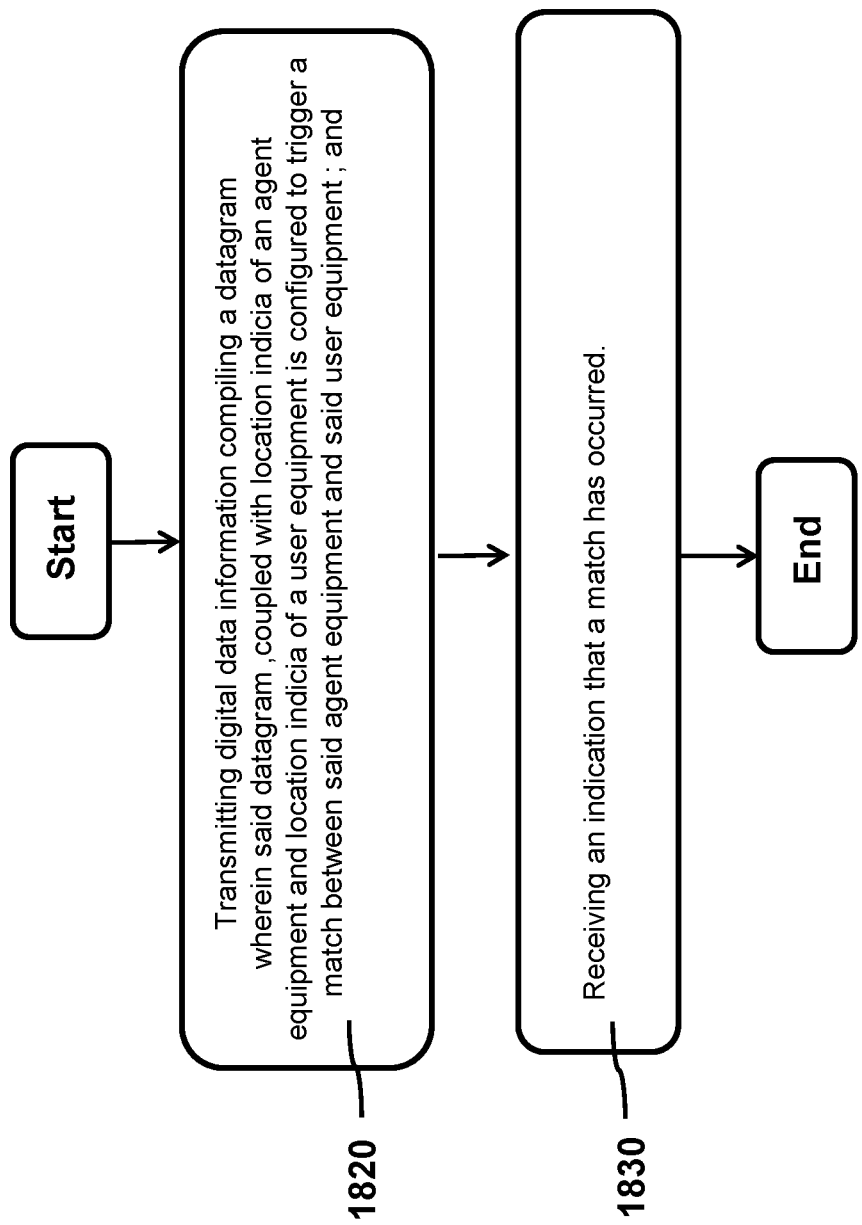
FIG. 18 is a flow diagram illustrating a process for triggering a notification that a match between agent equipment and user equipment has occurred.

FIG. 18 is an exemplary flow diagram illustrating a method for receiving indications at a Principal Equipment 1410 that a match has occurred between an agent and a user said method comprising:

transmitting digital data information compiling a datagram wherein said datagram, coupled with location indicia of agent equipment and user equipment can be used to trigger a match between said agent equipment and said user equipment (1820); and receiving at least one indication that a match has occurred (1830).

The person skilled in the art may recognize that in practice, a principal may only be interested in receiving indications that a user has accepted the offer that said principal has tendered by means of one of his agents; however, for an offer to be accepted a match should occur first, therefore indications of accepted offers are generally subsets of a broad-spectrum collection of matching occurrences. In addition, a principal may also receive indications that a match has occurred via a set of analytics describing his agents' performances. It may in fact be useful for a principal to know the match to transaction rate for his agents to evaluate their performances.

Figure 19:
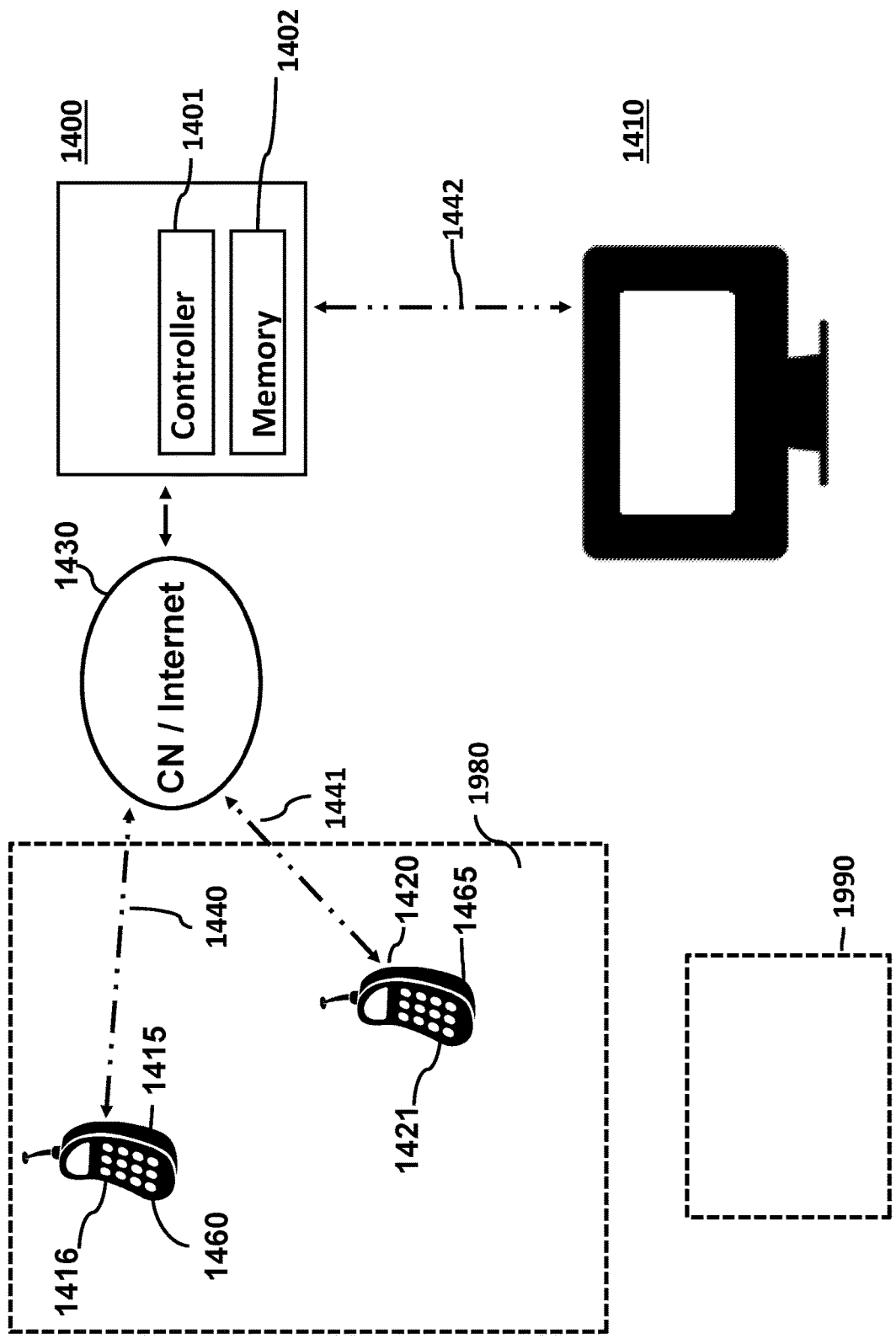
FIG. 19 describes an example system in accordance with another embodiment of the invention based on geofencing.

FIG. 19 represents one example embodiment of the invention based on geo-fencing technology. FIG. 19 is similar to FIG. 14 and therefore only the new elements and relevant modifications will be discussed. In this embodiment, the matching associated with the location parameter can be satisfied by the presence of both, User Equipment 1465 and Agent Equipment 1460, within an area defined by geofencing techniques, in this case, Area 1980. Area 1980 can be an area defining the perimeter of a commercial mall or a portion thereof. In one implementation, locations with a higher density of users can be geofenced using small size areas while locations with a smaller density of users may be geofenced using bigger size areas to maintain a constant probability of matching users with agents. In one implementation, at least one of an agent, a principal or a user, or any combination thereof can define matching areas. In another implementation, if more than one actor can define the matching areas then the match may occur only within the overlapping portion of the areas.

In the embodiment described in FIG. 19, Agent Equipment 1465 and User Equipment 1460, satisfy the location portion of the matching algorithm stored in Memory 1402 and running on Server 1400. In one embodiment, after a match has occurred and both agent and user have been made aware of said occurrence via data and information sent over Cellular Link 1441, Cellular Link 1440, and Core Network (CN)/Internet 1430, then Controller 1401 may direct both agent and user to a meeting place such as Area 1990. Such meeting place can be a commercial establishment such as a coffee shop or any other place suitable for the agent's demonstration and the showing of the product or service.

Figure 20:
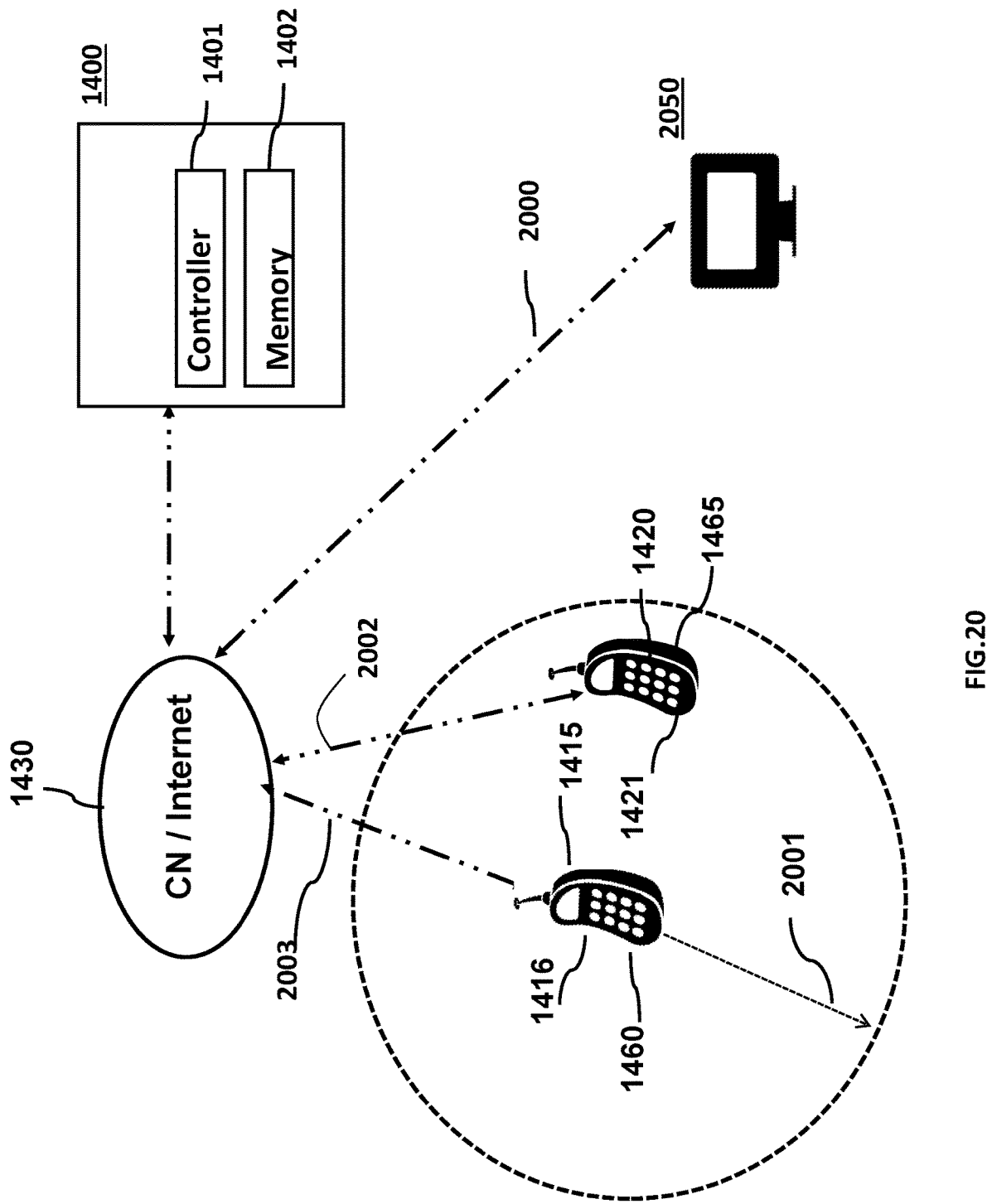
FIG. 20 describes an example system in accordance with another embodiment of the invention based in part on a distance value measured between the locations of the agent apparatus and the user apparatus.

FIG. 20 represents one example embodiment of the invention based on a distance between User Equipment 1465 and Agent Equipment 1460. FIG. 20 is similar to FIG. 14 and FIG. 19 therefore only the new elements and relevant modifications will be discussed. In this embodiment, the location proximity element of the matching algorithm is satisfied when the distance between User Equipment 1460 and Agent Equipment 1465 is below a Threshold Distance 2001. In one embodiment, Server 1400 can request the position of User Equipment 1460 and Agent Equipment 1465. User Equipment 1460 and Agent Equipment 1465 may transmit their position using one of the many positioning technologies such as GPS, multilateration, cell ID mapping, or others. In one embodiment, said Threshold Distance 2001 might vary with the density of users in a particular location. For example, if a number N of User Equipment 1465 falls within Threshold Distance 2001 and that number N is higher than <User MAX> then Threshold Distance 2001 value may diminish to a set value <Min>. If N is smaller than <User MIN> then Threshold Distance 2001 may increase to a preset value <Max>. The person skilled in the art will recognize that this is only one example and that other intermediate values for Threshold Distance 2001, in addition to <Min> and <Max>, can be advantageously implemented. In case that more than one User Equipment within the Threshold Distance 2001 triggers a match, an algorithm residing on Server 1400 may resolve the conflict in many different ways, for example by privileging the closest User Equipment. Alternatively, it may use other parameters like the history of purchases of the matched users; it may privilege the user that has already closed the higher number of deals by using the process described. The person skilled in the art may recognize that there are many different ways of managing conflicts and that the examples presented are just a few of many possible ones.

Figure 21:
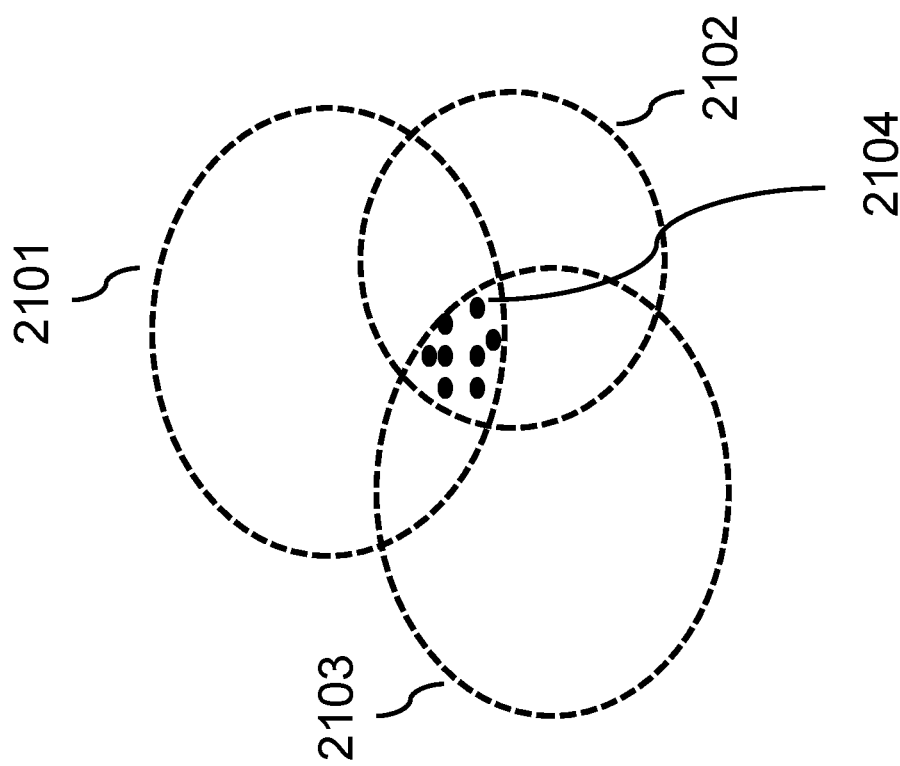
FIG. 21 describes a schematic illustration of the conditions necessary to trigger a "three-profiles" matching algorithm.

FIG. 21 describes a schematic representation of a three-profile based matching system, which is one of the possible implementations of the invention. In the figure, AGENT PROFILE 2102 describes the profile of the agent, USER PROFILE 2101 describes the profile of the user, and PRINCIPAL PROFILE 2103 describes the profile of the principal. As discussed with reference to FIG. 15, the datagram PRINCIPAL AGENT DATA STRUCTURE 1500 can be seen as the combination of AGENT PROFILE 2102 and PRINCIPAL PROFILE 2103. For a match to occur at least some of the data and preferences contained in the datagram described as examples in FIG. 15 and FIG. 16 must overlap and be satisfied as in overlapping AREA 2104.

In a possible implementation, there is a hierarchy between preferences and settings in the three profiles. By the very nature of a principal-agent relationship, the system may give some deference to the choices and preferences of a principal. For example, a principal may be able to control the areas in which the matching algorithm should allow a match between agent and user to occur by restricting where Agent Equipment 1460 can operate for the purposes of the invention described. A principal may enable or disable agents as described in FIG. 15. A principal is also the master of the offer so he may alter the offer terms and eventually alert the agents of any change. A principal may set a bottom-selling price for the agent, namely the price at which the principal will sell the service or the good. Anything in excess could be profit for the agent. A principal may also set a hierarchy among agents and skew the matching algorithm output so that it will favor certain agents versus others in situations where different agents may compete for the same users.

In some implementations, agents may have a set of preferences and settings that they can choose. For example, an agent may bar matches around his home or workplace. He may also request the system to indicate where the closest matching user is located so that he can move close enough to allow the system to send an alert to said user when he is in proximity. Agents may also enable or disable their IDs as described in FIG. 15 when they decide to take time off from the described agency system.

Figure 22:
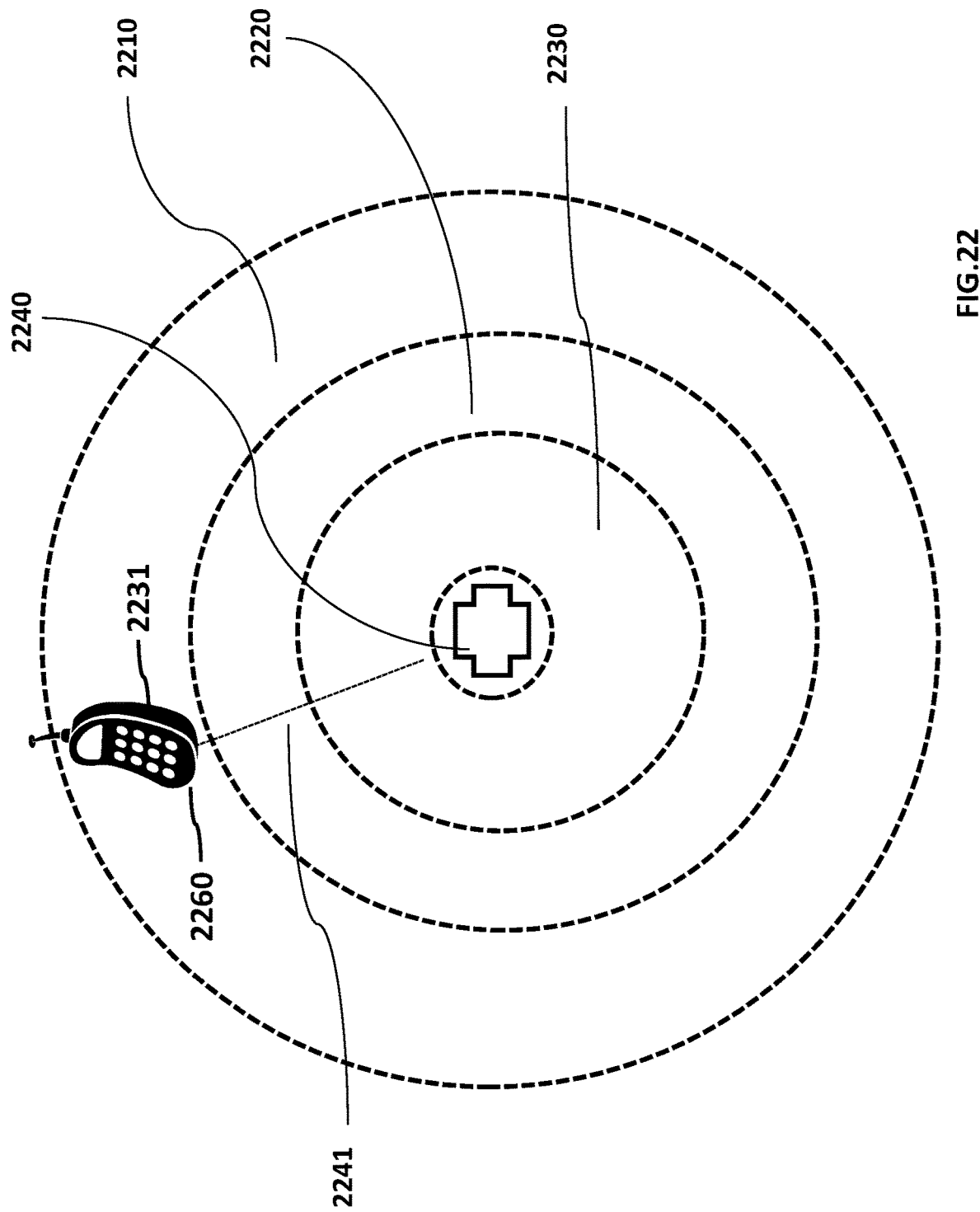
FIG. 22 describes another embodiment of one aspect of the invention.

FIG. 22 represents another possible embodiment of the present invention. In this embodiment, Areas 2210, 2220, and 2230 are concentric and non-overlapping areas centered on Inventory of Goods or Services 2240.

In another implementation, the offer areas are undetermined and offers are visible to any equipment capable of connecting to the Internet. User Equipment 2260, located in Area 2210, may receive a conditional business offer because it contains a software application logged on Memory 2230 and is positioned within Area 2210. In addition, because of its being positioned within Area 2210, User Equipment 2260 may be able to accept or negotiate the conditional business offer it has received.

One of the possible purposes of using concentric areas of increasing distance from Inventory of Goods or Services 2240 could be to differentiate the conditions or the pricing associated with the conditional offers that users may be able to accept in the different Areas 2210, 2220, or 2230.

For example, the pricing of goods or services may decrease with the distance from Inventory of Goods or Services 540 to account for the additional expense associated with the traveling necessary for retrieving or consuming the goods or services in comparison to another user who is located, together with his mobile equipment, in an area that is closer to said Inventory of Goods or Services 2240. The person skilled in the art is aware that this is only one possible example of many.

Different business models may call for an opposite or different pricing scheme. For example, the price for a service or a commodity may increase with the increasing distance of the zone where a service or a good has to be delivered from the location of Inventory of Goods or Services 2240.

FIG. 22 represents discrete areas. Area 2210, Area 2220, and Area 2230 are areas of possible acceptance. However, in a potential implementation said areas can collapse into discrete circumferences of radius Distance 2240. In this implementation, the Distance 2240 from Inventory of Goods and Services 2240 may dictate the pricing of a location-based offer.

In FIG. 22, said distance is shown as a geometrical distance calculated using a straight line, namely Distance 2240.

In other implementations, said distance can be a distance calculated by using geographical and topological data retrieved from an electronic map. An algorithm running on Server 1400 may employ different kinds of routing and parameters (including a turn by turn routing) to derive a pricing figure. For example, the fastest route, (considering the traffic conditions or the various speed limits for each street or highway), or the shortest route may be employed to create the conditions and pricing attached to the offer.

The embodiment just described is one example of a location-constrained offer and location-constrained acceptance system that is subject to many variations. In fact, if the system is a fine-grained system the offeree will be able to observe via his User Equipment 2260 the pricing and the conditions of the conditional offer he receives may fluctuate and continuously and instantaneously adjust to variations in the location of said User Equipment 2260.

If the system is coarse-grained, such adjustments will be more infrequent. In another embodiment, the zones of acceptance and/or offering may not be positioned concentrically and distance from Inventory of Goods and Services 2240 may not play a major role in defining the pricing and conditions of the offer.

Offeror may opt for zoning an area, such as a city or a county, using geofencing technology and differentiate among different zones based on various criteria such as income, age, marital status, gender, or other such economic considerations as the presence of business partners who can fulfill orders and demand. Pricing, offerings, and the possibility of acceptance can be tailored to the characteristics and demographics of the particular geofenced zone where User Equipment 2260 is located at a certain moment in time.

In a possible implementation, algorithms creating continuously varying clouds of offer and acceptance zones may dictate the pricing. In this case, zones of offer and acceptance may coincide and collapse into small and granular areas distributed across larger areas.

A technical effect of one or more of the example embodiments disclosed herein is that business models based on offers and acceptances that are restricted to selected location areas will encourage applications and security mechanisms to ensure that the position a User Equipment 2260 is reporting to Server 1400 is accurate so that Controller 1401 can process verified, accurate and trusted data.

Embodiments of the present invention can be implemented in software, hardware, application logic, or a combination of software, hardware, and application logic. The software, application logic, and/or hardware may reside on mobile computer equipment, fixed equipment, or servers that may not always be owned or operated by a single entity as described by the example of Administrator Equipment 110 and Fractional Administrator Equipment 111. If desired, part of the software, application logic, and/or hardware may reside on multiple servers and equipment in charge of different processes.

In an example embodiment, the application logic, software, or an instruction set is maintained on any one of various conventional computer-readable media. In the context of this application, a "computer-readable medium" may be any media or means that can contain, store, communicate, propagate or transport the instructions for use by or in connection with an instruction execution system, apparatus, or device, such as a computer, with examples of computers described and depicted in FIG. 1 as 100, 110, 111, 112, 160, 165, 170, 1400, 1410, 1460, 1465.

A computer-readable medium may comprise a computer-readable storage medium that may be any media or means that can contain or store the instructions for use by or in connection with an instruction execution system, apparatus, or device, such as a fixed or mobile computer.

If desired, the different functions discussed herein may be performed in a different order and/or concurrently with each other. Furthermore, if desired, one or more of the above-described functions may be optional or can be combined. As technology advances, new equipment and techniques can be viable substitutes for the equipment and techniques that have been described in this application.

For the purposes of the present application, a "plurality" means one or more.

Although various aspects of the invention are set out in the independent claims, other aspects of the invention comprise other combinations of features from the described embodiments and/or the dependent claims with the features of the independent claims, and not solely the combinations explicitly set out in the claims. The above-described exemplary embodiments of the invention should not be viewed as limiting but merely as exemplary and explanatory.

The person skilled in the art will understand that are several variations and modifications, which can be made without departing from the scope of the present invention, as defined in the appended claims.

What is claimed is:

1. A method comprising:
   linking a first user, belonging to a predetermined first group of users, with a session area according to at least one location-based parameter via a first mobile equipment apparatus associated with said first user, wherein said session area is anchored to one fixed reference location and said session area is one area whose borders, predetermined functionalities, and associated data are controlled, at least in part, by a server serving at least one principal;
   enabling at least one communication functionality, wherein said first user receives digital indicia related to said session area via said first mobile equipment apparatus;
   linking a predetermined second group of agents associated with a plurality of agent equipment apparatuses to said session area;
   dynamically enabling and disabling a plurality of IDs, belonging to said predetermined second group of agents associated with said plurality of agent equipment apparatuses, wherein said dynamically enabling and disabling allows and disallows the participation to a pool of active IDs of an agent equipment apparatus among said plurality of agent equipment apparatuses by prompting a timer functionality associated to said agent equipment apparatus and when said server serving at least one principal does not receive a predetermined data signal from said agent equipment apparatus before the expiration of said timer functionality then said server serving at least one principal stops sending supplementary requests for interactions to said agent equipment apparatus for at least a predetermined time window;
   and thus a load of incoming requests for pairing between IDs of members of said predetermined first group of users with said plurality of IDs belonging to said predetermined second group of agents associated with said plurality of agent equipment apparatuses is redistributed among said plurality of agent equipment apparatuses; wherein said first user has no control over said pool of active IDs;
   selecting said agent equipment apparatus based, on at least one of a prior amount of interaction activities data, a responsiveness to an electronically monitored task that is regulated by a timer initiated by said server serving at least one principal, a recurrence within said session area data, and an amount of time spent within said session area data;
   such that a pairing between said agent equipment apparatus and said first equipment apparatus occurs;
   providing indicia pertaining to said agent equipment apparatus to said first mobile equipment apparatus.

2. The method of claim 1, wherein said server serving at least one principal monitors a rate of interactions data of said agent equipment apparatus with mobile equipment apparatuses that are associated with users whose user profile belongs to a predetermined group, wherein said rate of interactions data affects, one of a discoverability attribute, and a visibility attribute.

3. The method of claim 1, wherein said indicia related to said session area are tailored to said first user via a user profile datagram that is derived from at least one of said first user's browsing activity, said first user's social media activity, and said first user's position.

4. The method of claim 1, wherein said server serving at least one principal prompts a hysteresis timer associated to said agent equipment apparatus wherein if said server serving at least one principal receives an indication that said agent equipment apparatus is outside the boundaries of a predetermined area and then predetermined functionalities are not initiated unless said hysteresis timer has expired.

5. The method of claim 1, wherein an interaction between said first equipment apparatus and said agent equipment apparatus prompts a feedback signal data from said first mobile equipment apparatus to said server serving at least one principal wherein said feedback signal data contributes, at least in part, to regulate a pairing of said first user and said second user.

6. The method of claim 1, wherein said agent equipment apparatus is associated with a user profile datagram comprising a hierarchical user status data such that said agent equipment apparatus is granted priority by said server serving at least one principal within said pool of active IDs.

7. The method of claim 1, wherein said digital indicia related to said session area consist in a price data value for a good or a service associated with a fixed reference location and said price data value varies according to a distance of said first mobile equipment apparatus from said fixed reference location.

8. A computer software system having a set of instructions stored in a non-transitory computer-readable medium for controlling at least one digital computer in performing desired functions comprising:
   a set of instructions formed into each of a plurality of modules, each modules comprising:
   a process for linking a first user, belonging to a predetermined first group of users, with a session area according to at least one location-based parameter via a first mobile equipment apparatus coupled to said first user, wherein said session area is anchored to one fixed reference location and said session area is one area whose borders, predetermined functionalities, and associated data are controlled, at least in part, by a server serving at least one principal;
a process for enabling at least one communication functionality wherein said first user receives digital indicia related to said session area via said first mobile equipment apparatus;
a process for linking a predetermined second group of agents associated with a plurality of agent equipment apparatuses to said session area;
a process for dynamically enabling and disabling a plurality of IDs, belonging to said predetermined second group of agents associated with said plurality of agent equipment apparatuses wherein said dynamically enabling and disabling allows and disallows the participation to a pool of active IDs of an agent equipment apparatus among said plurality of agent equipment apparatuses by prompting a timer functionality associated to said agent equipment apparatus and if said server serving at least one principal does not receive a predetermined data signal from said agent equipment apparatus before the expiration of said timer functionality said server serving at least one principal stops sending supplementary requests for interactions to said agent equipment apparatus for at least a predetermined time window;
wherein an agent belonging to said predetermined second group of agents associated with a plurality of agent equipment apparatuses is afforded a predetermined number of requests for interaction before an ID that is associated with said agent is placed into a pool of inactive IDs and thus a load of incoming requests for pairing between IDs of members of said predetermined first group of users with said plurality of IDs belonging to said predetermined second group of agents associated with said plurality of agent equipment apparatuses is redistributed among said plurality of agent equipment apparatuses; wherein said first user has no control over said pool of active IDs;
a process for selecting said agent equipment apparatus based on at least one of a prior amount of interaction activities data, a responsiveness to an electronically monitored task that is regulated by a timer initiated by said server serving at least one principal data, a recurrence within said session area data, and an amount of time spent within said session area data; wherein a pairing between said agent equipment apparatus and said first equipment apparatus occurs;
a process for providing interaction between said first mobile equipment apparatus and said agent equipment apparatus.

9. The computer software system of claim 8, wherein said interaction is created via at least one tag that is positioned within said session area, wherein said tag is sensed by a mobile equipment apparatus via at least one of optical technology, radio technology and, acoustic technology.

10. The computer software system of claim 8, wherein a crossing of a boundary associated with said session area by a mobile equipment apparatus causes said server serving at least one principal to send a signal data to at least one of said agent equipment apparatus and said first mobile equipment apparatus.

11. The computer software system of claim 8, wherein said digital indicia related to said session area that are received via said first mobile equipment apparatus results from, a correlation between a user profile datagram of said first user with a session area model profile of said session area.

12. The computer software system of claim 8, wherein said first mobile equipment apparatus displays said digital indicia related to said session area and said digital indicia are dependent from a datum representing the distance of said first mobile equipment apparatus from said fixed reference location.

13. The computer software system of claim 8, wherein said agent equipment apparatus generates digital indicia associated with concentration levels of mobile equipment apparatuses that are within the boundaries of a predetermined area.

14. The computer software system of claim 8, wherein said digital indicia relate to a price data value for a good or service associated with said session area and said price data value varies according to a distance data value of said first mobile equipment apparatus from said fixed reference location.

15. An apparatus, comprising:
at least one processor; and at least one non-transitory computer-readable medium including a computer program code; the at least one non-transitory computer-readable medium and the computer program code configured to, with the at least one processor, cause the apparatus to perform at least the following:
linking a first user, belonging to a predetermined first group of users, with a session area according to at least one location-based parameter via a first mobile equipment apparatus associated with said first user wherein said session area is anchored to one fixed reference location and said session area is one area whose borders, predetermined functionalities, and associated data are controlled, at least in part, by a server serving at least one principal;
enabling at least one communication functionality, wherein said first user receives digital indicia related to said session area via said first mobile equipment apparatus;
linking a predetermined second group of agents associated with a plurality of agent equipment apparatuses to said session area;
dynamically enabling and disabling a plurality of IDs, belonging to said predetermined second group of agents and associated with said plurality of agent equipment apparatuses, wherein said dynamically enabling and disabling allows and disallows the participation to a pool of active IDs of an agent equipment apparatus among said plurality of agent equipment apparatuses by prompting a timer functionality associated to said agent equipment apparatus and when said server serving at least one principal does not receive a predetermined data signal from said agent equipment apparatus before the expiration of said timer functionality then said server serving at least one principal stops sending supplementary requests for interactions to said agent equipment apparatus for at least a predetermined time window;
wherein a load of incoming requests for pairing between IDs of members of said predetermined first group of users with said plurality of IDs belonging to said predetermined second group of agents associated with said plurality of agent equipment apparatuses is redistributed among said plurality of agent equipment apparatuses; wherein said first user has no control over said pool of active IDs;
selecting said agent equipment apparatus based on at least one of a prior amount of interaction activities data, a responsiveness to an electronically monitored task that is regulated by a timer initiated by said server serving at least one principal data, a recurrence within said session area data, and an amount of time spent within said session area data; and thus a pairing between said agent equipment apparatus and said first equipment apparatus occurs;

enabling the receiving of indicia pertaining to said agent equipment apparatus by said first mobile equipment apparatus.

16. The apparatus of claim 15, wherein said server serving at least one principal regulates at least in part one of visibility, discoverability, and prominence based, at least in part on a rate of interaction.

17. The apparatus of claim 15, wherein said server serving at least one principal activates at least one of: an enhanced visibility functionality requested via said agent equipment apparatus wherein a tagline associated with an agent is associated with one fixed reference location, a discoverability functionality within said session area requested via said agent equipment apparatus, a discoverability functionality within said session area requested via said first mobile equipment apparatus, a discoverability functionality triggered by a threshold concentration of a predetermined user profile attribute within said session area, an analytics data collections functionality associated with said session area, and a user profile correlation functionality wherein said session area becomes discoverable by mobile equipment apparatuses associated with users whose user profile datagram scores above a correlation threshold when compared with a session area model profile datagram associated with said session area, and combinations thereof.

18. The apparatus of claim 15, wherein said session area is associated with a specific class data parameter and when said class data parameter is compared with a user profile datagram of said first user it affects at least one of visibility of said session area, and discoverability of said session area.

19. The apparatus of claim 15, wherein said server serving at least one principal receives indications pertaining to selection of session areas from at least one of said first mobile equipment apparatus and said agent equipment apparatus, wherein said indications affect at least one of visibility, discoverability and hierarchy attributes of said agent equipment apparatus.

20. The apparatus of claim 15, wherein said digital indicia is received by the scanning of an optical tag by at least one of said first mobile equipment apparatus and said agent equipment apparatus.

* * * * *

UNITED STATES PATENT AND TRADEMARK OFFICE
CERTIFICATE OF CORRECTION

| | | |
|---|---|---|
| PATENT NO. | : 11,395,093 B2 | Page 1 of 1 |
| APPLICATION NO. | : 15/894878 | |
| DATED | : July 19, 2022 | |
| INVENTOR(S) | : Federico Fraccaroli | |

It is certified that error appears in the above-identified patent and that said Letters Patent is hereby corrected as shown below:

In the Claims

- Claim 1, Column 43, Line 49, remove the "," after "IDs";
- Claim 1, Column 43, Line 53, remove "the";
- Claim 1, Column 43, Line 60, remove "the";
- Claim 1, Column 44, Line 14, add "mobile" to read: "...and said first mobile equipment apparatus...";
- Claim 2, Column 44, Line 23, remove the "," after "affects";
- Claim 4, Column 44, Line 32, add "and" after "apparatus";
- Claim 4, Column 44, Line 34, remove "the";
- Claim 4, Column 44, Line 35, remove "and";
- Claim 5, Column 44, Line 38, add "mobile" after "first";
- Claim 8, Column 45, Line 14, remove "the";
- Claim 8, Column 45, Line 27, remove "a" and add "said" after "with";
- Claim 8, Column 45, Line 47, add "mobile" to read: "...said first mobile equipment apparatus...";
- Claim 9, Column 45, Line 55, add a "," after "technology", remove the "," after "and";
- Claim 12, Column 46, Line 4, remove "the", add "a";
- Claim 15, Column 46, Line 41, remove the "," after "IDs";
- Claim 15, Column 46, Line 43, remove "and";
- Claim 15, Column 46, Line 45, remove "the";
- Claim 15, Column 46, Line 53, remove "the";
- Claim 15, Column 47, Line 7, remove "the";
- Claim 16, Column 47, Line 13, add a "," after "part";
- Claim 17, Column 47, Line 15, delete ":" after "of";
- Claim 20, Column 48, Line 21, delete "the" after "by".

Signed and Sealed this
Twenty-eighth Day of February, 2023

Katherine Kelly Vidal
*Director of the United States Patent and Trademark Office*